(12) United States Patent
Uragami et al.

(10) Patent No.: US 11,307,426 B2
(45) Date of Patent: Apr. 19, 2022

(54) IMAGE DISPLAY APPARATUS AND OPTICAL DEVICE

(71) Applicant: Panasonic Intellectual Property Management Co., Ltd., Osaka (JP)

(72) Inventors: Susumu Uragami, Osaka (JP); Hiroyuki Furuya, Osaka (JP); Akira Kurozuka, Osaka (JP); Yuta Yamamoto, Kyoto (JP); Mitsutaka Yamaguchi, Gifu (JP); Yoshiro Kashiwabara, Aichi (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/116,984

(22) Filed: Dec. 9, 2020

(65) Prior Publication Data

US 2021/0088797 A1 Mar. 25, 2021

Related U.S. Application Data

(63) Continuation of application No. PCT/JP2019/020353, filed on May 22, 2019.

(30) Foreign Application Priority Data

Jul. 5, 2018 (JP) .............................. JP2018-128328
Sep. 28, 2018 (JP) .............................. JP2018-183291

(51) Int. Cl.
*G09G 5/00* (2006.01)
*G02B 27/01* (2006.01)

(52) U.S. Cl.
CPC .. *G02B 27/0179* (2013.01); *G02B 2027/0154* (2013.01); *G02B 2027/0163* (2013.01); *G02B 2027/0183* (2013.01)

(58) Field of Classification Search
CPC ........ G02B 27/0179; G02B 2027/0154; G02B 2027/0163; G02B 2027/0183;
(Continued)

(56) References Cited

U.S. PATENT DOCUMENTS

| 10,209,525 B2* | 2/2019 | Aono ................. G02B 27/0101 |
| 2002/0020810 A1* | 2/2002 | Wine ................... G02B 26/101 250/234 |

(Continued)

FOREIGN PATENT DOCUMENTS

| JP | H05-300329 A | 11/1993 |
| JP | H07-084203 A | 3/1995 |

(Continued)

OTHER PUBLICATIONS

International Search Report issued in corresponding International Patent Application No. PCT/JP2019/020353, dated Aug. 13, 2019, with English translation.

*Primary Examiner* — Insa Sadio
(74) *Attorney, Agent, or Firm* — McDermott Will & Emery LLP

(57) ABSTRACT

An image display apparatus includes: a light source; a screen on which an image is formed when light from the light source is applied thereto; an optical system configured to generate a virtual image by light from the screen; an actuator configured to move the screen in an optical axis direction; a support base supporting the actuator; and a dynamic damper installed on a non-movable part on the support base.

11 Claims, 27 Drawing Sheets

(58) Field of Classification Search
CPC .... G02B 27/0149; G02B 30/54; B60K 35/00; G09G 3/20; H04N 13/395
See application file for complete search history.

(56) References Cited

U.S. PATENT DOCUMENTS

| | | | |
|---|---|---|---|
| 2005/0156481 A1 | 7/2005 | Zhou et al. | |
| 2005/0156815 A1* | 7/2005 | Aoki | G02B 27/0149 345/7 |
| 2006/0203351 A1* | 9/2006 | Kageyama | G02B 27/0101 359/630 |
| 2007/0057781 A1* | 3/2007 | Breed | H01Q 1/3233 340/457.1 |
| 2007/0097322 A1* | 5/2007 | Kim | G03B 21/2033 353/30 |
| 2007/0296195 A1* | 12/2007 | Manwaring | B62D 1/187 280/775 |
| 2008/0259545 A1* | 10/2008 | Park | B60R 11/0229 361/679.06 |
| 2009/0160736 A1 | 6/2009 | Shikita | |
| 2009/0160769 A1* | 6/2009 | Lowles | G06F 3/0312 345/160 |
| 2009/0316243 A1* | 12/2009 | Tsuida | B41J 2/471 359/202.1 |
| 2010/0066832 A1* | 3/2010 | Nagahara | G02B 7/1822 348/148 |
| 2013/0194518 A1* | 8/2013 | Moussa | G02B 27/0101 349/11 |
| 2013/0201541 A1* | 8/2013 | Sasaki | B60L 1/003 359/221.3 |
| 2013/0318438 A1* | 11/2013 | Afshar | G06F 3/016 715/702 |
| 2014/0027199 A1* | 1/2014 | Claeys | G10K 11/002 181/290 |
| 2014/0375898 A1* | 12/2014 | Kurozuka | H04N 9/3135 348/760 |
| 2015/0286054 A1* | 10/2015 | Ushida | G02B 27/0149 345/7 |
| 2016/0048026 A1* | 2/2016 | Ogasawara | G02B 27/0101 359/633 |
| 2016/0347083 A1 | 12/2016 | Ishidate | |
| 2017/0016509 A1* | 1/2017 | Ryaboy | F16F 15/02 |
| 2017/0059861 A1* | 3/2017 | Furuya | G02B 27/0101 |
| 2017/0328442 A1* | 11/2017 | Gilbert | F16F 3/08 |
| 2018/0059417 A1* | 3/2018 | Furusawa | G02B 27/01 |
| 2018/0239140 A1* | 8/2018 | Uragami | H04N 9/3164 |
| 2018/0356632 A1* | 12/2018 | Furuya | G02B 27/0101 |
| 2018/0364480 A1* | 12/2018 | Furuya | H04N 9/3164 |
| 2019/0045286 A1* | 2/2019 | Kim | H04R 1/288 |
| 2019/0138097 A1* | 5/2019 | Schossau | B60K 35/00 |
| 2019/0228705 A1* | 7/2019 | Furuya | H04N 9/3135 |
| 2019/0361235 A1* | 11/2019 | Fukushima | G02B 27/0103 |
| 2020/0379256 A1* | 12/2020 | Saito | B60K 35/00 |

FOREIGN PATENT DOCUMENTS

| | | |
|---|---|---|
| JP | 2009-150947 A | 7/2009 |
| JP | 2013-068886 A | 4/2013 |
| JP | 2016-224258 A | 12/2016 |
| JP | 2017-044805 A | 3/2017 |
| JP | 2018-136362 A | 8/2018 |

* cited by examiner

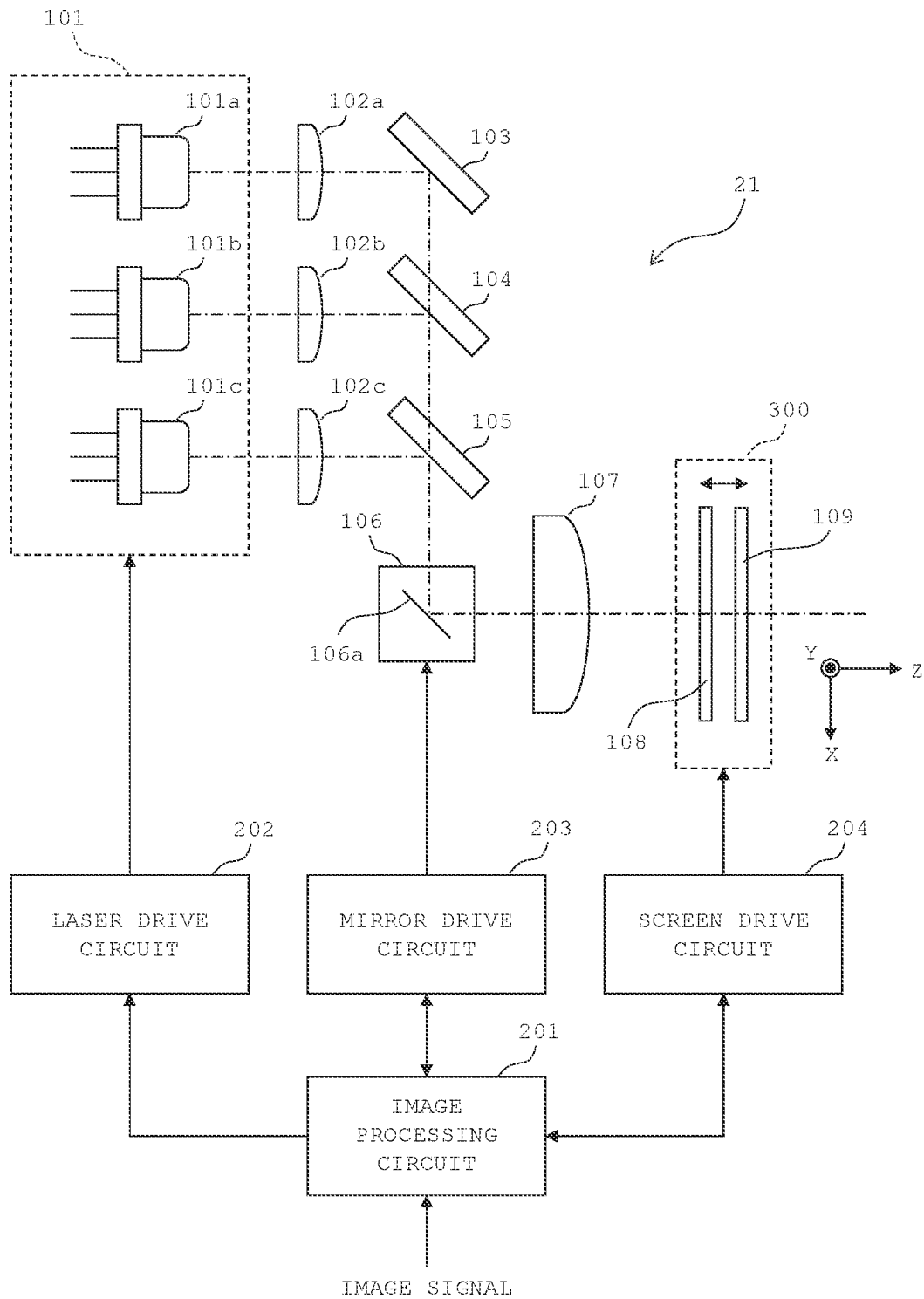

Fig.14
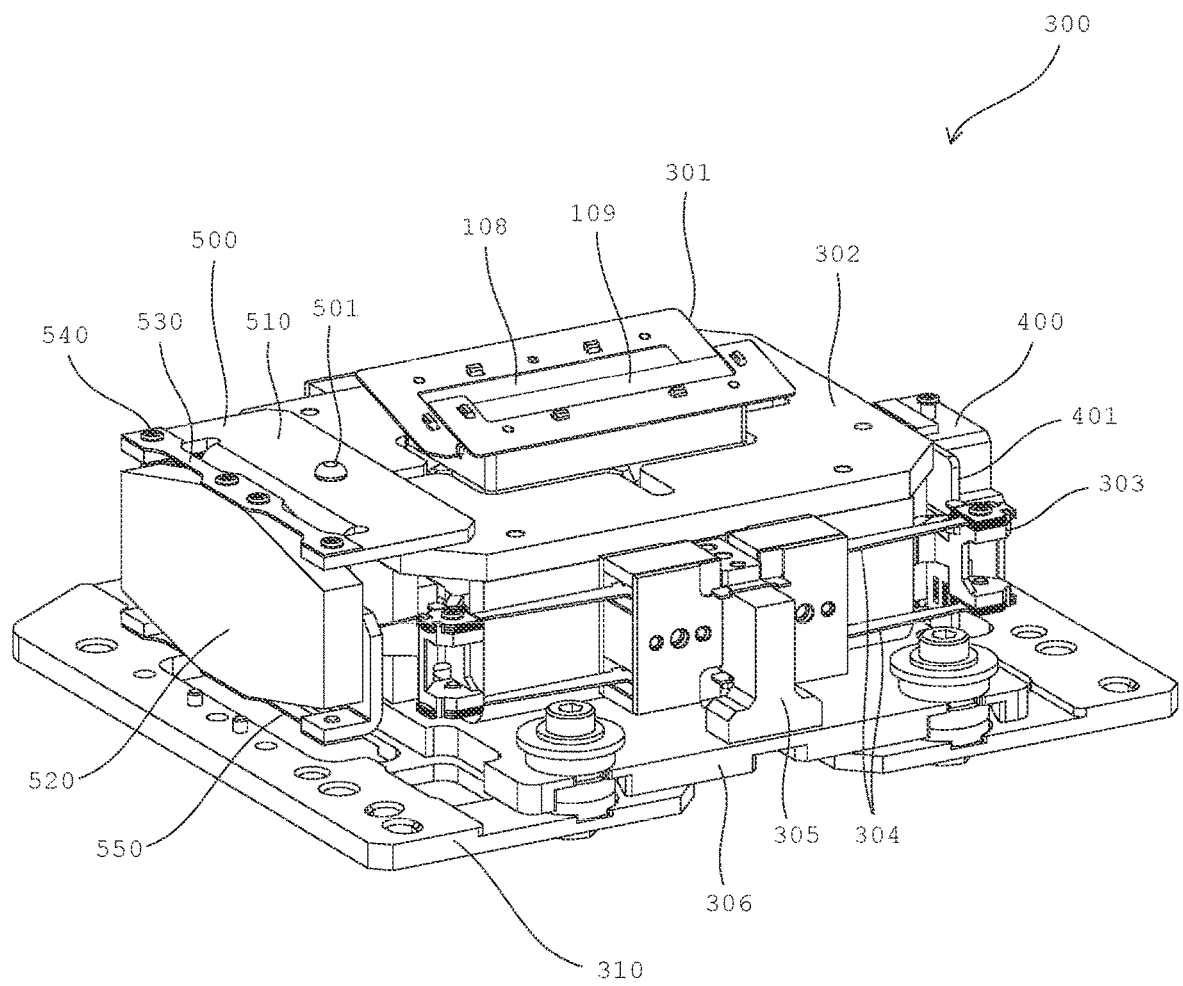
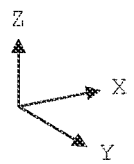

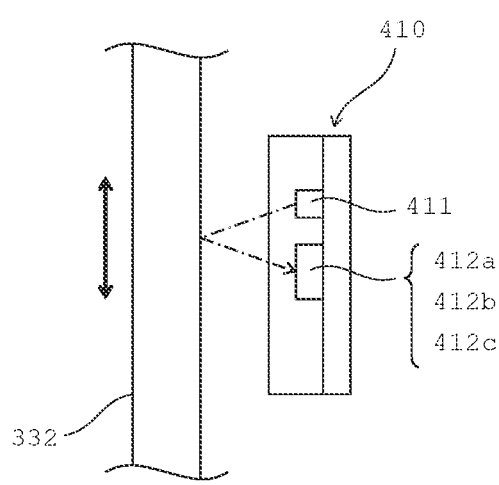
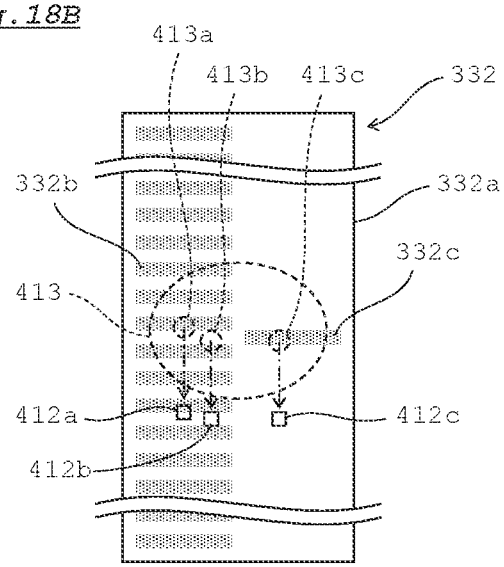
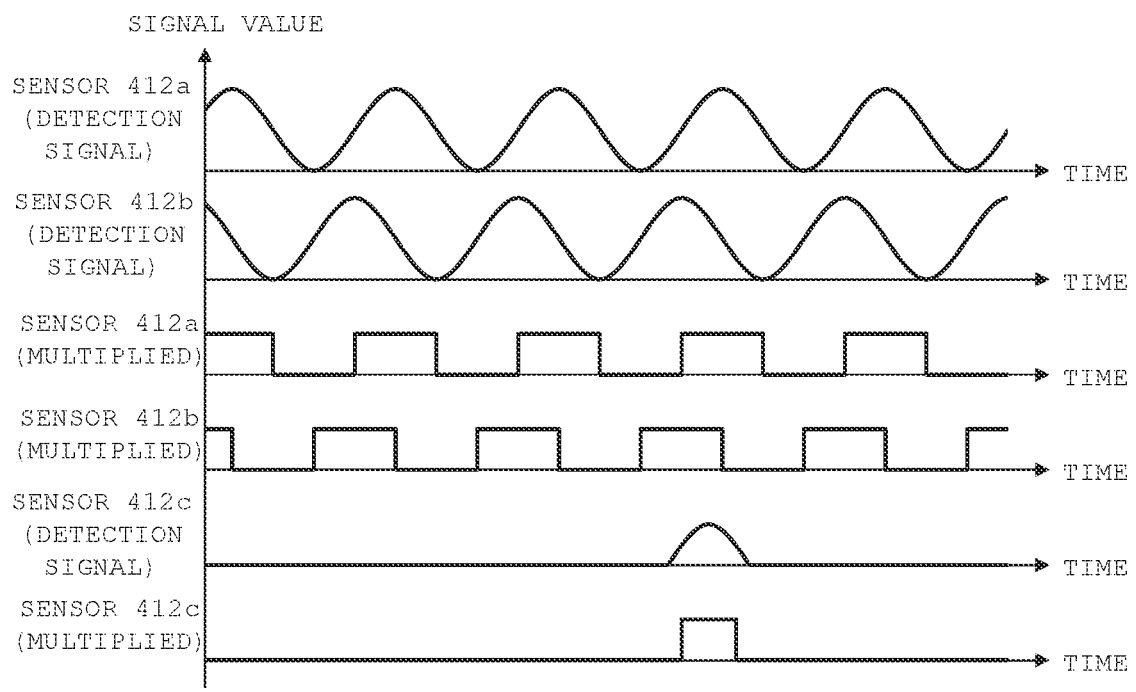

IMAGE DISPLAY APPARATUS AND OPTICAL DEVICE

CROSS REFERENCE TO RELATED APPLICATION

This application is a continuation of International Application No. PCT/JP2019/20353 filed on May 22, 2019, entitled "IMAGE DISPLAY APPARATUS AND OPTICAL DEVICE", which claims priority under 35 U.S.C. Section 119 of Japanese Patent Application No. 2018-128328 filed on Jul. 5, 2018, entitled "IMAGE DISPLAY APPARATUS" and Japanese Patent Application No. 2018-183291 filed on Sep. 28, 2018, entitled "IMAGE DISPLAY APPARATUS". The disclosure of the above applications is incorporated herein by reference.

BACKGROUND OF THE INVENTION

1. Field of the Invention

The present invention relates to an image display apparatus and an optical device that are, for example, suitable to be mounted on a moving body such as a passenger car.

2. Disclosure of Related Art

In recent years, an image display apparatus referred to as a head-up display has been developed and mounted on a moving body such as a passenger car. In a head-up display mounted on a passenger car, light modulated by image information is projected toward a windshield, and the reflected light is applied to the eyes of a driver. Accordingly, the driver is allowed to see a virtual image as an image in front of the windshield. For example, the vehicle speed, the outside temperature, etc., are displayed as a virtual image. Recently, it has also been considered to display a navigation image or an image that alerts of passers-by as a virtual image.

In the above head-up display, a laser light source such as a semiconductor laser can be used as a light source for generating a virtual image. In this configuration, scanning is performed on a screen with laser light while the laser light is modulated in accordance with an image signal. At the screen, the laser light is diffused, and the region of the light applied to the eyes of the driver is expanded. Accordingly, even when the driver slightly moves their head, their eyes do not come out of the irradiation region, and the driver is allowed to favorably and stably see an image (virtual image).

Japanese Laid-Open Patent Publication No. 2018-136362 describes a configuration in which a screen is moved in an optical axis direction to change the image-formation position of a virtual image in the front-rear direction. In this configuration, the screen is driven at high speed using an electromagnetic actuator. By drawing a series of images on the screen while changing the position of the screen in the optical axis direction at high speed, a driver is allowed to view an image spreading in the depth direction.

However, when the screen is moved at high speed as described above, vibration occurs along with the movement of the screen, and resonance sound and the like may be generated due to this vibration. In order to avoid this, in the configuration of Japanese Laid-Open Patent Publication No. 2018-136362, a support base that supports the actuator for the screen is mounted on a fixed base via a damper. Accordingly, the vibration generated when the screen is driven is absorbed by the damper before being propagated to the fixed base.

However, in the configuration of Japanese Laid-Open Patent Publication No. 2018-136362, reaction force is applied from the support base to the fixed base due to the reaction caused by the movement of the movable part, and a support member such as a casing that supports the fixed base may be vibrated by this reaction force. Due to this vibration, resonance sound is generated in the support member such as a casing.

SUMMARY OF THE INVENTION

An image display apparatus according to a first aspect of the present invention includes: a light source; a screen on which an image is formed when light from the light source is applied thereto; an optical system configured to generate a virtual image by light from the screen; an actuator configured to move the screen in an optical axis direction; a support base supporting the actuator; and a dynamic damper installed on a non-movable part on the support base.

In the image display apparatus according to this aspect, vibration energy of a structure obtained by integrating the actuator and the support base is absorbed by the dynamic damper. Thus, movement of the structure is suppressed in the target frequency band of the dynamic damper, so that reaction from the structure is inhibited from being applied to another member such as a casing. As a result, vibration of the other member such as a casing can be suppressed, and resonance in the other member can be suppressed.

In the image display apparatus according to this aspect, the dynamic damper is one of the vibration suppression technologies, and refers to a device that suppresses a resonance phenomenon around the natural frequency of an object to be vibrated, by adding an auxiliary mass to the object via a spring or the like. The dynamic damper is also used in fields such as machinery, construction, and civil engineering, and is also referred to as a dynamic vibration absorber (DVA), a tuned mass damper (TMD), a mass damper, etc.

An optical device according to a second aspect of the present invention includes: a light source; an optical system to which light from the light source is guided; an actuator configured to move the optical system; a support base supporting the actuator; and a dynamic damper installed on a non-movable part on the support base.

With the optical device according to this aspect, the same advantageous effects as those in the first aspect can be achieved.

BRIEF DESCRIPTION OF THE DRAWINGS

The above and other objects and new features of the present invention will be fully clarified by the following description of the embodiment, when read in conjunction with accompanying drawings.

FIG. 2 is a diagram showing configurations of an irradiation light generation part of the image display apparatus according to Embodiment 1 and circuits used for the irradiation light generation part;

FIG. 14 is a perspective view showing a configuration of an actuator according to still another modification of Embodiment 1;

FIG. 18A is a schematic diagram of an encoder and a scale according to Embodiment 2 as viewed in a Y-axis negative direction;

FIG. 18B is a schematic diagram of sensors and the scale according to Embodiment 2 as viewed in an X-axis negative direction;

FIG. 18C is a diagram schematically showing detection signals of the encoder according to Embodiment 2 and multiplication signals generated on the basis of the detection signals of the encoder;

FIG. 20A shows graphs schematically showing states before and after timings when a multiplication signal of a sensor according to Embodiment 2 is turned on;

It should be noted that the drawings are solely for description and do not limit the scope of the present invention by any degree.

DESCRIPTION OF THE PREFERRED EMBODIMENTS

Hereinafter, embodiments of the present invention will be described with reference to the drawings. In each drawing, X, Y, and Z axes that are orthogonal to each other are additionally shown. In the present embodiment, the present invention is applied to a vehicle-mounted head-up display (optical device).

Embodiment 1

Figure 1A:
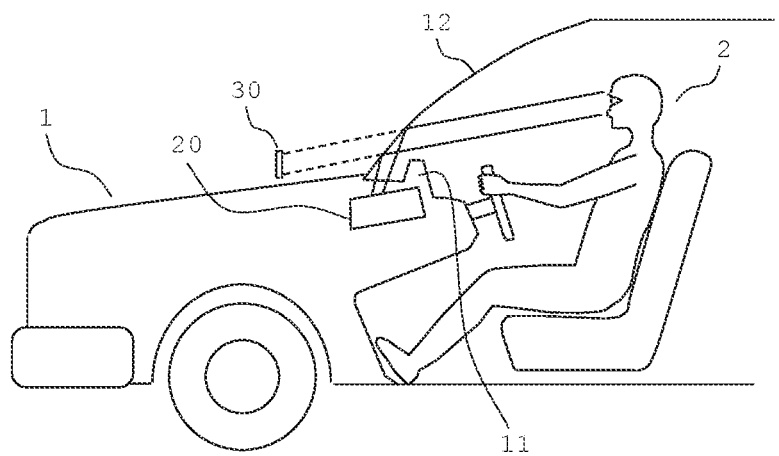
FIG. 1A and FIG. 1B are diagrams schematically showing a use form of an image display apparatus according to Embodiment 1.
Figure 1B:
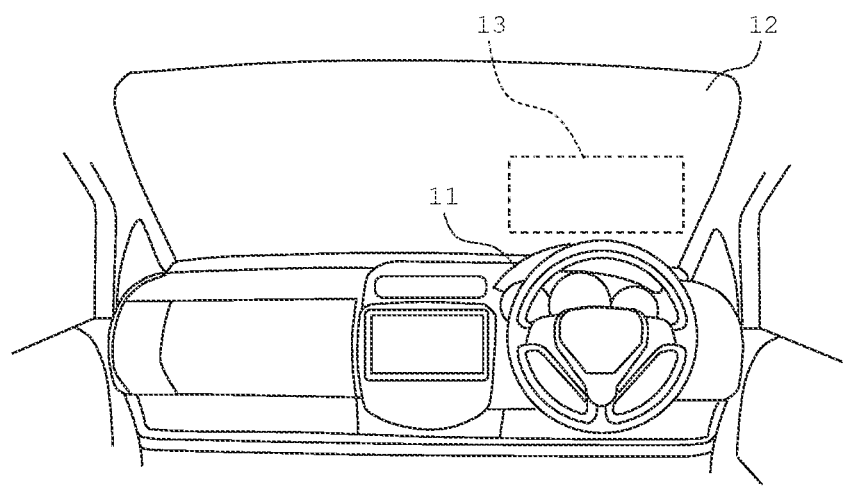

FIG. 1A and FIG. 1B are diagrams schematically showing a use form of an image display apparatus 20. FIG. 1A is a schematic diagram in which the inside of a passenger car 1 is seen through from a lateral side of the passenger car 1, and FIG. 1B is a diagram when the front in a traveling direction is viewed from the inside of the passenger car 1.

As shown in FIG. 1A, the image display apparatus 20 is installed within a dashboard 11 of the passenger car 1.

As shown in FIG. 1A and FIG. 1B, the image display apparatus 20 projects laser light modulated by an image signal onto a projection region 13 that is on a lower side of a windshield 12 and near a driver's seat. The laser light is reflected by the projection region 13 and applied to a horizontally long region (eye box region) around the positions of the eyes of a driver 2. Accordingly, a predetermined image 30 is displayed as a virtual image in the front field of view of the driver 2. The driver 2 is allowed to see the image 30, which is a virtual image, such that the image 30 is superimposed on a view in front of the windshield 12. That is, the image display apparatus 20 forms the image 30, which is a virtual image, in a space in front of the projection region 13 of the windshield 12.

Figure 1C:
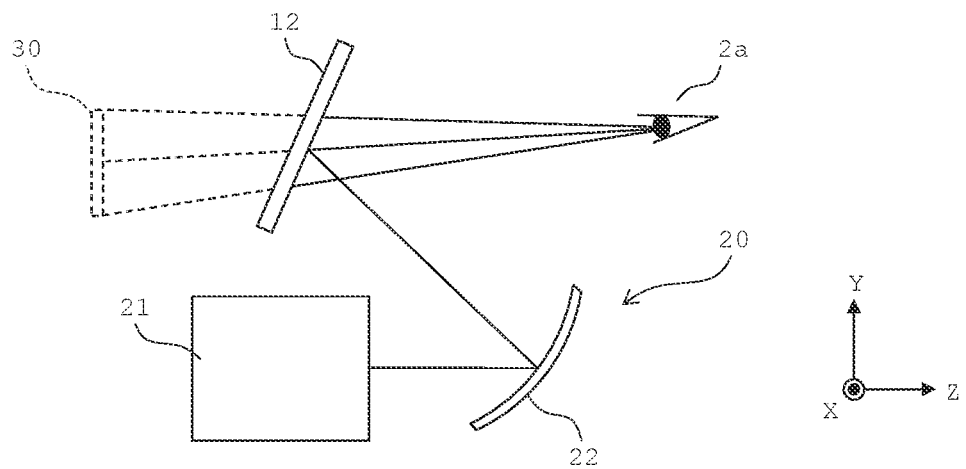
FIG. 1C is a diagram schematically showing a configuration of the image display apparatus according to Embodiment 1.

FIG. 1C is a diagram schematically showing a configuration of the image display apparatus 20.

The image display apparatus 20 includes an irradiation light generation part 21 and a mirror 22. The irradiation light generation part 21 emits light modulated by an image signal. The mirror 22 has a curved reflecting surface and reflects the light emitted from the irradiation light generation part 21, toward the windshield 12. The light reflected by the windshield 12 is applied to the eyes 2a of the driver 2. An optical system of the irradiation light generation part 21 and the mirror 22 are designed such that the image 30, which is a virtual image, is displayed in front of the windshield 12 in a predetermined size.

The mirror 22 forms an optical system for generating a virtual image by light generated from screens 108 and 109 described later. The optical system does not necessarily have to be formed of only the mirror 22. For example, the optical system may include a plurality of mirrors, or may include a lens, etc.

FIG. 2 is a diagram showing a configuration of the irradiation light generation part 21 of the image display apparatus 20 and a configuration of a circuit used for the irradiation light generation part 21.

The irradiation light generation part 21 includes a light source 101, collimator lenses 102a to 102c, a mirror 103, dichroic mirrors 104 and 105, a scanning device 106, a correction lens 107, screens 108 and 109, and an actuator 300.

The light source 101 includes three laser light sources 101a to 101c. The laser light sources 101a to 101c emit laser light in the red wavelength band, the green wavelength band, and the blue wavelength band, respectively. In the present embodiment, in order to display a color image as the image 30, the light source 101 includes the three laser light sources 101a to 101c. In the case of displaying a single-color image as the image 30, the light source 101 may include only one laser light source corresponding to the color of the image. The laser light sources 101a to 101c are composed of, for example, semiconductor lasers.

The laser light emitted from the laser light sources 101a to and 101c is converted to substantially parallel light by the collimator lenses 102a to 102c, respectively. At this time, the laser light emitted from the laser light sources 101a to 101c is shaped into a circular beam shape by apertures, which are not shown, respectively. Instead of each of the collimator lenses 102a to 102c, a shaping lens that shapes the laser light into a circular beam shape and converts the laser light to parallel light may be used. In this case, the apertures can be omitted.

Thereafter, the optical axes of the laser light of the respective colors emitted from the laser light sources 101a to 101c are caused to coincide with each other by the mirror 103 and the two dichroic mirrors 104 and 105. The mirror 103 substantially totally reflects the red laser light that has passed through the collimator lens 102a. The dichroic mirror 104 reflects the green laser light that has passed through the collimator lens 102b, and transmits the red laser light reflected by the mirror 103. The dichroic mirror 105 reflects the blue laser light that has passed through the collimator lens 102c, and transmits the red laser light and the green laser light that have passed through the dichroic mirror 104. The mirror 103 and the two dichroic mirrors 104 and 105 are disposed such that the optical axes of the laser light of the respective colors emitted from the laser light sources 101a to 101c are caused to coincide with each other.

The scanning device 106 reflects the laser light of the respective colors that has passed through the dichroic mirror 105. The scanning device 106 is composed of, for example, a MEMS (micro electro mechanical system) mirror, and has a configuration for rotating a mirror 106a, on which the laser light of the respective colors that has passed through the dichroic mirror 105 is incident, about an axis parallel to the Y axis and an axis perpendicular to the Y axis in accordance with a drive signal. By rotating the mirror 106a as described above, the reflection direction of the laser light is changed in the in-plane direction of the XZ plane and the in-plane direction of the YZ plane. Accordingly, scanning is performed on the screens 108 and 109 with the laser light of the respective colors as will be described later.

The scanning device 106 is composed of the biaxial drive type MEMS mirror, but may have another configuration. For example, the scanning device 106 may be configured by combining a mirror that is rotationally driven about an axis parallel to the Y axis and a mirror that is rotationally driven about an axis perpendicular to the Y axis.

The correction lens 107 is designed so as to direct the laser light of the respective colors in the Z-axis positive direction regardless of the swing angle of the laser light by the scanning device 106. An image is formed by performing scanning on the screens 108 and 109, and the screens 108 and 109 have a function to diffuse the incident laser light to the region (eye box region) around the positions of the eyes 2a of the driver 2. The screens 108 and 109 are each made of a transparent resin such as PET (polyethylene terephthalate).

The screen 108 is used for displaying a depth image whose viewing distance is changed in the depth direction, and the screen 109 is used for displaying a fixed image whose viewing distance is constant. As the depth image, for example, an arrow for guiding a travelling direction of the vehicle, or the like, is displayed. As a fixed image, for example, characters indicating the vehicle speed and the outside temperature, or the like, is displayed The actuator 300 reciprocates the screens 108 and 109 in a direction (Z-axis direction) parallel to the travelling direction of the laser light. The configuration of the actuator 300 will be described later with reference to FIG. 4A to FIG. 8B.

An image processing circuit 201 includes an arithmetic processing unit such as a CPU (central processing unit), and a memory, and processes an inputted image signal to control a laser drive circuit 202, a mirror drive circuit 203, and a screen drive circuit 204. The laser drive circuit 202 changes the emission intensity of the laser light sources 101a to 101c in accordance with a control signal from the image processing circuit 201. The mirror drive circuit 203 drives the mirror 106a of the scanning device 106 in accordance with a control signal from the image processing circuit 201. The screen drive circuit 204 drives the screens 108 and 109 in accordance with a control signal from the image processing circuit 201. The control in the image processing circuit 201 during image display operation will be described later with reference to FIG. 9A.

Figure 3A:
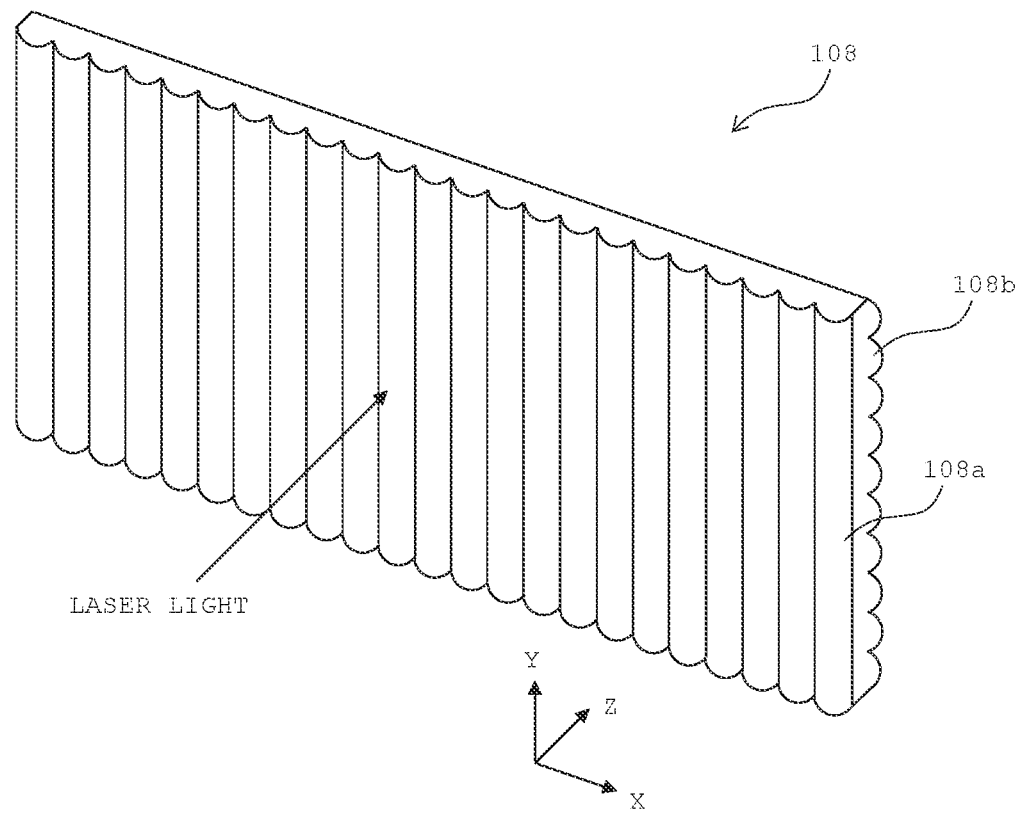
FIG. 3A is a perspective view schematically showing a configuration of a screen according to Embodiment 1.
Figure 3B:
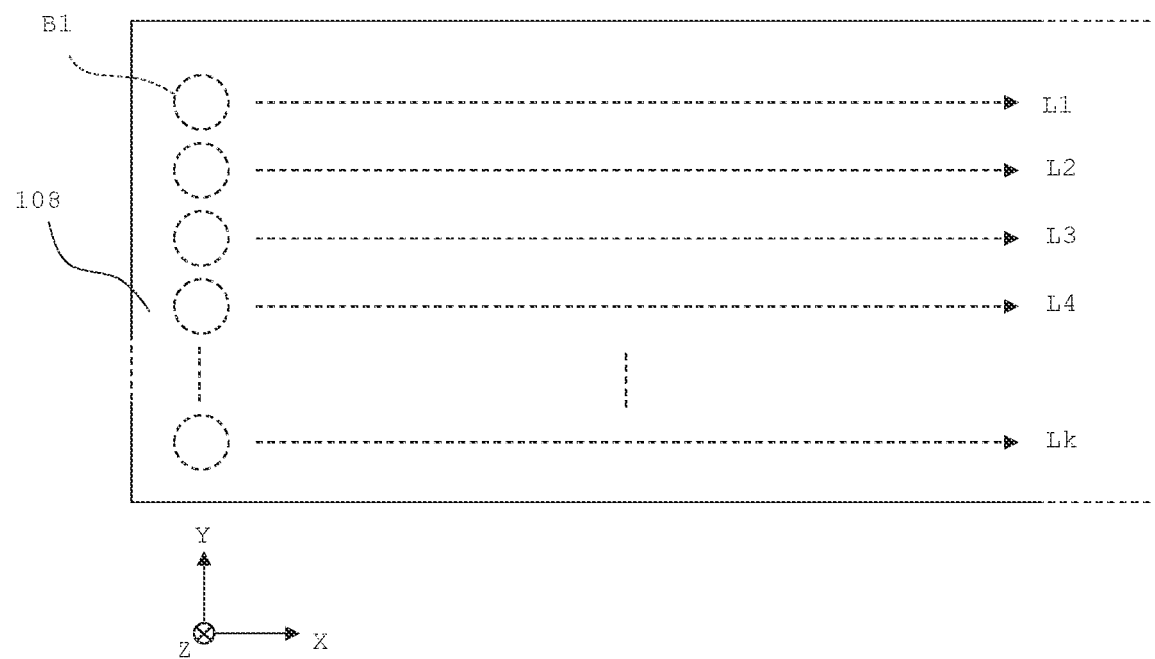
FIG. 3B is a diagram schematically showing a method for performing scanning on the screen with laser light according to Embodiment 1.

FIG. 3A is a perspective view schematically showing a configuration of the screen 108. FIG. 3B is a diagram schematically showing a method for performing scanning on the screen 108 with laser light.

As shown in FIG. 3A, a plurality of first lens portions 108a for diffusing laser light in the X-axis direction are formed on the surface on the laser light incident side (surface on the Z-axis negative side) of the screen 108 so as to be aligned in the X-axis direction. Each first lens portion 108a has a substantially arc shape when being viewed in the Y-axis direction. The width in the X-axis direction of each first lens portion 108a is, for example, 50 µm.

A plurality of second lens portions 108b for diffusing laser light in the Y-axis direction are formed on the surface on the laser light emission side (surface on the Z-axis positive side) of the screen 108 so as to be aligned in the Y-axis direction. Each second lens portion 108b has a substantially arc shape when being viewed in the X-axis direction. The width in the Y-axis direction of each second lens portion 108b is, for example, 70 µm.

Scanning is performed in the X-axis positive direction on the incident surface (surface on the Z-axis negative side) of the screen 108 having the above configuration, with a beam B1 obtained by combining the laser light of the respective colors, as shown in FIG. 3B. Scanning lines L1 to Lk on which the beam B1 passes are set in advance on the incident surface of the screen 108 at regular intervals in the Y-axis direction. The start positions and the end positions of the scanning lines L1 to Lk coincide with each other in the X-axis direction. The diameter of the beam B1 is set to, for example, about 50 µm.

An image is formed by performing scanning on the scanning lines L1 to Lk at a high frequency with the beam B1 obtained by modulating the laser light of the respective colors on the basis of an image signal. The image thus formed is projected through the screen 108, the mirror 22, and the windshield 12 (see FIG. 1C) to the region (eye box) around the positions of the eyes 2a of the driver 2. Accordingly, the driver 2 views the image 30 as a virtual image in a space in front of the windshield 12.

The screen 109 also has the same configuration as the screen 108. The width in the Y-axis direction of the screen 109 is set to be smaller than that of the screen 108. Similar to the screen 108, scanning is also performed in the X-axis direction on the screen 109 with the beam B1. The number of scanning lines for the screen 109 is smaller than the number of scanning lines for the screen 108.

In the present embodiment, the screens 108 and 109 are integrally supported and driven by the actuator 300. In display of the depth image, scanning is performed on the screen 108 with the beam B1 while the screen 108 is moved in the optical axis direction (Z-axis direction) together with the screen 109. In display of the fixed image, the screen 109 is stopped at a predetermined position together with the screen 108, and scanning is performed on the screen 109 with the beam B1.

Next, the configuration of the actuator 300 will be described.

Figure 4A:
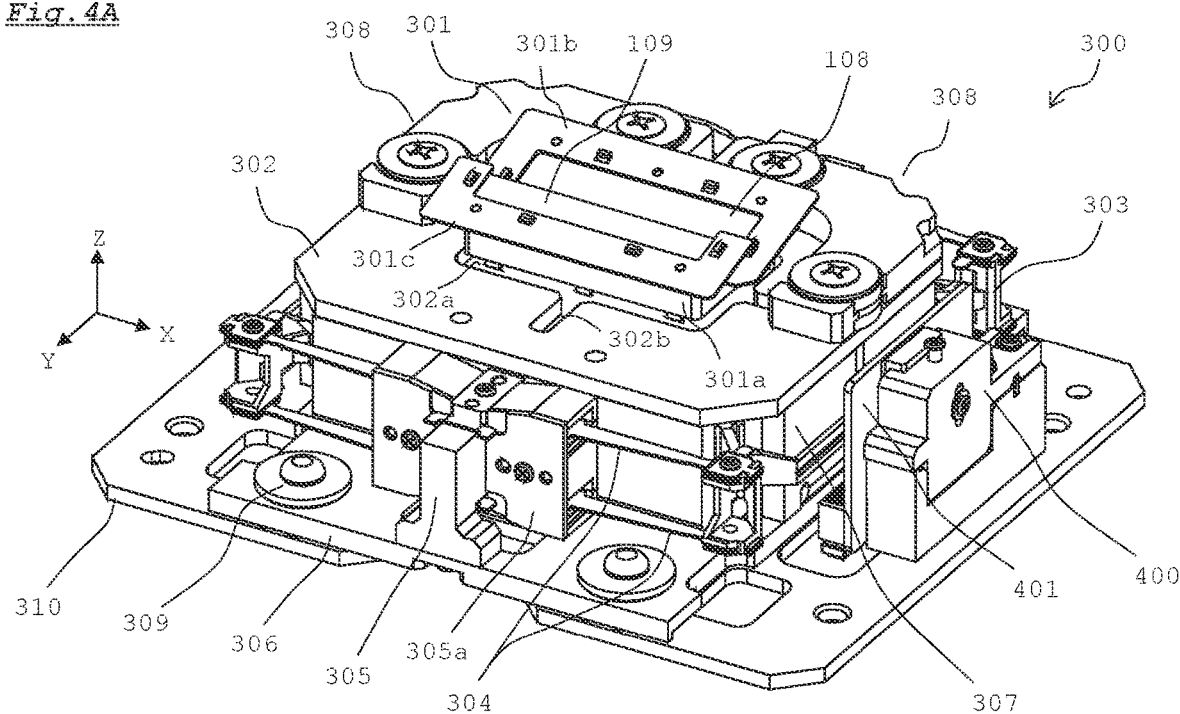
FIG. 4A is a perspective view showing a configuration of an actuator according to Embodiment 1.
Figure 4B:
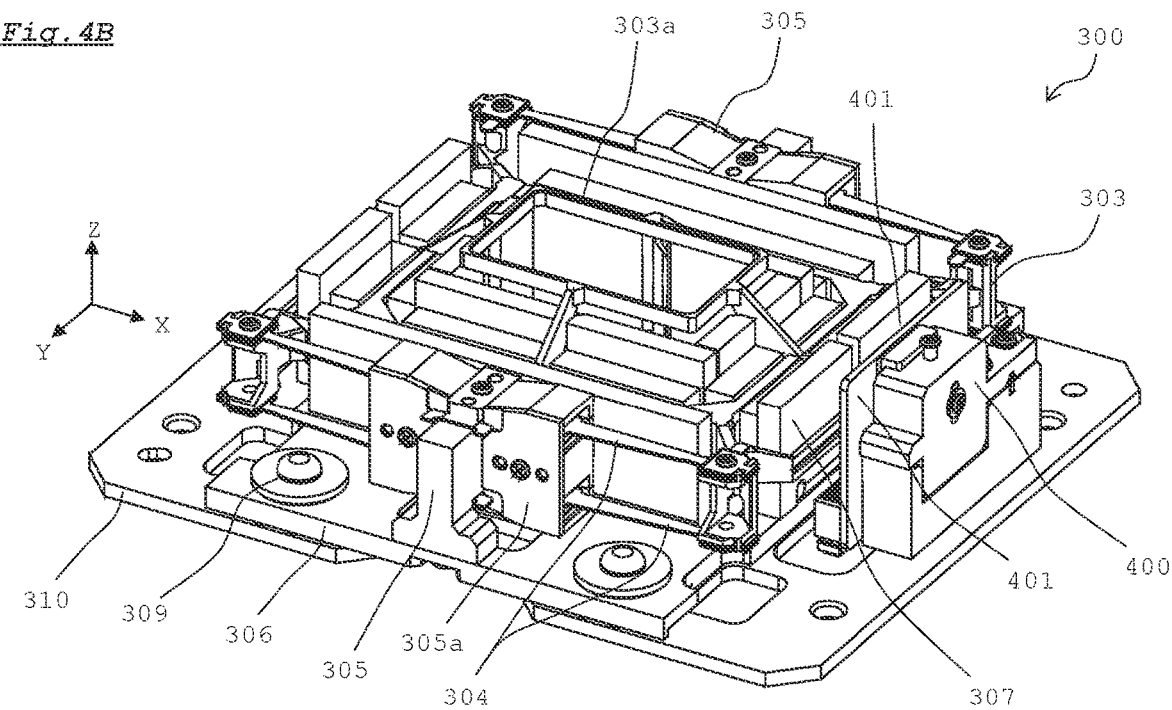
FIG. 4B is a perspective view showing a configuration of the actuator according to Embodiment 1 in a state where a magnetic cover and a structure are removed from the actuator.

FIG. 4A is a perspective view showing the configuration of the actuator 300, and FIG. 4B is a perspective view showing a configuration of the actuator 300 in a state where a magnetic cover 302 and a holding part 301 are removed from the actuator 300. FIG. 4A and FIG. 4B show a state where the actuator 300 is supported by the support base 306 and the fixed base 310.

Hereinafter, in addition to defining directions on the basis of the X, Y, and Z axes, the configuration will be described with the side closer to the center of the actuator 300 as the inner side and the side away from the center of the actuator 300 as the outer side in a plan view, for convenience.

As shown in FIG. 4A, the screens 108 and 109 are integrally supported by the holding part 301 such that the screens 108 and 109 are tilted in the same direction. The two screens 108 and 109 are aligned in a direction (Y-axis direction) perpendicular to the movement direction by the actuator 300 (Z-axis direction) and are provided at positions displaced relative to each other by a predetermined distance in the movement direction (Z-axis direction). The holding part 301 includes a frame-shaped holder 301a that holds the screens 108 and 109, and plate-shaped light blocking members 301b and 301c that surround the peripheries of the screens 108 and 109. The light blocking members 301b and 301c are for preventing natural light from the outside from travelling backwards through the optical system and being incident on the holder 301a.

The periphery of the holding part 301 is surrounded by the magnetic cover 302. The magnetic cover 302 is placed on the upper surface of the magnetic circuit 307. The magnetic cover 302 is made of a magnetic material, and functions as a yoke for the magnetic circuit 307. When the magnetic cover 302 is placed on the upper surface of the magnetic circuit 307, the magnetic cover 302 is attracted to the magnetic circuit 307. Accordingly, the magnetic cover 302 is installed on the actuator 300.

The magnetic cover 302 is provided with an opening 302a for passing the holding part 301 therethrough, and slits 302b for passing beam portions 303c (see FIG. 8A) of the support member 303 therethrough. Two dynamic dampers 308 are installed on the upper surface of the magnetic cover 302. The method for assembling the magnetic cover 302 and the dynamic dampers 308 will be described later with reference to FIG. 6A and FIG. 6B.

The holding part 301 having the screens 108 and 109 installed thereon is installed on an inner frame portion 303a of the support member 303 shown in FIG. 4B. The support member 303 is supported by two support units 305, which are aligned in the Y-axis direction, via four suspensions 304 so as to be movable in the Z-axis direction. The support units 305 are installed on the support base 306. Each support unit 305 includes gel covers 305a on the X-axis positive side and the X-axis negative side, respectively, and these gel covers 305a are filled with gel for damping.

Thus, the screens 108 and 109 are supported by the support base 306 via the holding part 301, the support member 303, the suspensions 304, and the support units 305 so as to be movable in the Z-axis direction. The configurations of the support member 303 and the suspensions 304 will be described later with reference to FIG. 8A and FIG. 8B.

A magnetic circuit 307 is further installed on the support base 306. The magnetic circuit 307 is for applying a magnetic field to a coil 341 (see FIG. 8A) mounted on the support member 303. By applying a drive signal (current) to the coil 341, electromagnetic force in the Z-axis direction is generated in the coil 341. Thus, the support member 303 is driven in the Z-axis direction together with the coil 341. Accordingly, the screens 108 and 109 move in the Z-axis direction. The configuration of the magnetic circuit 307 will be described later with reference to FIG. 5A and FIG. 5B.

The support base 306 is installed on the fixed base 310 via damper units 309. The damper units 309 support the support base 306 in a state where the support base 306 is raised from the fixed base 310 in the Z-axis positive direction. The damper units 309 absorb vibration generated by driving the support member 303, before the vibration propagates from the support base 306 to the fixed base 310. The configurations of the damper units 309 and the fixed base 310 will be described later with reference to FIG. 7.

A position detection unit 400 is further installed on the fixed base 310. The position detection unit 400 includes a printed board 401 that faces the side surface on the X-axis positive side of the support member 303. An encoder (not shown) is disposed on the surface on the X-axis negative side of the printed board 401. The position in the Z-axis direction of the support member 303 is detected by the encoder. The method for detecting the position of the support member 303 by the encoder will be described later with reference to FIG. 8A.

Figure 5A:
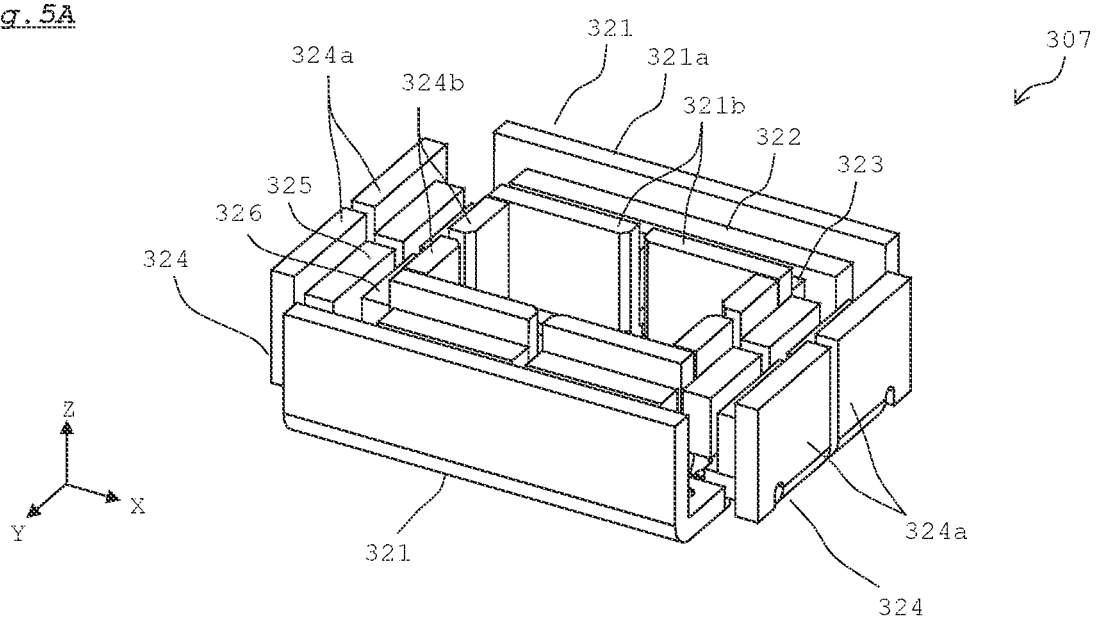
FIG. 5A is a perspective view showing a configuration of a magnetic circuit according to Embodiment 1.

FIG. 5A is a perspective view showing the configuration of the magnetic circuit 307.

The magnetic circuit 307 includes two yokes 321 disposed so as to be aligned in the Y-axis direction. The shapes of the yokes 321 when viewed in the X-axis direction are U shapes. An inner wall portion 321b of each of the two yokes 321 is divided into two portions. A magnet 322 is disposed inward of an outer wall portion 321a of each yoke 321. In addition, magnets 323 are disposed outward of the two inner wall portions 321b of each yoke 321, respectively, so as to face the magnet 322. A gap into which the coil 341 (see FIG. 8A) described later is inserted is formed between the magnet 322 and the magnets 323 facing each other.

The magnetic circuit 307 further includes two yokes 324 disposed so as to be aligned in the X-axis direction. The shapes of the yokes 324 when viewed in the Y-axis direction are U shapes. An outer wall portion 324a of each of the two yokes 324 is divided into two portions, and an inner wall portion 324b of each of the two yokes 324 is also divided into two portions. Magnets 325 are disposed inward of the two outer wall portions 324a of each yoke 324, respectively. In addition, magnets 326 are disposed outward of the two inner wall portions 324b of each yoke 324 so as to face the magnets 325, respectively. A gap into which the coil 341 (see FIG. 8A) described later is inserted is formed between the magnets 325 and the magnets 326 facing each other. An end portion in the Y-axis direction of each magnet 326 overlaps a side surface of the inner wall portion 321b of the adjacent yoke 321.

Figure 5B:
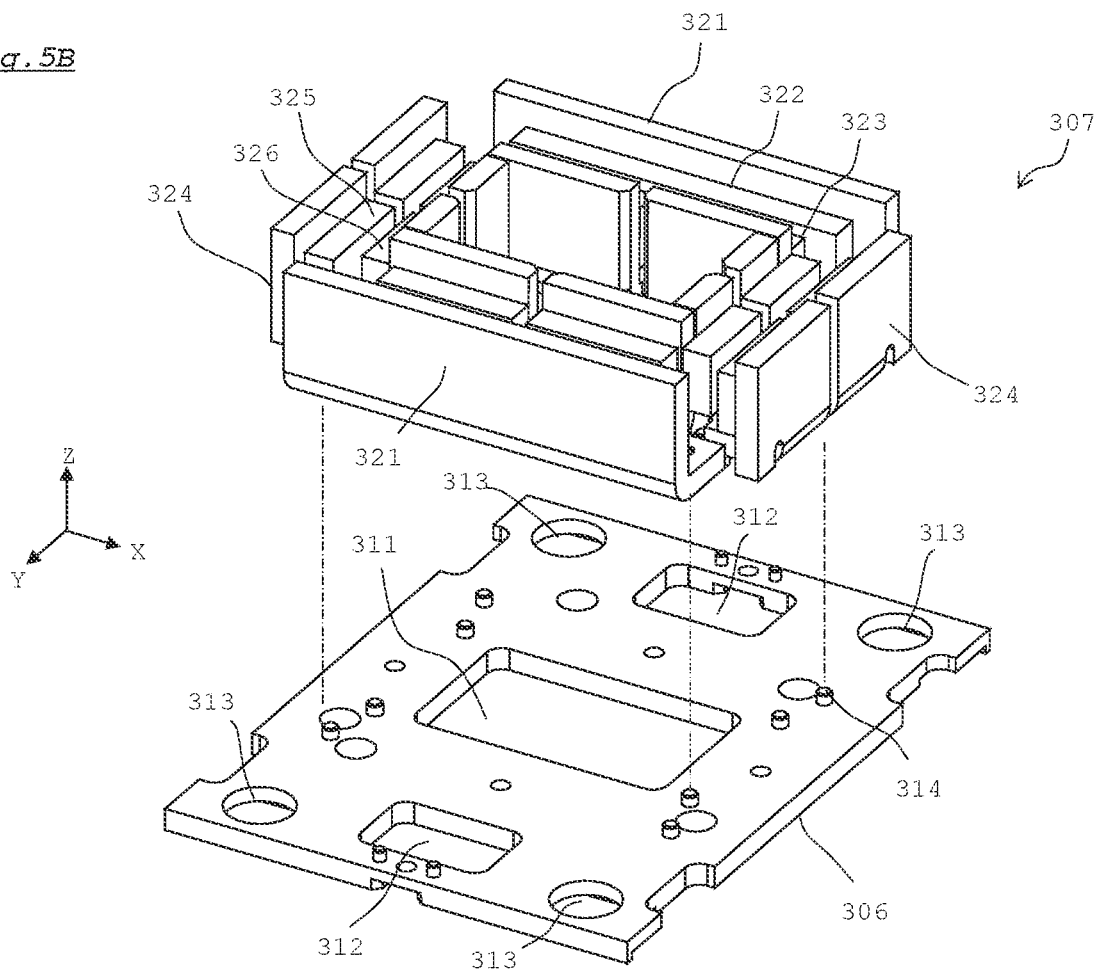
FIG. 5B is a perspective view showing a process of installing the magnetic circuit on a support base according to Embodiment 1.

FIG. 5B is a perspective view showing a process of installing the magnetic circuit 307 on the support base 306.

As shown in FIG. 5B, the support base 306 has a substantially rectangular contour in a plan view. The support base 306 is made of a metal material having high rigidity. An opening 311 for passing laser light therethrough is formed in the center of the support base 306. In addition, circular holes 313 for installing the damper units 309 are formed in the four corners of the support base 306, respectively.

Furthermore, openings 312 for installing the support units 305 are formed in end portions on the Y-axis positive side and the Y-axis negative side of the support base 306 at the center positions thereof in the X-axis direction, respectively. Moreover, a plurality of bosses 314 for positioning the magnetic circuit 307 and the support units 305 are formed on the upper surface (surface on the Z-axis positive side) of the support base 306.

In the lower surfaces of the two yokes 321 and the lower surfaces of the two yokes 324, holes (not shown) are formed at positions at which the bosses 314 of the support base 306 are fitted. The yokes 321 and 324 are installed on the upper surface of the support base 306 such that the bosses 314 are fitted into the holes formed in the lower surfaces of the yokes 321 and 324. Accordingly, the magnetic circuit 307 is installed on the upper surface of the support base 306 as shown in FIG. 4B.

Figure 6A:
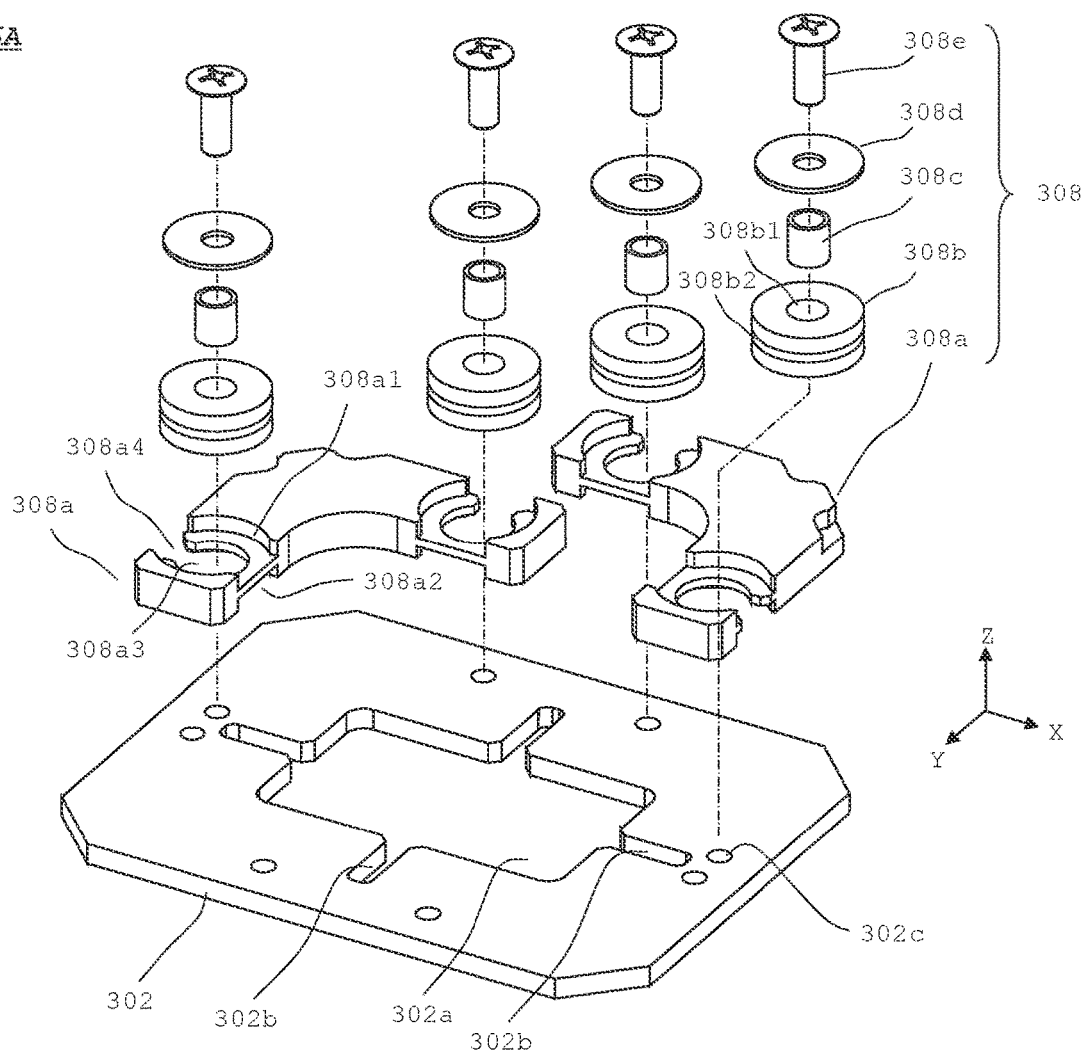
FIG. 6A is an exploded perspective view showing a process of assembling the magnetic cover and dynamic dampers according to Embodiment 1.
Figure 6B:
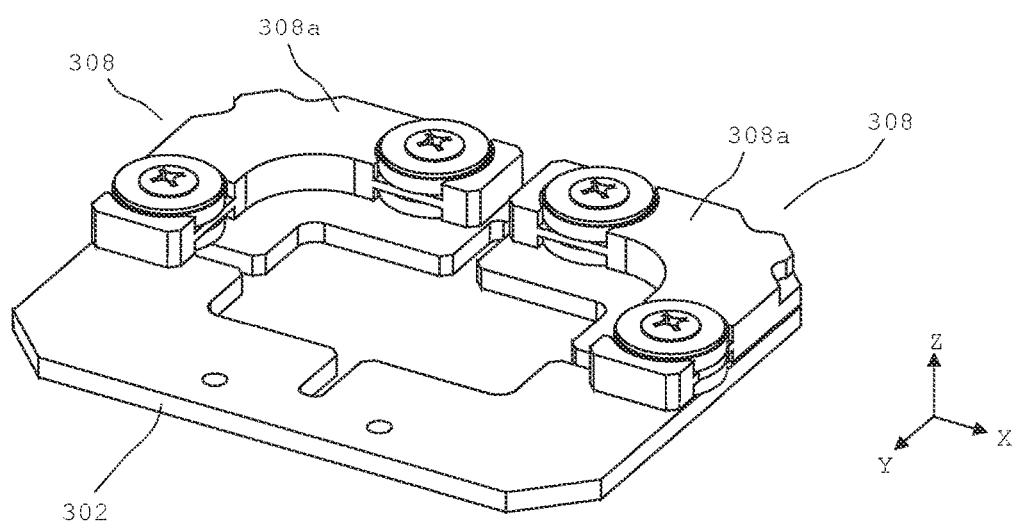
FIG. 6B is a perspective view showing a state where the magnetic cover and the dynamic dampers are assembled, according to Embodiment 1.

FIG. 6A is an exploded perspective view showing a process of assembling the magnetic cover 302 and the dynamic dampers 308. FIG. 6B is a perspective view showing a state where the magnetic cover 302 and the dynamic dampers 308 are assembled.

As shown in FIG. 6A, the dynamic dampers 308 each include a mass member 308a, dampers 308b, sleeves 308c, and screws 308e.

Each mass member 308a is made of a material having a high specific gravity such as metal. In the present embodiment, since the dynamic dampers 308 are installed on the upper surface of the magnetic cover 302, each mass member 308a is made of a non-magnetic metal material such as brass, zinc, or copper in order to avoid affecting the magnetic circuit 307. Each mass member 308a has a shape along a diagonal portion of the magnetic cover 302 in a plan view. The mass members 308a have the same shape. The materials and the masses of the two mass members 308a are equal to each other.

Each mass member 308a has circular recesses 308a1 on the upper surface at both ends thereof, and also has circular recesses 308a2 on the lower surface at both ends thereof. The recesses 308a1 and 308a2 all have the same shape. Each of the diameters of the recesses 308a1 and 308a2 is larger than the width in the plane direction of the mass member 308a. Therefore, the lateral sides of the recesses 308a1 and 308a2 are open. The recesses 308a1 and 308a2 aligned vertically are located coaxially. A circular opening 308a3 is formed so as to penetrate the recesses 308a1 and 308a2 aligned vertically. The opening 302a is also coaxial with the recesses 308a1 and 308a2 aligned vertically. A cutout 308a4 is formed on the lateral side of the opening 302a.

Each damper 308b is integrally formed of a material having excellent vibration-damping properties. For example, each damper 308b is formed from a material having large viscous damping such as alpha gel and rubber. On the outer periphery of each damper 308b, a groove 308b2 is formed at the center position in the thickness direction over the entire circumference.

Each damper 308b is mounted on an end portion of the mass member 308a such that the inner peripheral portion of the opening 308a3 is fitted to the groove 308b2, and the upper portion and the lower portion of the damper 308b are fitted to the recesses 308a1 and 308a2, respectively. At this time, the damper 308b is pushed from the cutout 308a4 of the mass member 308a toward the opening 308a3. Thereafter, the cylindrical sleeve 308c is fitted into a hole 308b1 formed at the center of the damper 308b. In this manner, the two dampers 308b are mounted on both ends of the mass member 308a.

The thickness of each damper 308b is larger than the thickness of the mass member 308a. Therefore, in a state where the damper 308b is mounted on the mass member 308a, the upper end and the lower end of the damper 308b protrude from the upper surface and the lower surface of the mass member 308a. The length in the Z-axis direction of each sleeve 308c is shorter than the thickness of the damper 308b, and the damper 308b is compressed such that the thickness thereof is equal to the length of the sleeve 308c in a state where the damper 308b is fixed by the screw 308e.

In addition to the above-described opening 302a and slits 302b, screw holes 302c for fastening the screws 308e are formed in the magnetic cover 302. After the two dampers 308b are mounted on both ends of the mass member 308a as described above, the sleeves 308c are mounted into the holes 308b1 of the dampers 308b. Thereafter, washers 308d are placed on the upper surfaces of the dampers 308b, and the screws 308e are fastened to the screw holes 302c of the magnetic cover 302 via the washers 308d and the sleeves 308c. Accordingly, the two dynamic dampers 308 are mounted on the magnetic cover 302 as shown in FIG. 6B.

As described above, the upper end and the lower end of each damper 308b protrude from the upper surface and the lower surface of the mass member 308a. Therefore, in the state of FIG. 6B, the two mass members 308a are raised from the upper surface of the magnetic cover 302.

Figure 7:
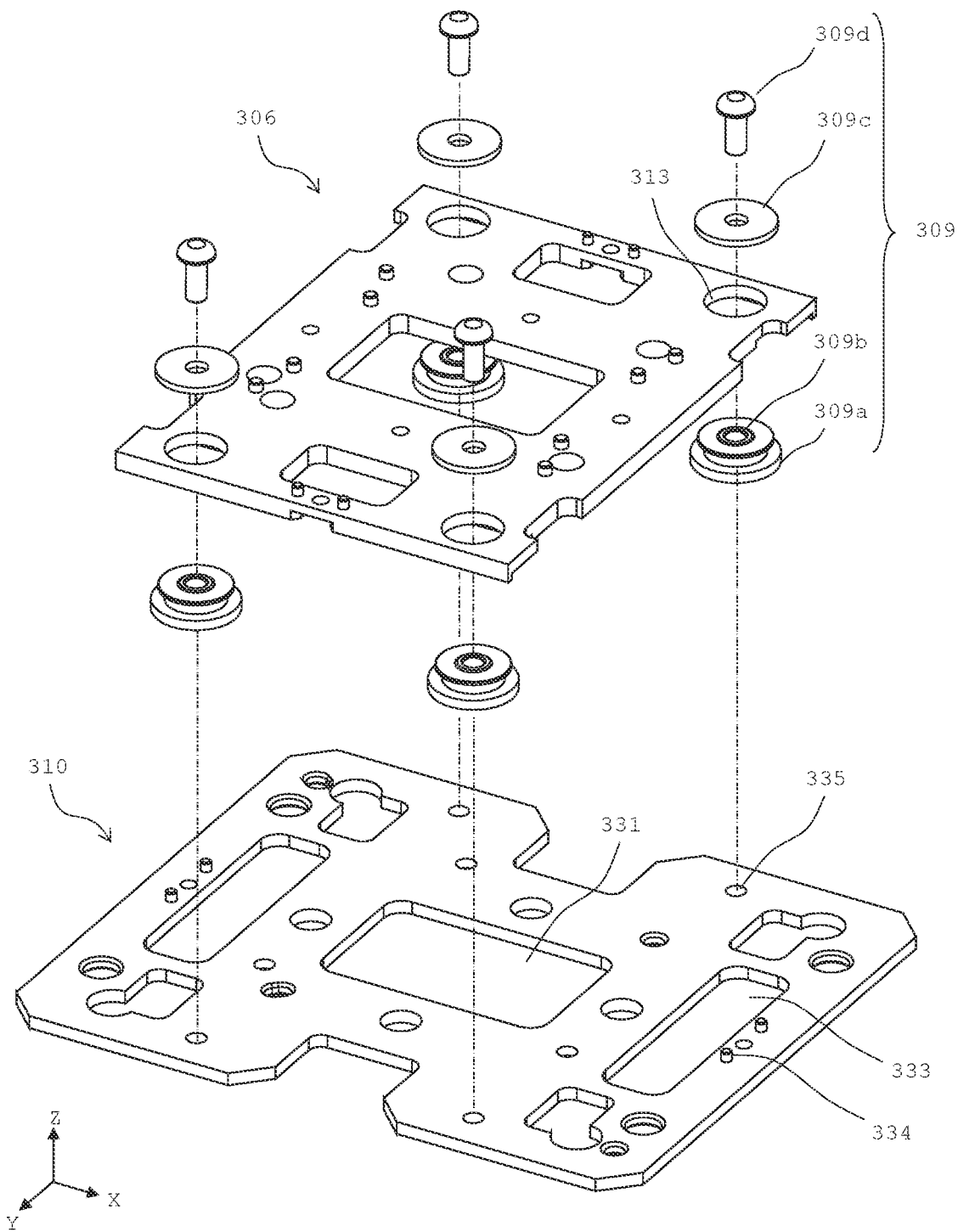
FIG. 7 is an exploded perspective view showing a process of assembling the support base and a fixed base according to Embodiment 1.

FIG. 7 is an exploded perspective view showing a process of assembling the support base 306 and the fixed base 310.

As shown in FIG. 7, the damper units 309 each include a damper 309a, a sleeve 309b, a washer 309c, and a screw 309d. The fixed base 310 has an opening 331 for passing laser light therethrough, screw holes 335 for screwing the screws 309d, an opening 333 for installing the position detection unit 400, and bosses 334 for positioning the position detection unit 400. The fixed base 310 is integrally formed of a metal material having high rigidity.

Each damper 309a is integrally formed from a material having excellent vibration-damping properties. For example, the damper 309a is formed from a material having large viscous damping such as alpha gel and rubber. The cylindrical sleeve 309b is fitted into a hole formed at the center of the damper 309a. The dampers 309a are fitted into the holes 313 formed in the four corners of the support base 306, respectively. In this state, the washers 309c are placed on the upper surfaces of the dampers 309a. Furthermore, the screws 309d are inserted into the washers 309c and screwed to the screw holes 335 of the fixed base 310. Accordingly, the support base 306 is supported by the fixed base 310 via the dampers 309a.

Figure 8A:
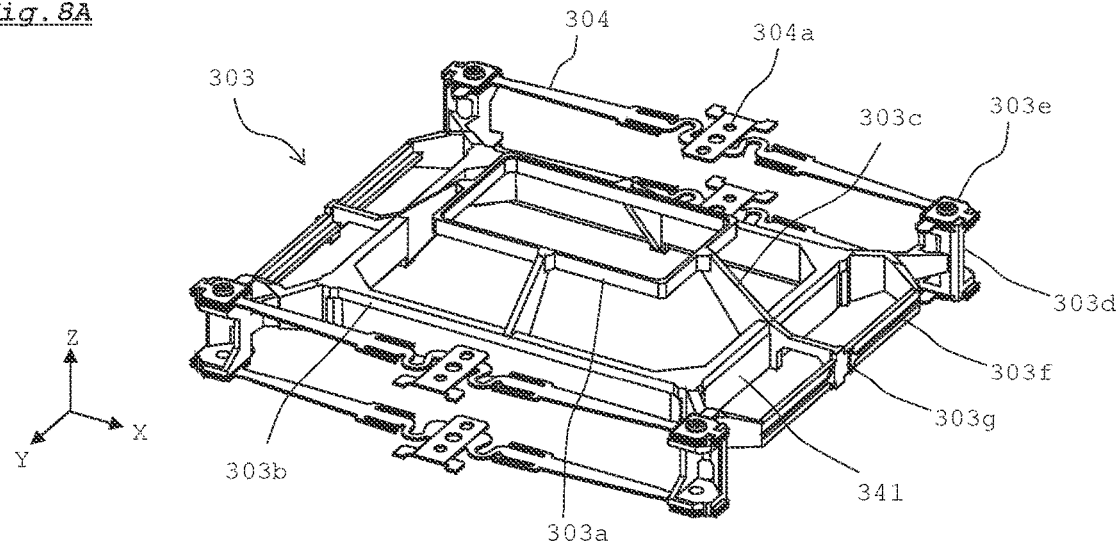
FIG. 8A is a perspective view showing a configuration according to Embodiment 1 in a state where the support member and suspensions are assembled.
Figure 8B:
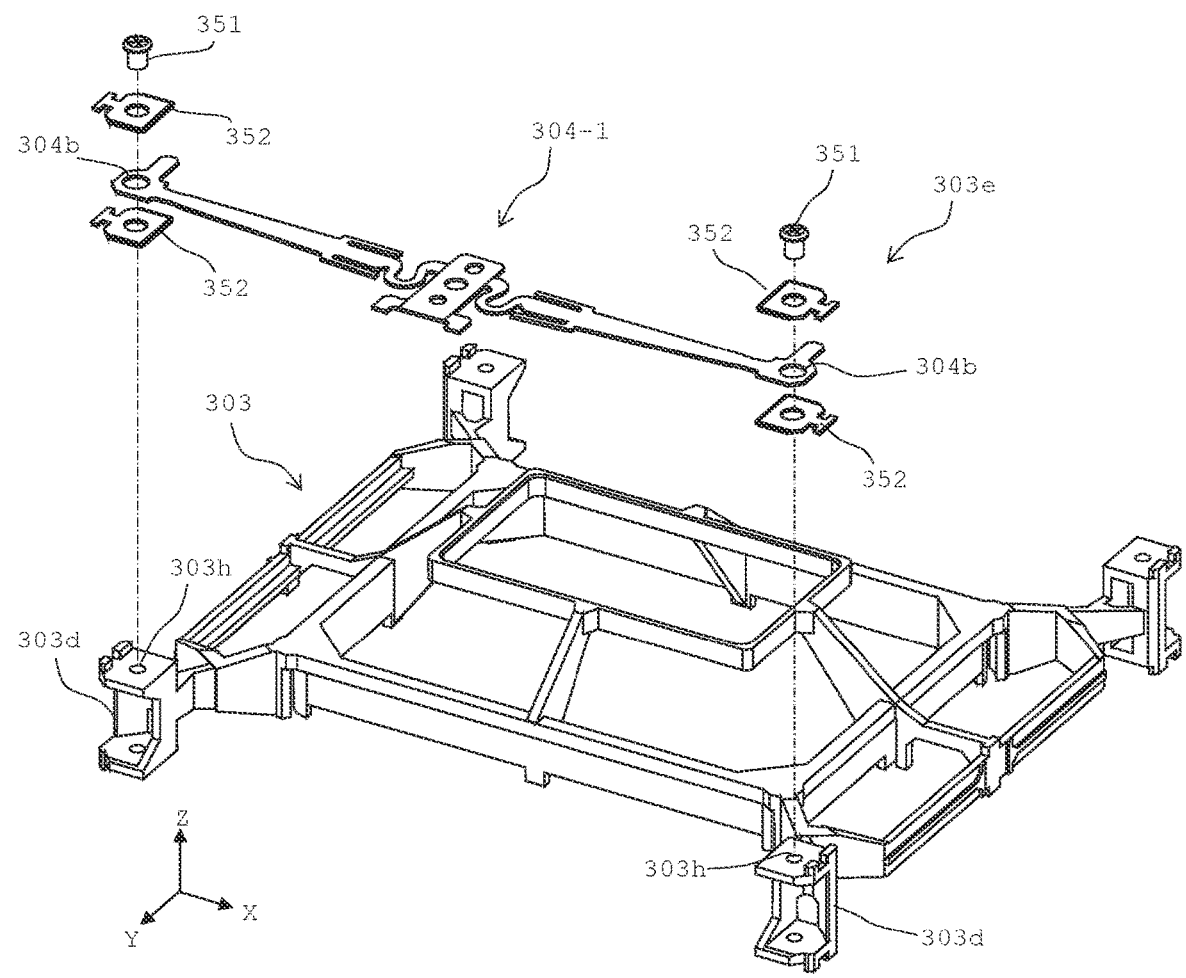
FIG. 8B is an exploded perspective view of a structure for mounting the suspensions on the support member according to Embodiment 1.

FIG. 8A is a perspective view showing a configuration in a state where the support member 303 and the suspensions 304 are assembled. FIG. 8B is an exploded perspective view showing a structure for mounting the suspensions 304 on the support member 303.

As shown in FIG. 8A, the support member 303 has a frame-like shape. The support member 303 is formed from a material that is lightweight and has high rigidity. For example, the support member 303 is formed from a liquid crystal polymer containing a carbon filler. The support member 303 is formed from a non-magnetic material such as resin. The support member 303 includes the inner frame portion 303a and an outer frame portion 303b each of which has a substantially rectangular shape in a plan view. The inner frame portion 303a and the outer frame portion 303b are connected by the four beam portions 303c such that the center of the inner frame portion 303a and the center of the outer frame portion 303b coincide with each other in a plan view. The inner frame portion 303a is raised to a position shifted upward (in the Z-axis positive direction) with respect to the outer frame portion 303b.

The holding part 301 shown in FIG. 4A is installed on the upper surface of the inner frame portion 303a. In addition, the coil 341 is mounted on the lower surface of the outer frame portion 303b. The coil 341 extends around along the lower surface of the outer frame portion 303b in a rectangular shape with rounded corners.

Connection portions 303d are formed at the corners of the outer frame portion 303b so as to extend radially. Each of these connection portions 303d has flange portions at an upper end and a lower end thereof, respectively. An end portion of the suspension 304 on the upper side is fixed to the upper surface of the upper flange portion of the connection portion 303d by a fixture 303e. In addition, an end portion of the suspension 304 on the lower side is fixed to the lower surface of the lower flange portion of the connection portion 303d by a fixture 303e. Thus, the suspensions 304 are mounted on the support member 303.

As shown in FIG. 8B, each fixture 303e includes a screw 351 and two plate-shaped clampers 352. The upper and lower surfaces of each of the two clampers 352 are subjected to an oxidization treatment for insulation. In addition, these clampers 352 are each provided with a hole at the center thereof. The diameter of a shaft portion of the screw 351 is smaller than the diameter of the hole of the clamper 352 and the diameter of a hole 304b of the suspension 304. Moreover, the hole 304b of the suspension 304 is larger than the diameter of the hole of the clamper 352.

An end portion of the suspension 304 is sandwiched between the two clampers 352 such that the hole 304b of the suspension 304 and the holes of the clampers 352 are coaxial with each other. In this state, the end portion of the suspension 304 is placed on the upper surface of the connection portion 303d of the support member 303, and the screw 351 is screwed to a screw hole 303h of the connection portion 303d. Accordingly, the end portion of the suspension 304 is fixed to the upper surface of the connection portion 303d of the support member 303. Similarly, the suspension 304 on the lower side is also fixed to the lower surface of the connection portion 303d.

As shown in FIG. 8A, the support member 303 further includes bridge portions 303f that connect the connection portions 303d adjacent to each other in the Y-axis direction. A portion of each of the bridge portions 303f other than both ends in the Y-axis direction extend so as to be parallel to the Y-axis direction, and each bridge portion 303f has, at the center of this portion, an installation surface 303g parallel to the YZ plane. A scale is installed on the installation surface 303g of the bridge portion 303f on the X-axis positive side of the support member 303.

Each suspension 304 has a mounting portion 304a for mounting the suspension 304 on the support unit 305, at the center position in the X-axis direction. By the mounting portions 304a being mounted on the support units 305 in FIG. 4B, the two suspensions 304 on the Y-axis positive side and the two suspensions 304 on the Y-axis negative side are supported by the support units 305 as shown in FIG. 4B. Accordingly, the coil 341 mounted on the lower surface of the outer frame portion 303b is inserted into the gaps between magnets, facing each other, of the magnetic circuit 307 shown in FIG. 5A. The scale installed on the installation surface 303g of the bridge portion 303f on the X-axis positive side of the support member 303 faces the encoder installed on the printed board 401 of the position detection unit 400.

The encoder of the position detection unit 400 is composed of an optical sensor that irradiates the scale with light and receives reflected light from the scale, and optically detects movement of the scale in the Z-axis direction by the optical sensor. The positions in the Z-axis direction of the support member 303 and the screens 108 and 109 are detected on the basis of a detection signal from the encoder. Accordingly, the drive of the screens 108 and 109 is controlled.

Figure 9A:
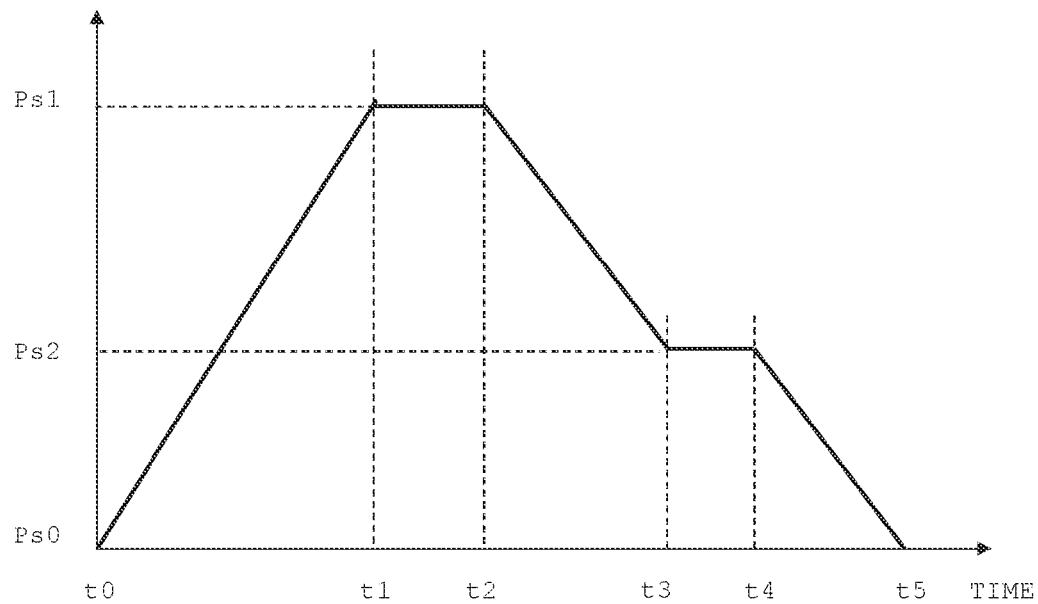
FIG. 9A is a graph showing an example of driving the screen according to Embodiment 1.
Figure 9B:
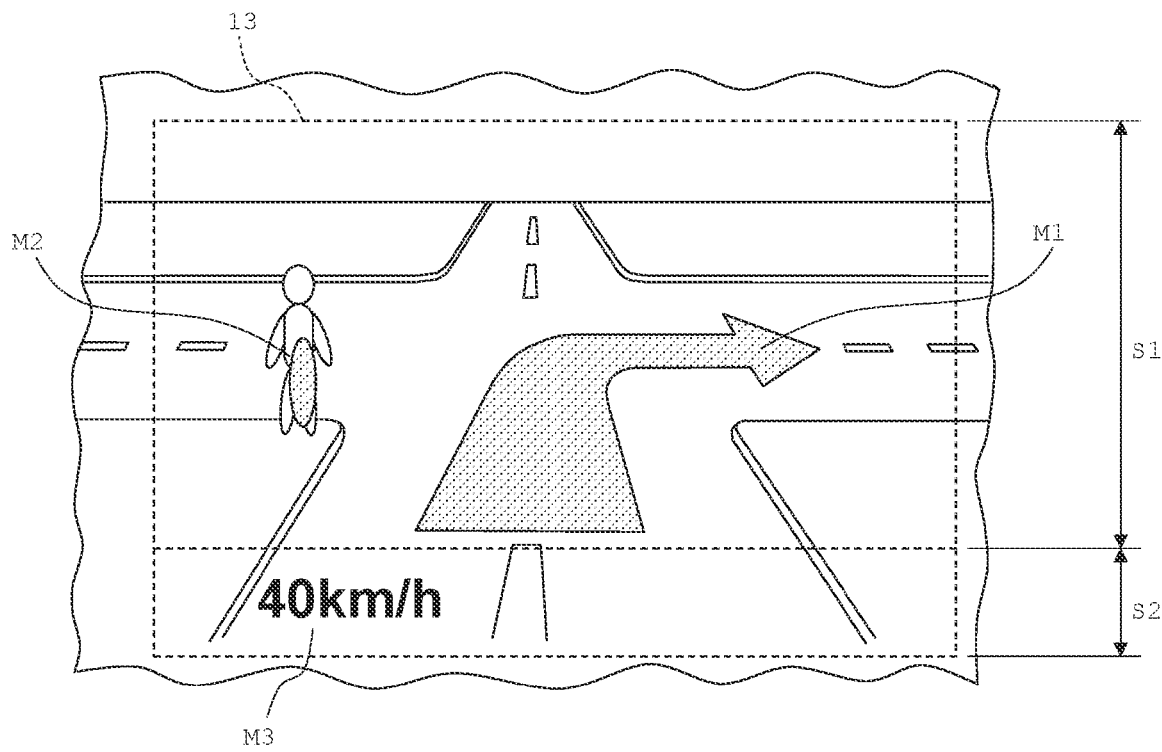
FIG. 9B is a diagram schematically showing an example of displaying an image according to Embodiment 1.

FIG. 9A is a graph showing an example of driving the screen 108 when displaying an image shown in FIG. 9B in a region S1 in FIG. 9B. In the present embodiment, the screen 108 and the screen 109 integrally move.

Movement of the screen 108 is repeated with times t0 to t5 as one cycle. In the period from time t0 to time t1, the screen 108 is moved from a position Ps0 (farthest position) to a position Ps1 (closest position). In the period from time t2 to time t5, the screen 108 is returned from the position Ps1 (closest position) to the position Ps0 (farthest position). In the period from time t1 to time t2, the screen 108 is stopped at the position Ps1 (closest position). The movement cycle of the screen 108, that is, the period from time t0 to time t5, is 1/60 seconds, for example. The screen 108 is moved as shown in FIG. 9A by changing the current to be applied to the above-described coil 341 while monitoring the output of the encoder of the position detection unit 400.

The period from time t0 to time t1 is a period for displaying a depth image M1 spreading in the depth direction in FIG. 9B, and the period from time t2 to time t5 is a period for displaying a vertical image M2 spreading in the vertical direction in FIG. 9B. The period from time t1 to time t2 is a period for displaying a fixed image M3 in a region S2 in FIG. 9B.

In the period from time t0 to time t1, while the screen 108 is linearly moved from the position Ps0 to the position Ps1, the laser light sources 101a to 101c are caused to emit light at the timing corresponding to the depth image M1 on the scanning line corresponding to the depth image M1, whereby the depth image M1 shown in FIG. 9B is displayed as a virtual image in the region S1.

In the period from time t1 to time t2, the screen 108 is stopped at the position Ps1. Accordingly, the screen 109 for a fixed image is stopped at the display position of the fixed image M3. In this period, the laser light sources 101a to 101c are caused to emit light at the timing corresponding to the fixed image M3 on the scanning line corresponding to the fixed image M3, whereby the fixed image M3 is displayed in the region S2 in front of the projection region 13.

In the period from time t2 to time t5, the screen 108 is returned to the position Ps0. In this period, the screen 108 is stopped at a position Ps2 during the period from time t3 to time t4. In this period, the laser light sources 101a to 101c are caused to emit light at the timing corresponding to the vertical image M2 on the scanning line corresponding to the vertical image M2, whereby the vertical image M2 shown in FIG. 9B is displayed in front of the projection region 13 of the windshield 12.

Next, the action of the dynamic dampers 308 will be described.

Figure 10A:
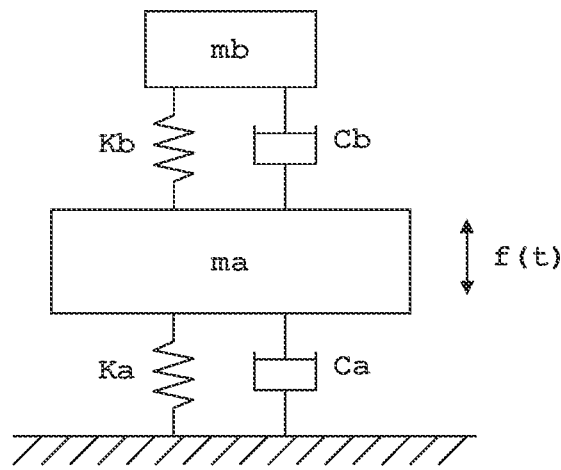
FIG. 10A is a diagram showing a drive model of a screen drive system according to Embodiment 1.

FIG. 10A is a diagram showing a drive model of a screen drive system.

In FIG. 10A, ma is the mass of a structure including the actuator 300 and the support base 306, and mb is the mass of the dynamic dampers 308 (mass members 308a) mounted on the magnetic cover 302. Ka and Ca are the spring constant and viscosity coefficient of the damper units 309, respectively, and Kb and Cb are the spring constant and the viscosity coefficient of the dynamic dampers 308 (dampers 308b), respectively. Here, the two dynamic dampers 308 are integrated and shown, and the four damper units 309 are integrated and shown.

In this drive model, by adjusting the mass mb, the spring constant Kb, and the viscosity coefficient Cb of the dynamic dampers 308, the dynamic dampers 308 can be caused to absorb vibration energy of the structure having the mass ma in a desired frequency band. Accordingly, resonance of the structure can be suppressed.

Figure 10B:
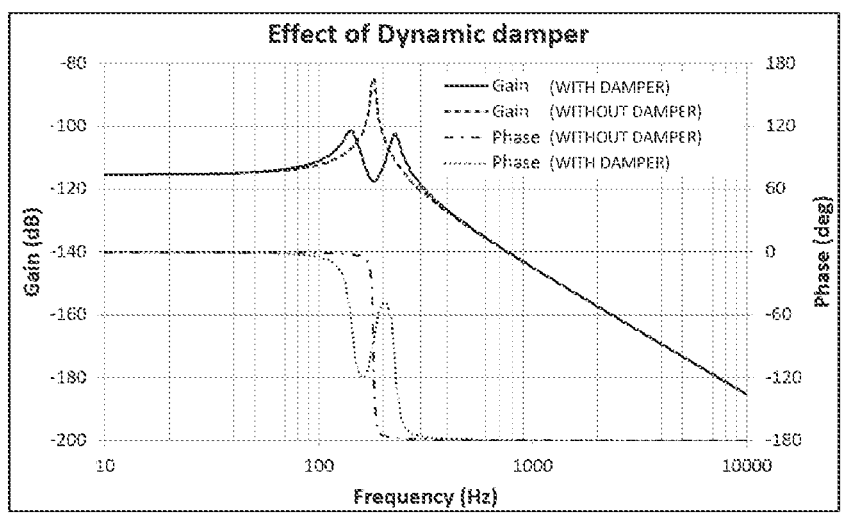
FIG. 10B and FIG. 10C are graphs showing simulation results of gain characteristics and phase characteristics when the drive model of FIG. 10A is driven, according to Embodiment 1.
Figure 10C:
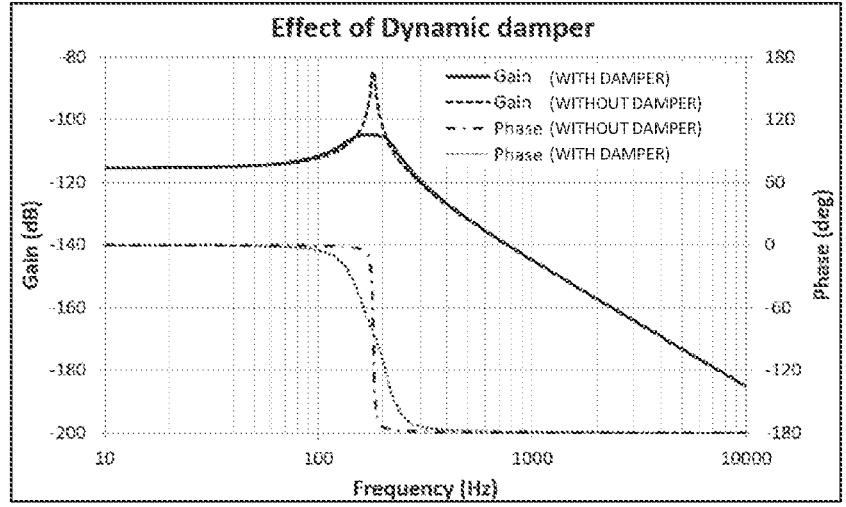

FIG. 10B and FIG. 10C show simulation results obtained by simulating the vibration-damping action by the dynamic dampers 308.

The simulation results of FIG. 10B are based on the following conditions.

TABLE 1

| Item | Unit | Value |
| --- | --- | --- |
| ma | Kg | 0.464 |
| fa | Hz | 180 |
| Ka | N/m | 593503 |
| Ca | Ns/m | 10 |
| mb | Kg | 0.1 |
| fb | Hz | 180 |
| Kb | N/m | 127910 |
| Cb | Ns/m | 20 |

The simulation results of FIG. 10C are based on the following conditions.

TABLE 2

| Item | Unit | Value |
| --- | --- | --- |
| ma | Kg | 0.464 |
| fa | Hz | 180 |
| Ka | N/m | 593503 |
| Ca | Ns/m | 10 |
| mb | Kg | 0.07 |
| fb | Hz | 180 |
| Kb | N/m | 89537 |
| Cb | Ns/m | 50 |

In Tables 1 and 2, fa is the resonance frequency of the structure, and fb is the resonance frequency of the dynamic dampers 308. The other Items are the same as the items shown in FIG. 10A.

FIG. 10B and FIG. 10C show the gain characteristics and the phase characteristics of the structure in the case with the dynamic dampers 308 and in the case without the dynamic dampers 308. In FIG. 10B and FIG. 10C, the horizontal axis indicates the vibration frequency applied for the structure, and the vertical axis indicates the gain and the phase.

As shown in FIG. 10B, by adjusting the parameter values of the dynamic dampers 308, the peak gain at the resonance point can be reduced. However, in the simulation results of FIG. 10B, in the gain characteristics in the case where the dynamic dampers 308 are mounted, the gain on both sides of the resonance point slightly rises, generating two small peaks. Thus, it is necessary to further optimize the parameter values of the dynamic dampers 308.

On the other hand, when the parameter values of the dynamic dampers 308 are corrected as in Table 2 shown above, the gain peaks on both sides of the resonance point can be eliminated as shown in FIG. 10C. Here, a small gain peak occurs near the resonance point, but the gain value of the peak is reduced to be lower than the gain values of the two peaks in the case of FIG. 10B. From this, it can be understood that vibration of the structure can be effectively suppressed in the target frequency band by optimizing the parameter values of the dynamic dampers 308.

<Verification>

For the screen drive mechanism shown in FIG. 4A, the inventors experimentally verified the vibration-damping action by the dynamic dampers 308. Here, one of the two dynamic dampers 308 was omitted, and only one dynamic damper 308 was installed on the magnetic cover 302. The structure including the actuator 300 and the support base 306 was vibrated while changing the applied vibration frequency, the displacement of the structure at each applied vibration frequency was obtained by measurement based on laser Doppler, and the gain was obtained. The verification conditions were set as follows.

TABLE 3

| Item | Unit | Value |
| --- | --- | --- |
| ma | Kg | 0.464 |
| fa | Hz | 125 |
| Ka | N/m | 286219 |
| Ca | Ns/m | 100 |
| mb | Kg | 0.0214 |
| fb | Hz | 125 |
| Kb | N/m | 12500 |
| Cb | Ns/m | 20 |

TABLE 4

| Item | Unit | Value |
| --- | --- | --- |
| ma | Kg | 0.464 |
| fa | Hz | 235 |
| Ka | N/m | 1011611 |
| Ca | Ns/m | 150 |
| mb | Kg | 0.0124 |
| fb | Hz | 235 |
| Kb | N/m | 37000 |
| Cb | Ns/m | 5 |

Figure 11A:
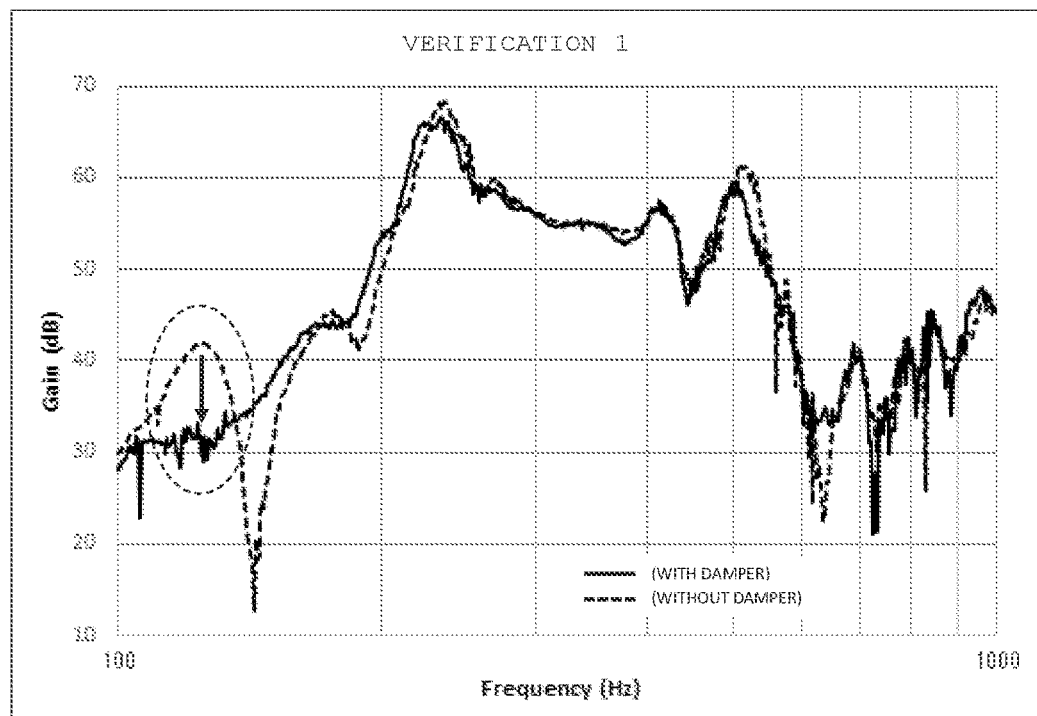
FIG. 11A and FIG. 11B are graphs showing verification results of verifying the vibration-damping action by the dynamic damper according to Embodiment 1.
Figure 11B:
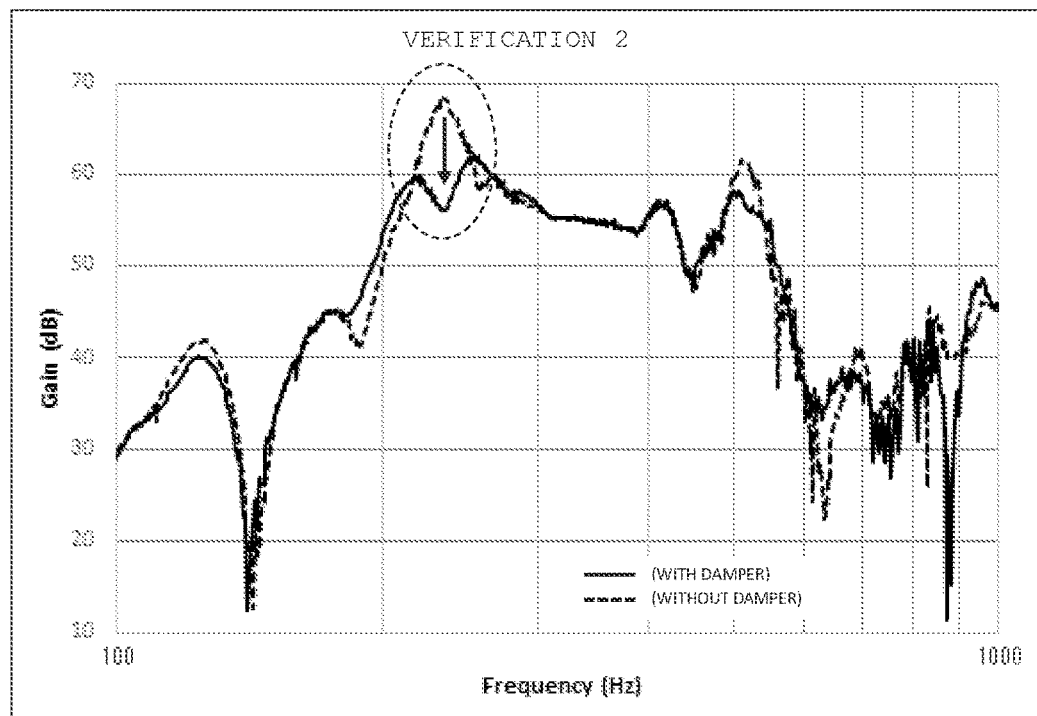

FIG. 11A is a diagram showing the gain characteristics in the case where the parameter values in Table 3 were set as the parameter values of the dynamic damper 308. FIG. 11B is a diagram showing the gain characteristics in the case where the parameter values in Table 4 were set as the parameter values of the dynamic damper 308. In FIG. 11A and FIG. 11B, the graph by the broken line shows the gain characteristics in the case where the dynamic damper 308 was not mounted, and the graph by the solid line shows the gain characteristics in the case where the dynamic damper 308 was mounted.

As shown in FIG. 11A, when the dynamic damper 308 having the parameter values in Table 3 was installed on the structure, the gain peak around 130 Hz was able to be reduced. In addition, as shown in FIG. 11B, when the dynamic damper 308 having the parameter values in Table 4 was installed on the structure, the gain peak around 230 Hz was able to be reduced. Therefore, from these verifications, it was confirmed that vibration of the structure can be suppressed in a pinpoint manner in a predetermined frequency band by installing the dynamic damper 308 on the structure.

In the present embodiment, by driving the movable part including the holding part 301, the support member 303, and the coil 341 in the Z-axis direction, the structure including the actuator 300 and the support base 306 vibrates. Here, when the movable part is driven at 60 Hz so as to include the stop period as shown in FIG. 9A, the structure vibrates around 60 to 500 Hz. Therefore, in the present embodiment, it can be said that it is sufficient if vibration of the structure can be suppressed around 60 to 500 Hz.

On the other hand, in the verifications of FIG. 11A and FIG. 11B, the gain peak around 130 Hz and the gain peak around 230 Hz are reduced by mounting the dynamic damper 308 on the structure. Therefore, it can be said that the dynamic damper 308 having the parameter values in Table 3 or 4 effectively acts on vibration-damping of the screen drive mechanism according to the present embodiment.

In each of the verifications of FIG. 11A and FIG. 11B, one dynamic damper 308 was used. However, by using a plurality of dynamic dampers 308 having resonance frequencies different from each other, vibration of the structure including the actuator 300 and the support base 306 can be suppressed in a plurality of frequency bands different from each other. For example, by using a plurality of dynamic dampers 308 having resonance frequencies different from each other, both the gain peak around 130 Hz and the gain peak around 230 Hz shown in FIG. 11A and FIG. 11B can be reduced. By using a plurality of dynamic dampers 308 having resonance frequencies different from each other as described above, vibration-damping of the structure can be realized more effectively.

Effects of Embodiment 1

According to Embodiment 1, the following effects are achieved.

As shown in FIG. 4A, the image display apparatus 20 includes the actuator 300 that moves the screens 108 and 109 in the optical axis direction, the support base 306 that supports the actuator 300, and the dynamic dampers 308 that are installed on a non-movable part (magnetic cover 302) on the support base 306. Accordingly, vibration energy of the structure obtained by integrating the actuator 300 and the support base 306 is absorbed by the dynamic dampers 308. Thus, as shown in FIG. 11A and FIG. 11B, movement of the structure can be suppressed in the target frequency band of the dynamic dampers 308, so that reaction from the structure can be inhibited from being applied to another member such as a casing. As a result, vibration of the other member such as a casing can be reduced, and resonance in the other member can be suppressed.

As shown in FIG. 4A, the magnetic circuit 307 includes the magnetic cover 302 that is placed on the upper surface of the magnetic circuit 307 and functions as a yoke for the magnetic circuit 307, and the dynamic dampers 308 are installed on the upper surface of the magnetic cover 302. Accordingly, the dynamic dampers 308 having a desired size can be smoothly installed using a wide area on the upper surface of the magnetic cover 302.

As shown in FIG. 4A, the support base 306 is supported by the fixed base 310 via the damper units 309. Accordingly, vibration is less likely to propagate from the support base 306 to the fixed base 310. Therefore, resonance is less likely to occur in another member that supports the fixed base 310.

As described above, in the present embodiment, the two dynamic dampers 308 having different resonance frequencies can be installed on the non-movable part (magnetic cover 302). Accordingly, vibration of the structure obtained by integrating the actuator 300 and the support base 306 can be suppressed in different frequency bands. Therefore, vibration-damping of the structure can be realized more effectively.

The resonance frequency of each dynamic damper 308 can be adjusted by adjusting the weight of the mass member 308a or the hardness (spring constant, viscosity coefficient) of each damper 308b. Here, in order to enhance the vibration-damping effect, it is preferable that the weight of the mass member 308a is larger. On the other hand, if the weight of the mass member 308a is made different for each dynamic damper 308, the weight balance of the structure tends to be unbalanced. Moreover, since the resonance frequency of each dynamic damper 308 is proportional to the square root of the weight of the mass member 308a, it is necessary to greatly change the weight of the mass member 308a in order to adjust the resonance frequency of the dynamic damper 308.

Therefore, in the case where the resonance frequencies of a plurality of dynamic dampers 308 are made different from each other, it is preferable to uniformly set the weights of the mass members 308a of the respective dynamic dampers 308 and adjust the hardness (spring constant, viscosity coefficient) of each damper 308b. Accordingly, the resonance frequency of each dynamic damper 308 can be smoothly adjusted to be in the target frequency band, and the target vibration-damping action can be easily realized.

Modifications of Embodiment 1

Although Embodiment 1 of the present invention has been described above, the present invention is not limited to Embodiment 1 described above, and various application examples of the present invention can be made in addition to Embodiment 1 described above.

For example, in Embodiment 1 described above, the two dynamic dampers 308 are installed on the non-movable part (magnetic cover 302) of the structure obtained by integrating the actuator 300 and the support base 306, but the number of dynamic dampers 308 installed on the non-movable part is not limited thereto.

Figure 12A:
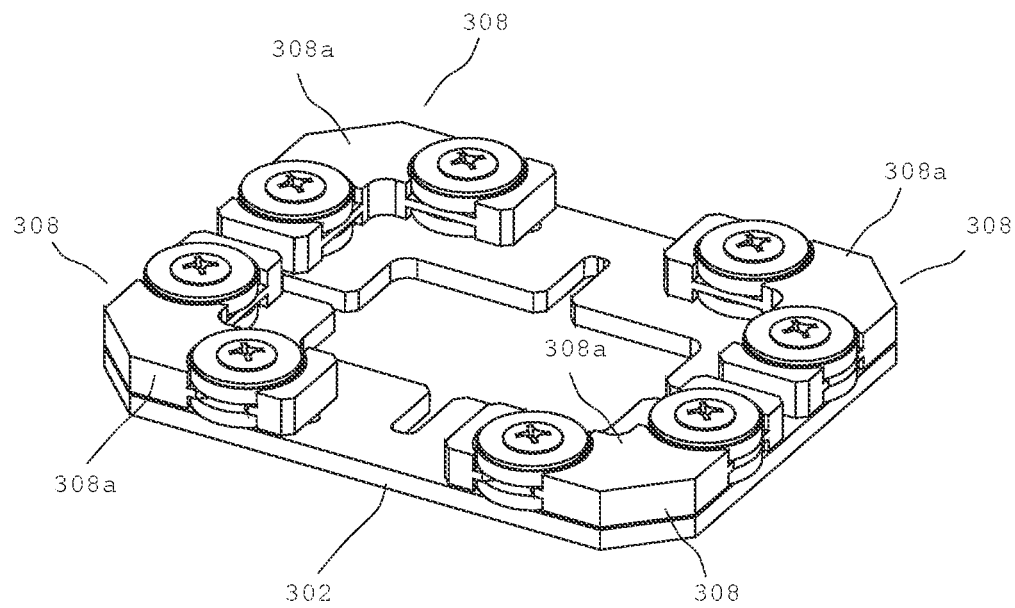
FIG. 12A and FIG. 12B are each a perspective view showing a state where a magnetic cover and dynamic dampers are assembled, according to a modification of Embodiment 1.
Figure 12B:
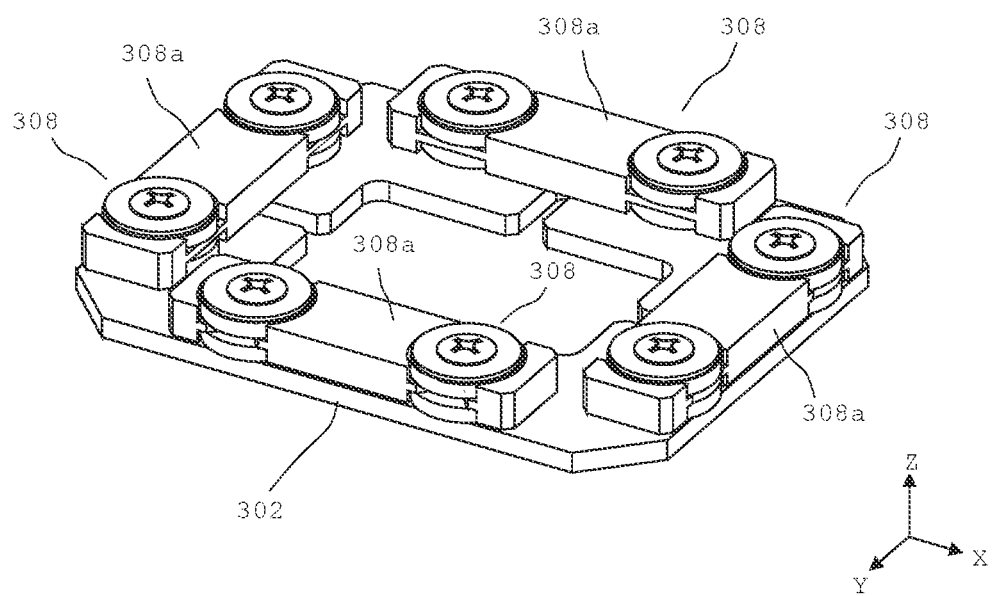

For example, as shown in FIG. 12A and FIG. 12B, four dynamic dampers 308 may be installed on the non-movable part (magnetic cover 302). Accordingly, the number of frequency bands for vibration-damping can be increased, and vibration of the structure can be suppressed more effectively.

The method for disposing the dynamic dampers 308 is not limited to that in Embodiment 1 described above, and may be another disposing method.

Figure 13A:
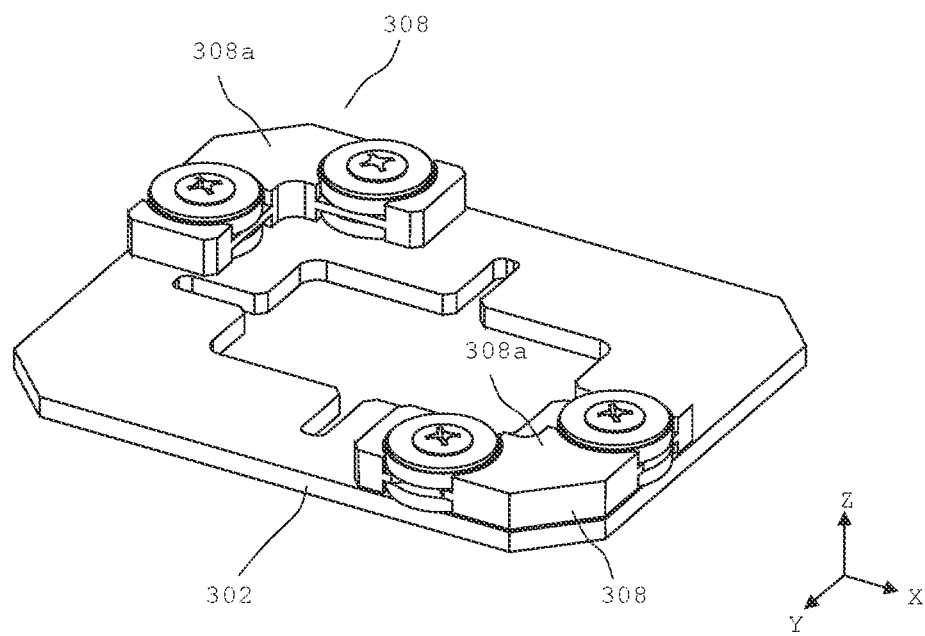
FIG. 13A and FIG. 13B are each a perspective view showing a state where a magnetic cover and dynamic dampers are assembled, according to another modification of Embodiment 1.
Figure 13B:
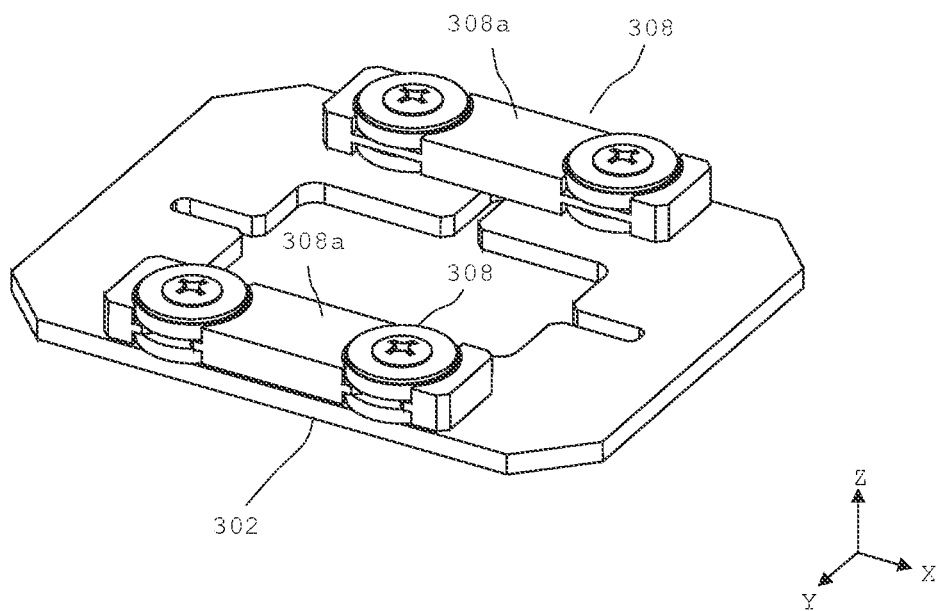

For example, the two dynamic dampers 308 may be disposed at diagonal positions of the magnetic cover 302 as shown in FIG. 13A, or may be disposed at the positions of opposite sides of the magnetic cover 302 as shown in FIG. 13B.

In the disposing methods in FIG. 12A, FIG. 12B, FIG. 13A, and FIG. 13B, the dynamic dampers 308 are installed at positions symmetrical with respect to the center of the magnetic cover 302. Therefore, in these configurations, when the weights of the respective dynamic dampers 308 are equal to each other, the weight balance of the plurality of dynamic dampers 308 is substantially even with respect to the center of the magnetic cover 302. When the weight balance is substantially even as described above, the structure including the actuator 300 and the support base 306 is less likely to move obliquely or rotate along with vibration thereof. Therefore, an image can be displayed more appropriately.

In Embodiment 1 described above, the dynamic dampers 308 are installed on the magnetic cover 302, but the installation target for the dynamic dampers 308 is not limited thereto. For example, the dynamic dampers 308 may be disposed on another non-movable part such as the support base 306 and the magnetic circuit 307. However, since there is a large free space on the upper surface of the magnetic cover 302, the dynamic dampers 308 can be smoothly disposed by using the upper surface of the magnetic cover 302 as the arrangement space, as in the above embodiment.

In the case of disposing a plurality of dynamic dampers 308 on a non-movable part other than the magnetic cover 302, it is preferable to dispose the dynamic dampers 308 at positions symmetrical with respect to the central axis of the support base 306. Accordingly, similar to FIG. 12A, FIG. 12B, FIG. 13A, and FIG. 13B, the structure including the actuator 300 and the support base 306 is less likely to move obliquely or rotate along with vibration thereof. Therefore, an image can be displayed more appropriately.

In the case of disposing a plurality of dynamic dampers 308 on a non-movable part, the resonance frequencies of these dynamic dampers 308 do not necessarily have to be different from each other. In addition, the shapes and the number of dampers 308b disposed in each dynamic damper 308 are not limited to those in Embodiment 1 described above, and can be changed as appropriate. For example, another member such as a coil spring may be used as each damper 308b.

In Embodiment 1 described above, the two screens 108 and 109 are installed on the holder 301a, but the number of screens installed on the holder 301a is not limited to two. For example, only one screen may be installed on the holder 301a, or three screens may be installed on the holder 301a.

The configuration of each dynamic damper is also not limited to the configuration of Embodiment 1 described above. For example, a leaf spring may be used as the member having the spring constant Kb and the viscosity coefficient Cb in FIG. 10A.

FIG. 14 is a perspective view showing a configuration of the actuator 300 according to a modification in this case. In this modification, as compared to the configuration of Embodiment 1 shown in FIG. 4A, the two dynamic dampers 308 are omitted, and a dynamic damper 500 is added.

Figure 15A:
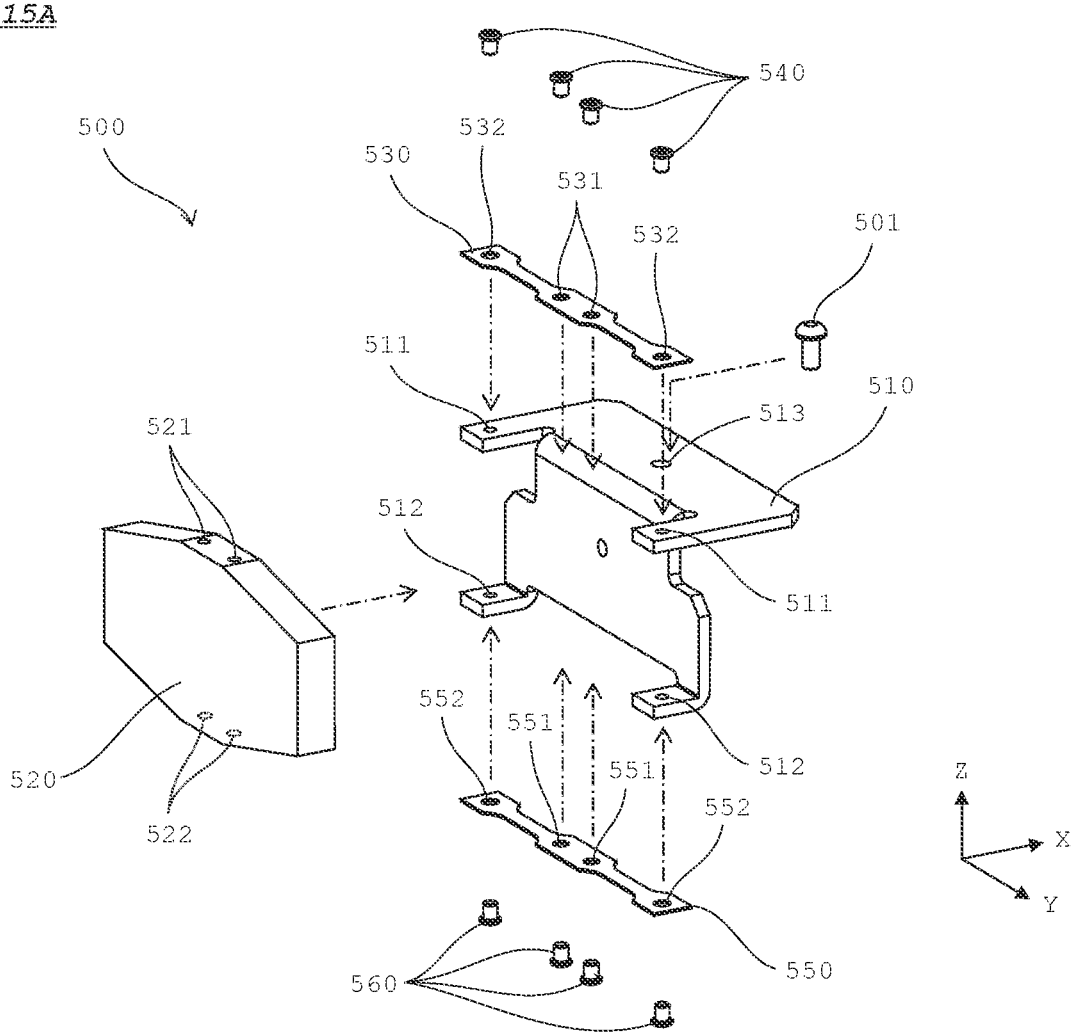
FIG. 15A is an exploded perspective view showing a process of assembling a dynamic damper according to the still other modification of Embodiment 1.

FIG. 15A is an exploded perspective view showing a process of assembling the dynamic damper 500.

The dynamic damper 500 includes a screw 501, a support member 510, a mass member 520, a leaf spring 530, four screws 540, a leaf spring 550, and four screws 560.

The support member 510 is made of a metal material having an L-shape as viewed in the Y-axis direction. Two flange portions are formed at an upper portion of the support member 510 so as to project in the X-axis negative direction, and screw holes 511 are formed in the flange portions. In addition, two flange portions are also formed at a lower portion of the support member 510 so as to project in the X-axis negative direction, and screw holes 512 are formed in the flange portions. Moreover, a hole 513 is formed in the upper surface of the support member 510 so as to penetrate the upper surface of the support member 510 in the Z-axis direction.

The mass member 520 is made of a material having a high specific gravity such as metal. Since the dynamic damper 500 is installed on the upper surface of the magnetic cover 302, the mass member 520 is made of a non-magnetic metal material such as brass, zinc, or copper in order to avoid affecting the magnetic circuit 307. Two screw holes 521 are formed in an upper end portion of the mass member 520, and two screw holes 522 are formed in a lower end portion of the mass member 520.

The two leaf springs 530 and 550 are each made of a metal material extending in the Y-axis direction and having a small thickness in the Z-axis direction. The leaf spring 530 has two holes 531 formed near the center thereof, and has two holes 532 formed near end portions thereof in the Y-axis direction. The leaf spring 550 has two holes 551 formed near the center thereof, and has two holes 552 formed near end portions thereof in the Y-axis direction.

The mass member 520 is positioned on the support member 510 such that the positions of the screw holes 521 and 522 coincide with the positions of the screw holes 511 and 512 of the support member 510 in the X-axis direction. In this state, two of the screws 540 are fastened to the two screw holes 521 of the mass member 520 through the two holes 531 of the leaf spring 530. In addition, the other two screws 540 are fastened to the two screw holes 511 of the support member 510 through the two holes 532 of the leaf spring 530. Similarly, two of the screws 560 are fastened to the two screw holes 522 of the mass member 520 through the two holes 551 of the leaf spring 550. In addition, the other two screws 560 are fastened to the two screw holes 512 of the support member 510 through the two holes 552 of the leaf spring 550.

Then, the screw 501 is fastened to a screw hole provided in the upper surface of the magnetic cover 302, through the hole 513. In this manner, as shown in FIG. 14, the dynamic damper 500 is assembled and installed on the upper surface of the magnetic cover 302.

Figure 15B:
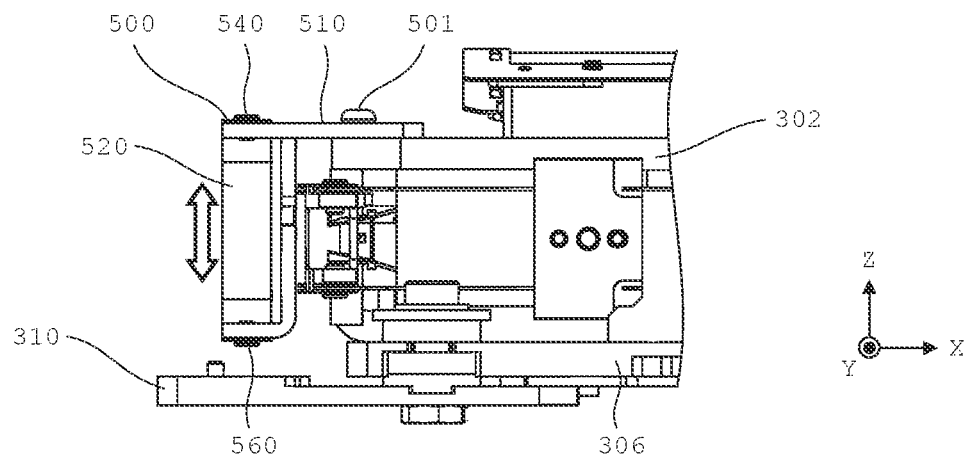
FIG. 15B is a side view of the vicinity of the dynamic damper according to the still other modification of Embodiment 1 as viewed in a Y-axis negative direction.

FIG. 15B is a side view of the vicinity of the dynamic damper 500 as viewed in the Y-axis negative direction.

The mass member 520 of the dynamic damper 500 is installed on the upper surface of the magnetic cover 302 via the support member 510. When the actuator 300 is driven in order to vibrate the screens 108 and 109 vertically, and the structure obtained by integrating the actuator 300 and the support base 306 is vibrated in the up-down direction (Z-axis direction) by the reaction force of this drive, the mass member 520 oscillates in the up-down direction (Z-axis direction) as shown by a hollow arrow in FIG. 15B as the two leaf springs 530 bend in the up-down direction. Accordingly, the vibration energy of the structure obtained by integrating the actuator 300 and the support base 306 is absorbed by the dynamic damper 500.

According to this modification, since the leaf spring 530 is used instead of the dampers 309a, the resonance frequency of the dynamic damper 500 can be easily adjusted by adjusting the length, the thickness, and the shape of the leaf spring 530. Therefore, the resonance frequency of the dynamic damper 500 can be more smoothly adjusted to be in the target frequency band, and the target vibration-damping action can be achieved more effectively.

In this modification, since the space near the side surface of the actuator 300 can be used as a space for disposing the dynamic damper 500, the larger mass member 520 can be used as compared to the case where the dynamic dampers 308 are disposed in the limited space on the upper surface of the magnetic cover 302 as in Embodiment 1 described above. Therefore, intense vibration can be suppressed more effectively.

According to the study by the inventors, it was found that the most annoying noise in the auditory sense in the image display apparatus 20 is around 120 Hz. Therefore, the inventors verified whether it is possible to suppress resonance around 120 Hz by using the dynamic damper 500 shown in FIG. 14.

Figure 16:
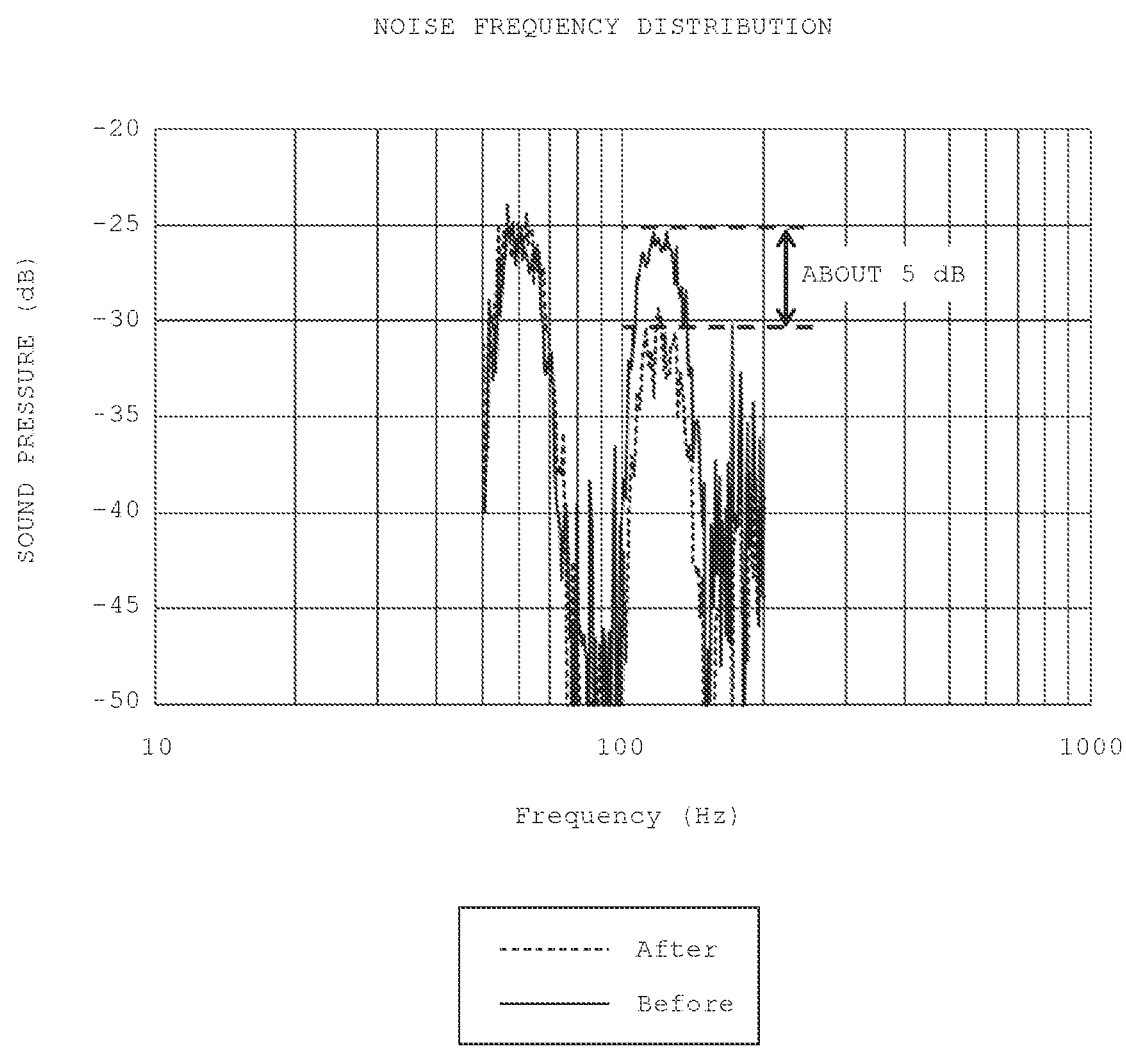
FIG. 16 is a graph showing verification results of verifying the noise suppression action by the dynamic damper according to the still other modification of Embodiment 1.

FIG. 16 is a graph showing the verification results.

In the graph of FIG. 16, the vertical axis indicates the sound pressure obtained by collecting the noise generated when the actuator 300 was driven at the frequency on the horizontal axis with a microphone. The verification conditions are as follows.

TABLE 5

| Item | Unit | Value |
|---|---|---|
| ma | Kg | 0.464 |
| fa | Hz | 120 |
| Ka | N/m | 264000 |
| Ca | Ns/m | 40 |
| mb | Kg | 0.035 |
| fb | Hz | 120 |
| Kb | N/m | 19900 |
| Cb | Ns/m | 15 |

In FIG. 16, the solid line shows a graph of noise when the dynamic damper 500 was omitted from the configuration shown in FIG. 14, and the broken line shows a graph of noise in the configuration of FIG. 14. As shown in FIG. 16, it was confirmed that by using the dynamic damper 500 according to this modification, the noise around 120 Hz can be reduced by about 5 dB, and the noise that is the most annoying in the auditory sense can be suppressed effectively.

Embodiment 2

In Embodiment 2, whether an abnormality has occurred in the movement of the screens 108 and 109 is further detected, and, when an abnormality is detected, control is performed such that application of light to the screens 108 and 109 is prohibited. As described above, the movement of the screens 108 and 109 is detected by the encoder disposed on the printed board 401 (see FIG. 4A) and the scale installed on the installation surface 303g (see FIG. 8A) of the support member 303.

Figure 17:
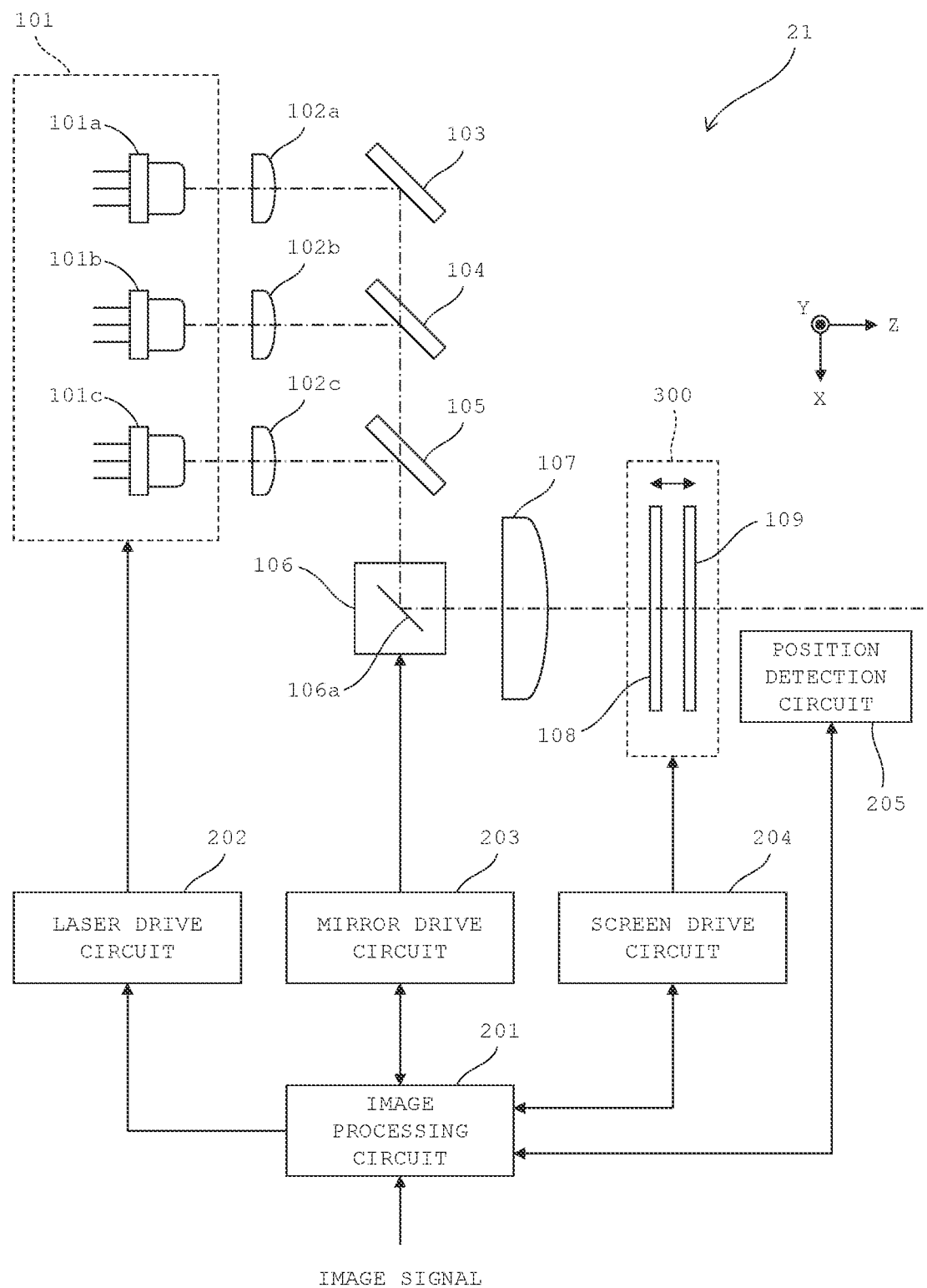
FIG. 17 is a diagram showing configurations of an irradiation light generation part of an image display apparatus according to Embodiment 2 and circuits used for the irradiation light generation part.

As shown in FIG. 17, the irradiation light generation part 21 includes a position detection circuit 205. The position detection circuit 205 detects the position in the Z-axis direction of the screens 108 and 109 on the basis of output from the encoder. The image processing circuit 201 processes an inputted image signal and a signal from the position detection circuit 205 to control the laser drive circuit 202, the mirror drive circuit 203, and the screen drive circuit 204.

FIG. 18A is a schematic diagram of the encoder 410 and the scale 332 as viewed in the Y-axis negative direction. FIG. 18B is a schematic diagram of sensors 412a to 412c and the scale 332 as viewed in the X-axis negative direction.

As shown in FIG. 18A, the encoder 410 includes a light emitting portion 411 and the sensors 412a, 412b, and 412c. The light emitting portion 411 emits light toward the scale 332. The light emitted from the light emitting portion 411 is reflected by the scale 332. The scale 332 moves in the Z-axis direction when the screens 108 and 109 are driven. Thus, the light emitted from the light emitting portion 411 scans the surface on the X-axis positive side of the scale 332.

As shown in FIG. 18B, the scale 332 includes a plate-shaped member 332a and reflection portions 332b and 332c. The plate-shaped member 332a is composed of a member that transmits light, for example, glass. The reflection portions 332b and 332c are each composed of, for example, a film that reflects light. A plurality of reflection portions 332b are provided on the surface on the X-axis positive side of the plate-shaped member 332a so as to be aligned at equal intervals in the Z-axis direction. Only one reflection portion 332c is provided on the surface on the X-axis positive side of the plate-shaped member 332a at the center position in the Z-axis direction of the region where the reflection portions 332b are disposed. The reflection portions 332b and 332c are disposed so as to be adjacent to each other in the Y-axis direction.

The light emitted from the light emitting portion 411 is applied to an irradiation region 413 on the surface on the X-axis positive side of the plate-shaped member 332a. Of the light applied to the irradiation region 413, the light reflected on irradiation regions 413a, 413b, and 413c is received by the sensors 412a, 412b, and 412c, respectively. That is, when the irradiation region 413a overlaps the reflection portion 332b, the sensor 412a detects the light; when the irradiation region 413b overlaps the reflection portion 332b, the sensor 412b detects the light; and when the irradiation region 413c overlaps the reflection portion 332c, the sensor 412c detects the light. The sensors 412a to 412c output signals corresponding to the amounts of the light received.

The position of the irradiation region 413a and the position of the irradiation region 413b are slightly displaced relative to each other in the Z-axis direction. Therefore, when the scale 332 moves in the Z-axis direction, the phases of the light received by the sensors 412a and 412b are different from each other. Therefore, on the basis of the detection signals of the sensors 412a and 412b, it can be determined whether the scale 332 is moving in the Z-axis positive direction or the Z-axis negative direction. In addition, on the basis of the detection signal of the sensor 412c, it can be determined whether the irradiation region 413c has overlapped the reflection portion 332c. The scale 332 is installed on the installation surface of the bridge portion 303f such that, when the irradiation region 413c overlaps the reflection portion 332c, the screens 108 and 109 are positioned at the center (origin position) of the drive range in the Z-axis direction.

FIG. 18C is a diagram schematically showing detection signals of the encoder 410 and multiplication signals generated on the basis of the detection signals of the encoder 410. In FIG. 18C, for convenience, a multiplication number is set to 1. However, the multiplication number is not limited thereto, and may be another multiplication number larger than 1 such as 4.

As shown in FIG. 18C, the phases of the detection signals of the sensors 412a and 412b are shifted relative to each other. Pulsed multiplication signals are generated by the detection signals of the sensors 412a and 412b being multiplied by a multiplication circuit 221 described later. If the multiplication signal of the sensor 412b is high at a timing at which the multiplication signal of the sensor 412a rises, a counter 222 described later determines that the scale 332 (screens 108 and 109) is moving in the Z-axis positive direction. If the multiplication signal of the sensor 412b is low at a timing at which the multiplication signal of the sensor 412a rises, the counter 222 determines that the scale 332 (screens 108 and 109) is moving in the Z-axis negative direction.

Meanwhile, the detection signal of the sensor 412c rises when the screens 108 and 109 are positioned at the origin position. A pulsed multiplication signal is also generated by the detection signal of the sensor 412c being multiplied by the multiplication circuit 221 described later. Therefore, the origin position of the scale 332 (screens 108 and 109) can be detected on the basis of the multiplication signal of the sensor 412c.

Figure 19:
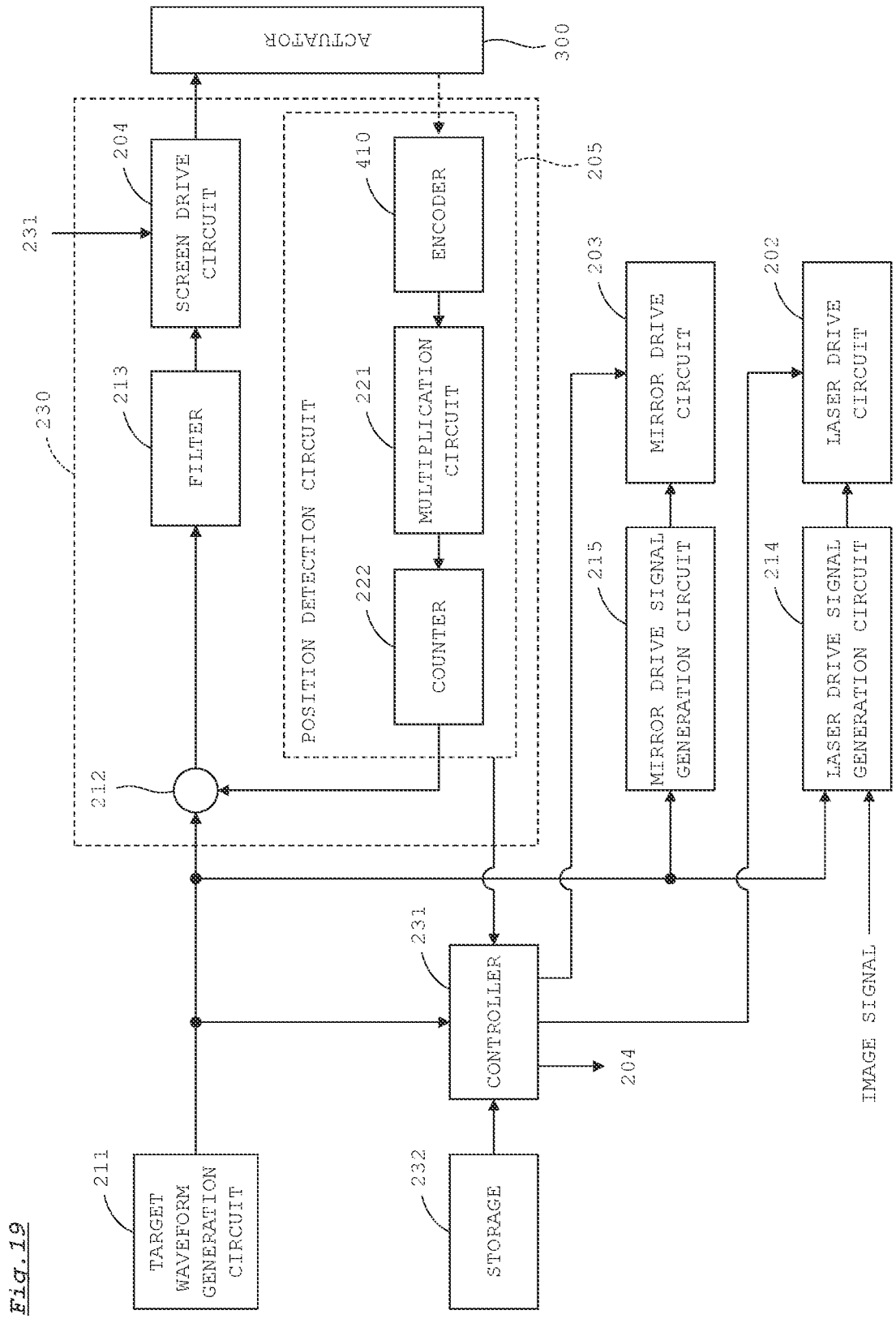
FIG. 19 is a schematic diagram showing a circuit configuration according to Embodiment 2.

FIG. 19 is a schematic diagram showing a circuit configuration of Embodiment 2. In addition to the circuits included in the image processing circuit 201 in FIG. 17, FIG. 19 shows the laser drive circuit 202, the mirror drive circuit 203, the screen drive circuit 204, the position detection circuit 205, and the actuator 300.

As shown in FIG. 19, the image processing circuit 201 (see FIG. 17) includes a target waveform generation circuit 211, a differential circuit 212, a filter 213, the laser drive signal generation circuit 214, the mirror drive signal generation circuit 215, a controller 231, and a storage 232.

The target waveform generation circuit 211 generates a target waveform for driving the screens 108 and 109 along a target position. The differential circuit 212 outputs a signal corresponding to the difference between a signal of the target waveform outputted from the target waveform generation circuit 211 and a signal of a drive waveform outputted from the position detection circuit 205. The filter 213 removes noise components from the signal outputted from the differential circuit 212. The screen drive circuit 204 drives the actuator 300 on the basis of a signal outputted from the filter 213. A circuit in which a current is applied from the screen drive circuit 204 to the coil 341 will be described with reference to FIG. 21A.

The laser drive signal generation circuit 214 generates a signal for driving the laser drive circuit 202, on the basis of an image signal. The laser drive signal generation circuit 214 outputs the generated drive signal to the laser drive circuit 202 in synchronization with the target waveform outputted from the target waveform generation circuit 211. The mirror drive signal generation circuit 215 outputs a signal for driving the mirror drive circuit 203, to the mirror drive circuit 203 in synchronization with the target waveform outputted from the target waveform generation circuit 211.

The position detection circuit 205 includes the multiplication circuit 221 and the counter 222 in addition to the encoder 410 shown in FIG. 18A.

As described above, the encoder 410 irradiates the scale 332, which moves in accordance with movement of the screens 108 and 109, with light, and outputs detection signals of the sensors 412a to 412c. The multiplication circuit 221 converts the detection signals of the sensors 412a to 412c into pulsed binarized signals, further multiplies the binarized signals by a predetermined multiplication number, and outputs a multiplication signal of each detection signal. The counter 222 counts the multiplication signals and outputs the counting result to the differential circuit 212 as a signal indicating the actual drive position of the screens 108 and 109. The drive waveform of the screens 108 and 109 is formed on the basis of the signal outputted from the counter 222 over time. Servo control of the screens 108 and 109 is performed by inputting the drive waveform to the differential circuit 212. The differential circuit 212, the filter 213, the screen drive circuit 204, and the position detection circuit 205 form a servo circuit 230.

The controller 231 detects whether an abnormality has occurred in the movement of the screens 108 and 109, on the basis of the multiplication signals outputted from the multiplication circuit 221, etc. In addition, the controller 231 sets gain for the drive signal in the screen drive circuit 204, and performs control and stop of feedforward (FF) and feedback (FB) control on the servo circuit 230. Moreover, the controller 231 controls the laser drive circuit 202 and the mirror drive circuit 203. The controller 231 is composed of a CPU or the like, and the storage 232 is composed of a register or the like. The process of abnormality detection will be described later with reference to FIG. 21A to FIG. 25B.

Next, generation of a drive waveform and a process of resetting the counter 222 will be described.

Figure 20A:
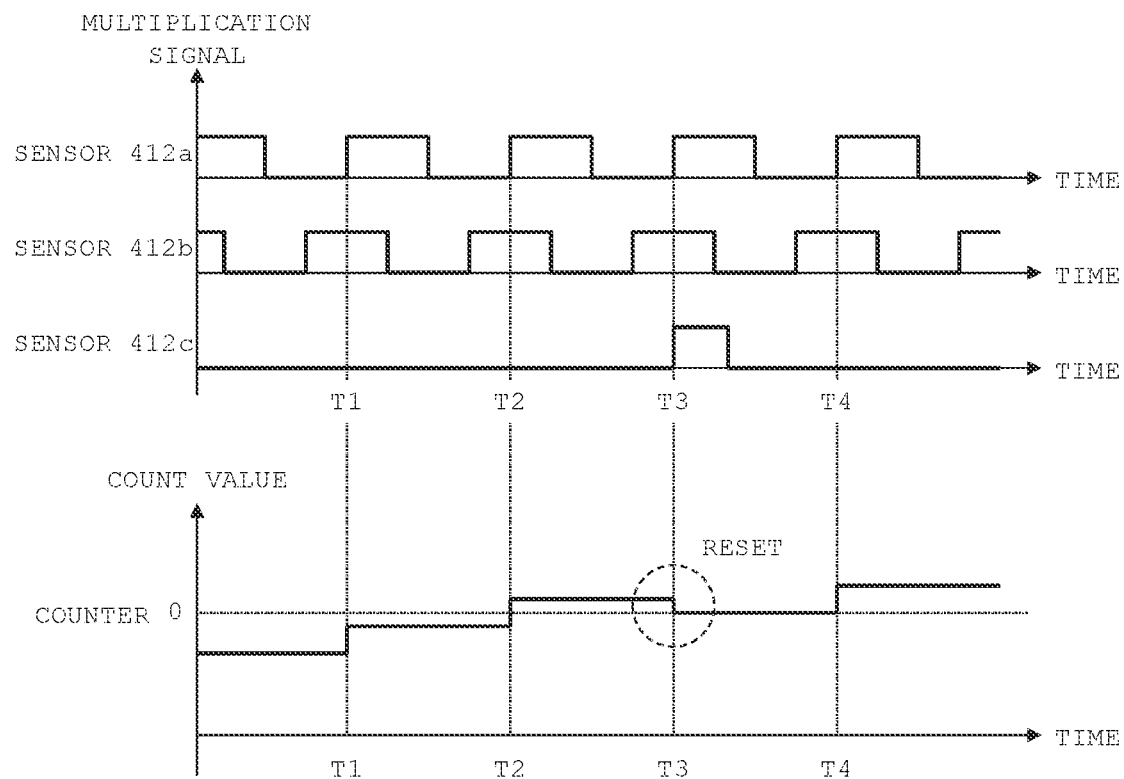

FIG. 20A shows graphs schematically showing states before and after timings when the multiplication signal of the sensor 412c is turned on.

In the example shown in FIG. 20A, in the period from time T1 to time T3, at each timing when the multiplication signal of the sensor 412a rises, the multiplication signal of the sensor 412b has risen, and thus the counter 222 increases the count value each time the multiplication signal of the sensor 412a rises. Then, at time T3, when the multiplication signal of the sensor 412c rises, that is, when the screens 108 and 109 reach the origin position, the counter 222 is reset, and the count value is set to 0.

When the multiplication signal of the sensor 412b has fallen at a timing when the multiplication signal of the sensor 412a rises, the counter 222 decreases the count value each time the multiplication signal of the sensor 412a rises. In this case as well, when the multiplication signal of the sensor 412c rises, the counter 222 is reset, and the count value is set to 0.

The counter 222 outputs the variation of the count value generated in this manner, as a drive waveform indicating the actual drive position of the screens 108 and 109. At this time, if the count value is reset at a timing when the multiplication signal of the sensor 412c rises as described above, the count value becomes 0 when the screens 108 and 109 are positioned at the origin position. Thus, the drive waveform properly represents the position of the screens 108 and 109.

Figure 20B:
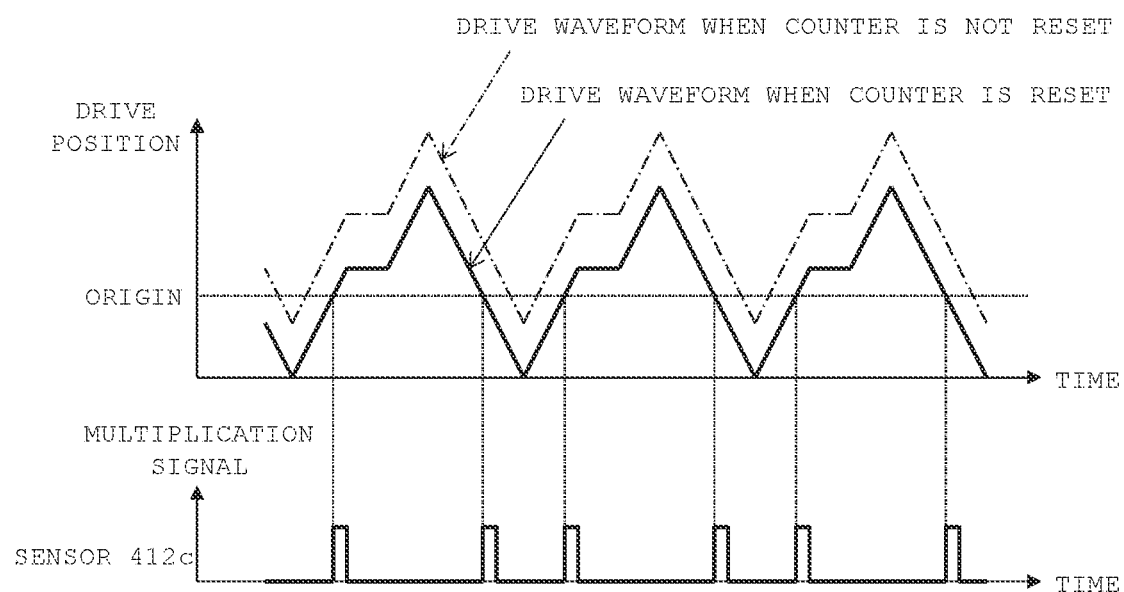
FIG. 20B shows graphs schematically showing a relationship between a drive waveform and a multiplication signal of a sensor according to Embodiment 2.

FIG. 20B shows graphs schematically showing a relationship between the drive waveform and the multiplication signal of the sensor 412c. In FIG. 20B, the period (time t1 to time t2) for displaying the fixed image M3 shown in FIG. 9A is omitted.

In the case where the counter 222 is not reset, as the screens 108 and 109 are driven, an error accumulates in the count value, and, for example, an offset occurs in the drive waveform as shown in a drive waveform by a long chain line in FIG. 20B. In this case, servo operation is executed by the servo circuit 230 in a state where the drive waveform is offset, and thus the screens 108 and 109 repeat reciprocation in the offset state. Therefore, the image 30 cannot be displayed at a position at which the viewing distance thereof is appropriate.

On the other hand, in the present embodiment, as described above, the counter 222 is reset at a timing when the multiplication signal of the sensor 412c rises. Accordingly, the offset of the drive waveform is eliminated as shown in a drive waveform by a solid line in FIG. 20B, and the drive waveform generated by the counter 222 is maintained in a proper state. Therefore, on the basis of the drive waveform generated by the counter 222, the image 30 can be displayed at a position at which the viewing distance thereof is appropriate.

Next, the method for detecting occurrence of an abnormality in the movement of the screens 108 and 109 will be described.

First, a method for detecting an abnormality of the actuator 300 on the basis of the conduction state of an electric signal to the actuator 300 will be described. Here, breakage and the like of the coil 341 are detected on the basis of a voltage applied to the coil 341.

Figure 21B:
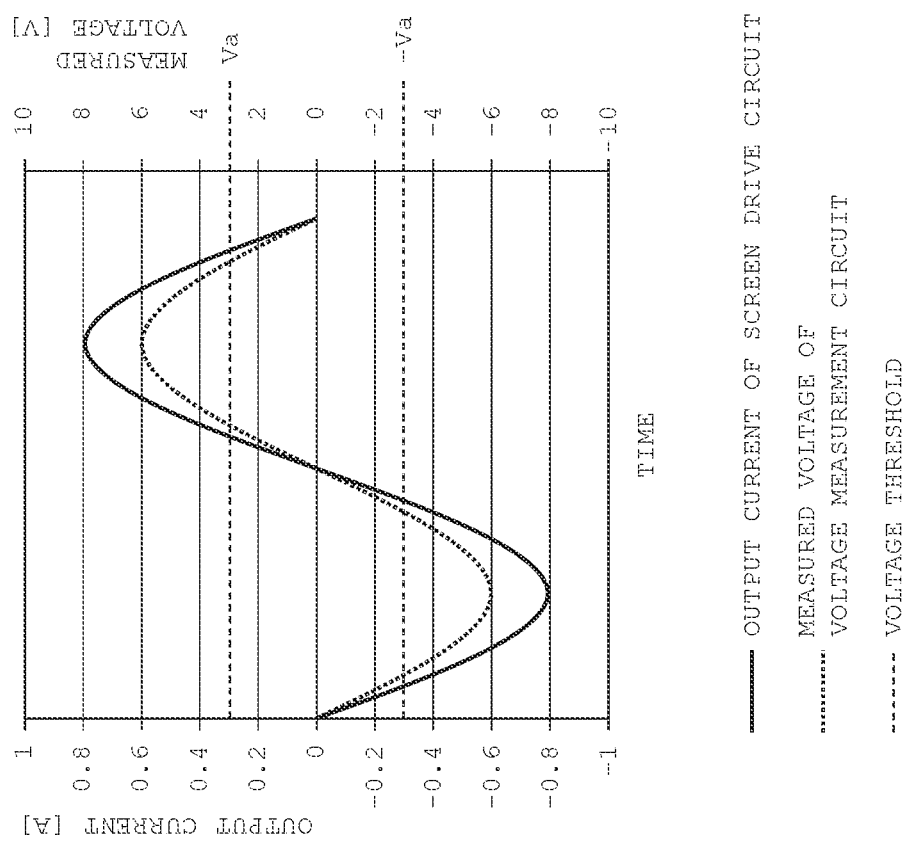
FIG. 21B is a graph schematically showing an output current of the screen drive circuit and a measured voltage of a voltage measurement circuit during initial control of the image display apparatus according to Embodiment 2.
Figure 21A:
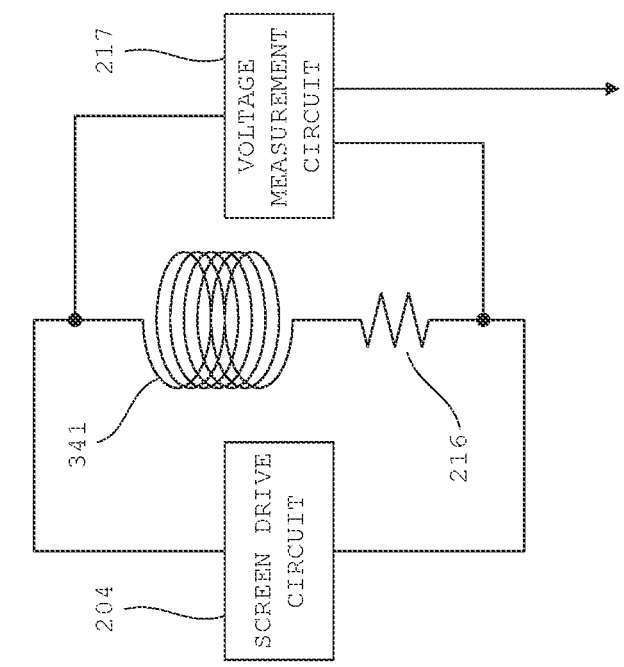
FIG. 21A is a diagram schematically showing a circuit connecting a screen drive circuit and a coil according to Embodiment 2.

FIG. 21A is a diagram schematically showing a circuit connecting the screen drive circuit 204 and the coil 341. The screen drive circuit 204, the coil 341, and a resistor 216 are connected in series, and a voltage measurement circuit 217 is connected in parallel to the coil 341 and the resistor 216.

During initial control of the image display apparatus 20, the screen drive circuit 204 applies a current to the coil 341 and the resistor 216 such that the screens 108 and 109 move in the optical axis direction with a predetermined amplitude. The voltage measurement circuit 217 measures the voltage between the coil 341 and the resistor 216 and outputs the measured voltage value as a digital signal to the controller 231. For example, the voltage measurement circuit 217 includes a sampling circuit that samples the voltage between the coil 341 and the resistor 216 in a fixed cycle, and an AD converter that converts the sampling value into a digital signal.

FIG. 21B is a graph schematically showing the output current of the screen drive circuit 204 and the measured voltage of the voltage measurement circuit 217 during initial control of the image display apparatus 20. During initial control, the controller 231 reciprocates the screens 108 and 109 in the Z-axis direction across the origin position. At this time, the output current of the screen drive circuit 204 and the measured voltage of the voltage measurement circuit 217 are sinusoidal.

When breakage has occurred in the coil 341, or when a layer short has occurred in the coil 341 due to wear of a coating or the like, the measured voltage of the voltage measurement circuit 217 decreases. Therefore, during initial control of the image display apparatus 20, when the amplitude of the measured voltage is smaller than a preset threshold Va, it is recognized that breakage or a layer short has occurred in the coil 341. Specifically, when the measured voltage is 0, it can be determined that the coil 341 has been broken, and, when the amplitude of the measured voltage is larger than 0 and smaller than the threshold Va, it can be determined that a layer short has occurred in the coil 341. The threshold Va is set to, for example, about 50% of the amplitude of the voltage measured when the coil 341 is in a normal state.

Figure 22:
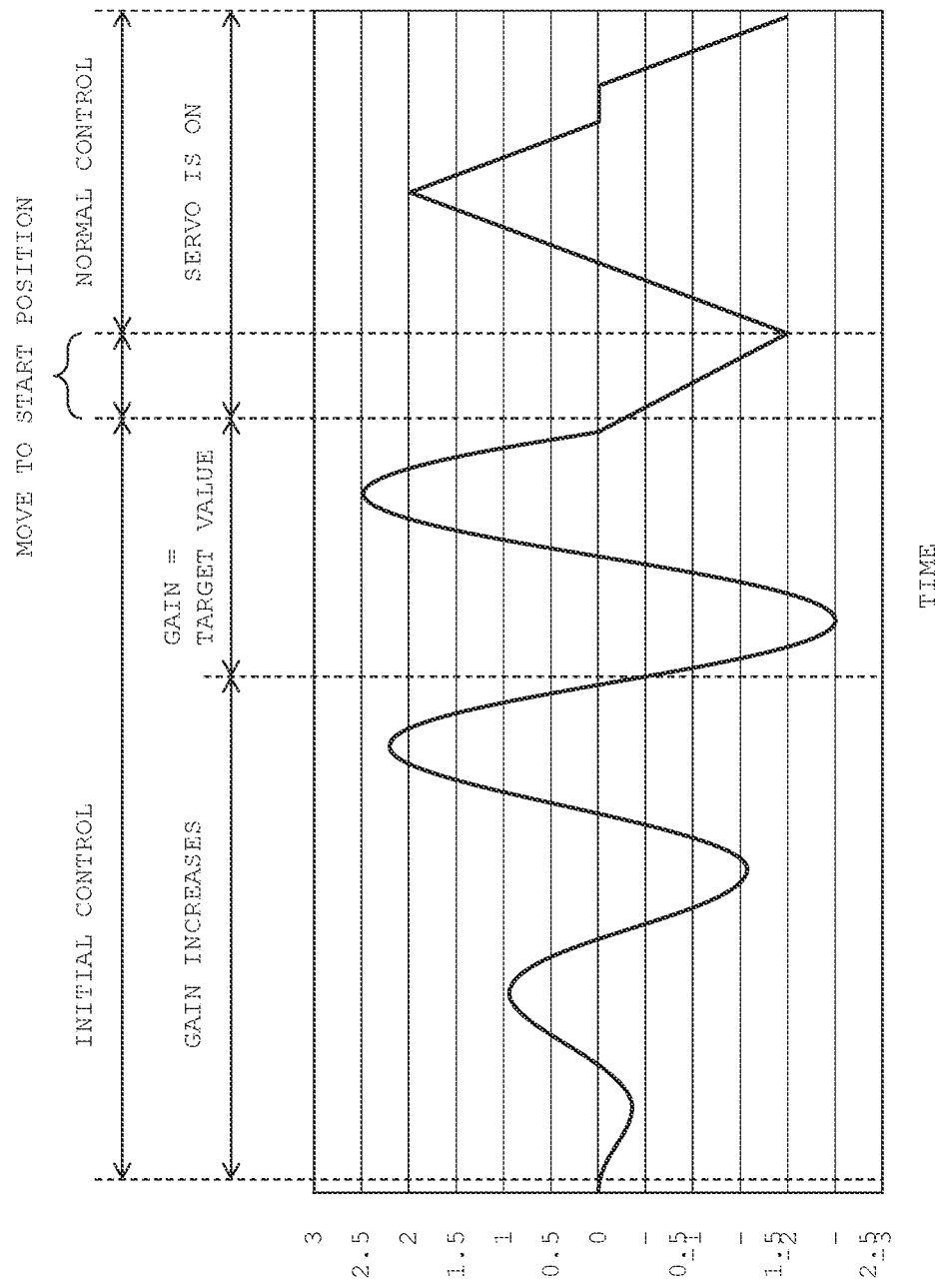
FIG. 22 is a diagram schematically showing a drive waveform in initial control and normal control in the case where the image display apparatus according to Embodiment 2 is in a normal state.

FIG. 22 is a diagram schematically showing a drive waveform in initial control and normal control in the case where the image display apparatus 20 is in a normal state.

As shown in FIG. 22, when initial control is started, the gain set in the screen drive circuit 204 is gradually increased, and the screens 108 and 109 are driven through feedforward (FF) control such that the drive waveform becomes sinusoidal. That is, in the circuit of FIG. 19, the screen drive circuit 204 is driven in accordance with predetermined gain without servo control being performed by the servo circuit 230, and the screens 108 and 109 reciprocate in accordance with the drive of the screen drive circuit 204.

Then, when the gain reaches a preset target value, the screens 108 and 109 are driven so as to make one reciprocation. Then, in accordance with the screens 108 and 109 having been moved to the start position (for example, the position corresponding to the initial position Ps0 in FIG. 9A), normal control of the image display apparatus 20 is started. In normal control, the servo circuit 230 is turned on, and servo control is performed on the screens 108 and 109 through feedback (FB) control. That is, in the circuit of FIG. 19, the drive waveform is inputted from the position detection circuit 205 to the differential circuit 212, and the screens 108 and 109 are driven such that a desired drive waveform is formed.

In the present embodiment, in initial control shown in FIG. 22, a process of detecting an abnormality (breakage or a layer short) of the above-described coil 341 is performed.

Moreover, in the present embodiment, in this initial control, an abnormality of the position detection circuit 205 is detected as an abnormality in the movement of the screens 108 and 109. Here, an abnormality of the position detection circuit 205 is detected on the basis of the multiplication signals outputted from the multiplication circuit 221.

Furthermore, in the present embodiment, in normal control, an abnormality in the movement of the screens 108 and 109 is detected on the basis of a cumulative value of the difference between the drive waveform of the screens 108 and 109 and the target waveform.

Hereinafter, these abnormality detection processes will be described.

Figure 23:
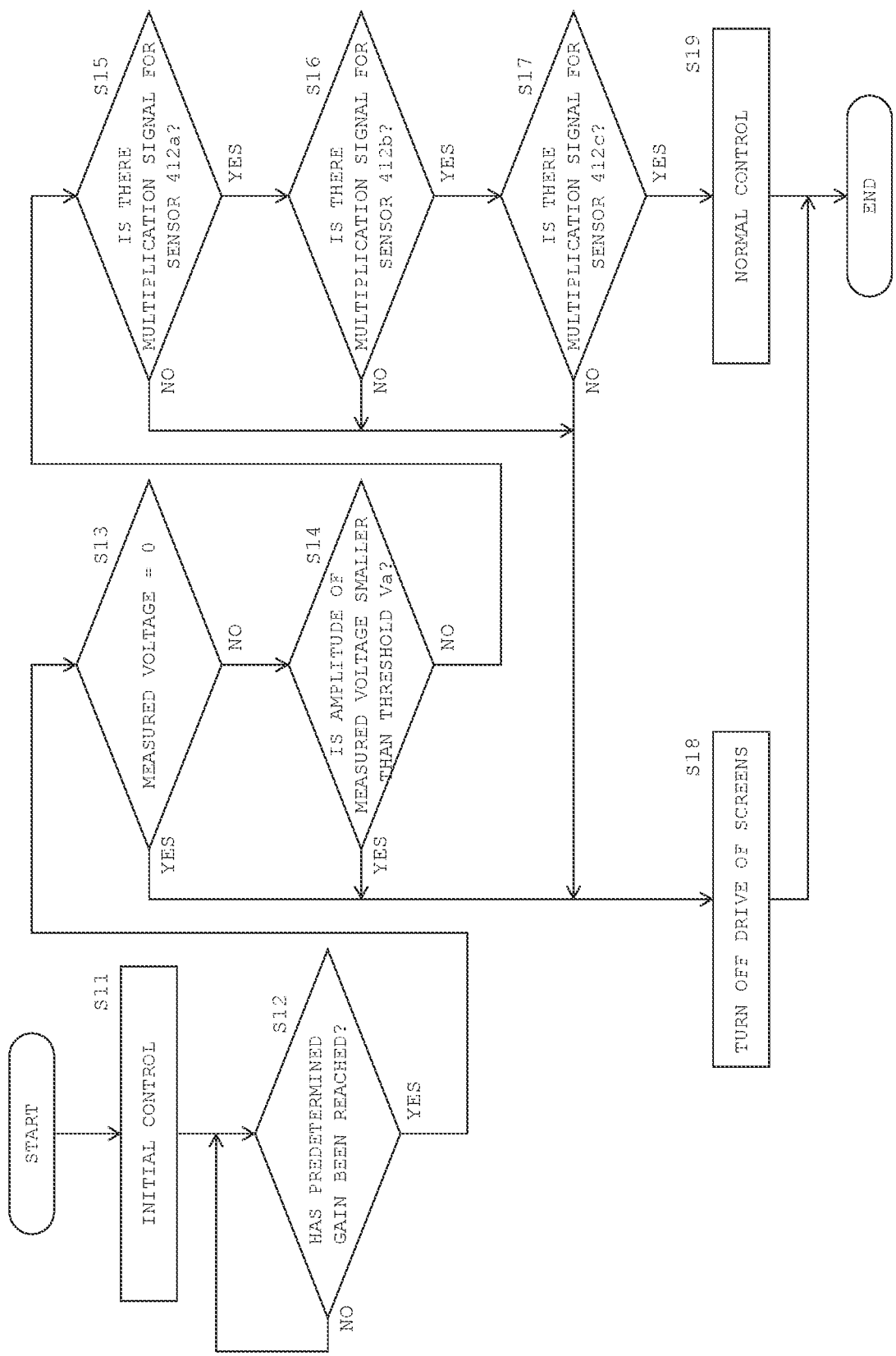
FIG. 23 is a flowchart showing an abnormality detection process in initial control of the image display apparatus according to Embodiment 2.

FIG. 23 is a flowchart showing an abnormality detection process in initial control of the image display apparatus 20. The abnormality detection process described below is executed by the controller 231.

When the image display apparatus 20 is started, the controller 231 starts initial control with drive of the light source 101 and the scanning device 106 maintained off (S11). Accordingly, as described with reference to FIG. 22, the gain set in the screen drive circuit 204 is gradually increased, and the screens 108 and 109 are driven through feedforward (FF) control. In addition, detection of the position of the screens 108 and 109 by the position detection circuit 205 is started. When the gain set in the screen drive circuit 204 reaches the target value (S12: YES), the controller 231 executes processes in S13 to S17 by continuing the operation of reciprocating the screens 108 and 109 for a predetermined time while maintaining the gain in the screen drive circuit 204 at the target value. Hereinafter, the period during which the operation of reciprocating the screens 108 and 109 is continued is referred to as a "determination period".

In S13 and S14, the controller 231 determines whether the amplitude of the measured voltage of the voltage measurement circuit 217 in the determination period is 0, and further determines whether the amplitude of the measured voltage is smaller than the threshold Va. The amplitude of the measured voltage is, for example, a value obtained by subtracting the minimum value of the measured voltage in the determination period from the maximum value thereof and dividing the remainder by 2. The threshold Va is stored in the storage 232 in advance.

As described with reference to FIG. 21A and FIG. 21B, when the amplitude of the measured voltage is equal to or larger than 0 and less than the threshold Va (S13: YES or S14: YES), it is considered that breakage or a layer short has occurred in the coil 341. Thus, when it is determined as YES in at least either S13 or S14, the controller 231 controls the screen drive circuit 204 to turn off the drive of the screens 108 and 109 (S18). Accordingly, the process in FIG. 23 is ended without performing a process in S19 described later, and the operation of displaying the image 30 is prohibited. On the other hand, when the amplitude of the measured voltage is equal to or larger than the threshold Va (S13: NO, S14: NO), the controller 231 advances the process to S15 and performs detection of an abnormality of the position detection circuit 205.

In S15, S16, and S17, the controller 231 determines whether the multiplication signals based on the detection signals from the sensors 412a, 412b, and 412c have been outputted from the multiplication circuit 221 in the determination period. Here, when the multiplication signal for at least one of the sensors 412a, 412b, and 412c has not been outputted from the multiplication circuit 221 (S15: NO, S16: NO, or S17: NO), it is considered that some sort of trouble has occurred in the configuration for detecting the position of the screens 108 and 109.

For example, when trouble occurs in the light emitting portion 411 or the sensor 412a, 412b, or 412c of the encoder 410, when dirt adheres to the scale 332 or the scale 332 is broken or peeled off, or when trouble occurs in the multiplication circuit 221, the multiplication signal is no longer properly outputted from the multiplication circuit 221. Therefore, when any of the multiplication signals has not been outputted from the multiplication circuit 221 (S15: NO, S16: NO, or S17: NO), the controller 231 determines that an abnormality has occurred in detection of the position of the screens 108 and 109, and controls the screen drive circuit 204 to turn off the drive of the screens 108 and 109 (S18). In this case as well, the process in FIG. 23 is ended without performing the process in S19 described later, and the operation of displaying the image 30 is prohibited.

On the other hand, when the multiplication signals for all the sensors 412a, 412b, and 412c have been outputted from the multiplication circuit 221 (S15: YES, S16: YES, S17: YES), the controller 231 advances the process to S19.

In S19, the controller 231 starts normal control of the image display apparatus 20. Accordingly, the drive of the light source 101 and the scanning device 106 is turned on, the servo circuit 230 is turned on, and servo control is performed on the screens 108 and 109 through feedback (FB) control. As a result of normal control being started, the operation of displaying the image 30 is performed.

Figure 24:
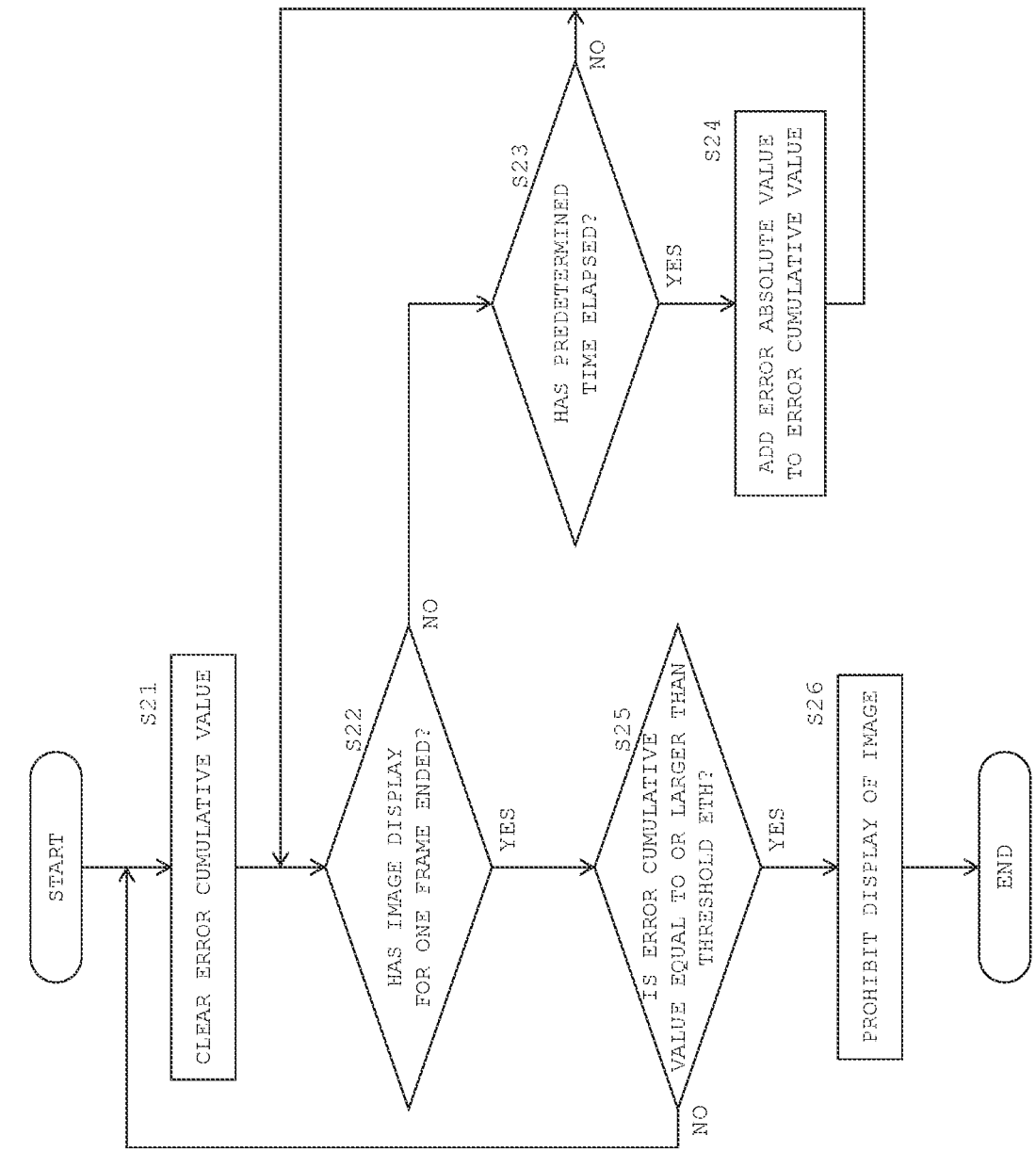
FIG. 24 is a flowchart showing an abnormality detection process in normal control of the image display apparatus according to Embodiment 2.

FIG. 24 is a flowchart showing an abnormality detection process in normal control of the image display apparatus 20.

After starting normal control of the image display apparatus 20, the controller 231 clears an error cumulative value (S21). The error cumulative value is a value obtained by accumulating the absolute value of the difference between the target position (position on the target waveform) and the actual drive position (count value of the counter 222) of the screens 108 and 109. The difference is calculated in a fixed cycle and accumulated in the controller 231 with the progress of normal control. The error cumulative value is, for example, stored and updated in the storage 232.

Specifically, until image display for one frame ends (S22: NO), each time a predetermined time elapses (S23: YES), the controller 231 adds the absolute value (error absolute value) of a value obtained by subtracting the target position from the drive position, to the immediately previous error cumulative value (S24). The controller 231 repeats this addition process (S23, S24) until the image display for one frame ends.

Figure 25B:
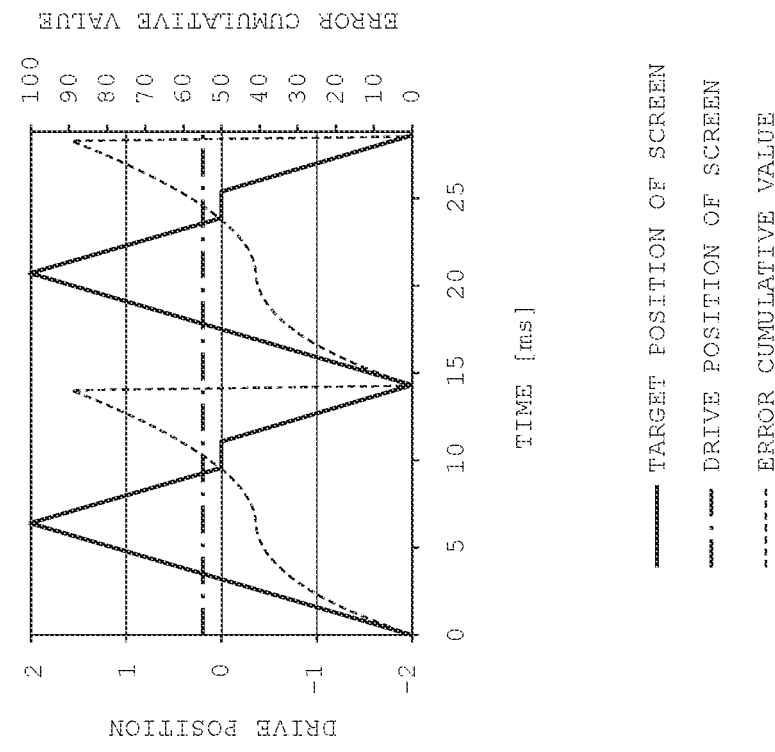
FIG. 25A and FIG. 25B are graphs schematically showing a drive position and an error cumulative value in normal control according to Embodiment 2.
Figure 25A:
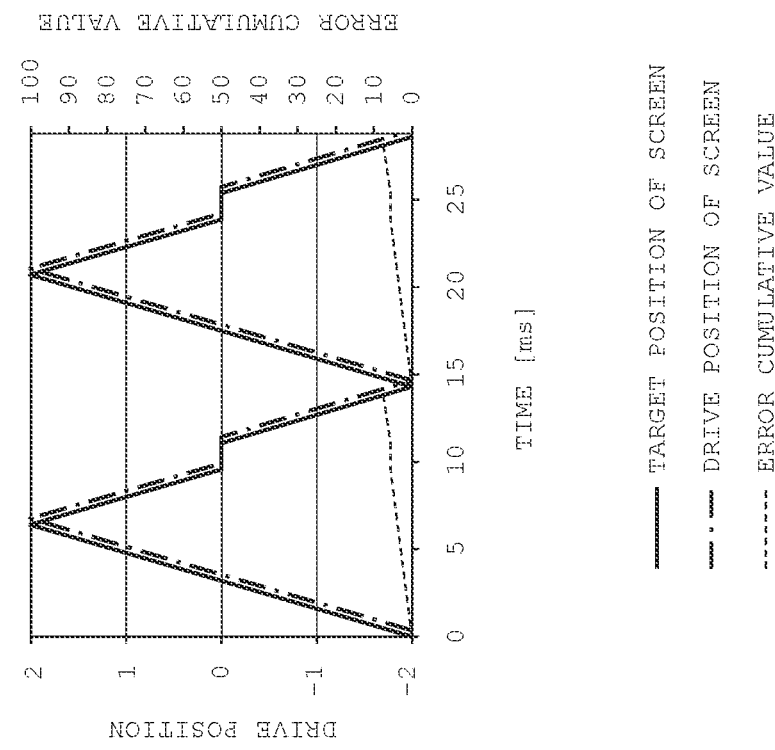

FIG. 25A and FIG. 25B are graphs schematically showing a drive position and an error cumulative value in normal control. FIG. 25A shows a state where the screens 108 and 109 are normally driven, and FIG. 25B shows a state where trouble has occurred in the drive of the screens 108 and 109.

As shown in FIG. 25A, during normal drive, the target position and the drive position are substantially the same, and thus the error cumulative value is kept low in each period of image display for one frame. On the other hand, as shown in FIG. 25B, for example, when the screens 108 and 109 remain near the neutral position even during normal operation, the difference between the target position and the drive position is increased. In this case, the error cumulative value significantly increases in each period of image display for one frame.

Referring back to FIG. 24, when the image display for one frame ends (S22: YES), the controller 231 determines whether the error cumulative value is equal to or larger than a threshold Eth (S25). The threshold Eth is set to a value that allows the error cumulative value to be properly detected when trouble has occurred in the drive of the screens 108 and 109 as shown in FIG. 25B. The threshold Eth is stored in the storage 232 in advance. When the error cumulative value is less than the threshold Eth (S25: NO), the controller 231 determines that the screens 108 and 109 are normally driven, and returns the process to S21. On the other hand, when the error cumulative value is equal to or larger than the threshold Eth (S25: YES), the controller 231 turns off the drive of the light source 101, the scanning device 106, and the screens 108 and 109 to prohibit the operation of displaying the image 30 (S26).

Effects of Embodiment 2

According to Embodiment 2, the following effects are achieved.

In S13 to S17 of FIG. 23 and S25 of FIG. 24, whether an abnormality has occurred in the movement of the screens 108 and 109 is determined. When an abnormality has occurred, S18 or S26 is executed, and the operation of displaying the image 30 is prohibited. Accordingly, the operation of displaying the image 30 can be prevented from being continued in a state where the viewing distance thereof is inappropriate.

The controller 231 detects an abnormality of the actuator 300 on the basis of the conduction state of the electric signal to the actuator 300, and, when an abnormality of the actuator 300 is detected, the controller 231 prohibits the operation of displaying the image 30. Specifically, when the voltage applied to the coil 341 is smaller than the predetermined threshold, the controller 231 determines that an abnormality such as breakage or a layer short has occurred in the coil 341, and prohibits the operation of displaying the image 30. Accordingly, the operation of displaying the image 30 can be prevented from being continued in a state where the viewing distance thereof is inappropriate.

During operation of the screens 108 and 109, the controller 231 monitors the position detection operation in the position detection circuit 205 (position detector) and performs detection of an abnormality of the position detection circuit 205, and, when an abnormality of the position detection circuit 205 is detected, the controller 231 prohibits the operation of displaying the image 30. Specifically, during operation of the screens 108 and 109, the controller 231 monitors the multiplication signals outputted from the multiplication circuit 221. When any multiplication signal does not rise, the controller 231 determines that trouble has occurred in the sensor 412a, 412b, or 412c or the multiplication circuit 221, or trouble such as adhesion of dirt, peeling, and breakage has occurred in the scale 332, and prohibits the operation of displaying the image 30. Accordingly, the operation of displaying the image 30 can be prevented from being continued in an improper processing state. In addition, the screens 108 and 109 can be prevented from moving out of control and colliding against a mechanical part of the actuator 300 or the like.

In initial control for displaying the image 30, the controller 231 detects whether an abnormality has occurred in the movement of the screens 108 and 109. Accordingly, an abnormality can be detected before normal operation for displaying the image 30 is started, and thus the image 30 can be prevented from being displayed in an improper state.

When servo control is performed on the screens 108 and 109, normally, the screens 108 and 109 follow the target waveform, and the difference between the drive waveform of the screens 108 and 109 and the target waveform is decreased. However, when an abnormality has occurred in the movement of the screens 108 and 109, the following of the screens 108 and 109 with respect to the target waveform may deteriorate, resulting in an increase in the difference between the drive waveform and the target waveform. According to the present embodiment, during servo control of the screens 108 and 109, the operation of displaying the image 30 is prohibited on the basis of the difference. Specifically, during servo control of the screens 108 and 109 by the servo circuit 230, when the cumulative value of the difference between the drive waveform of the screens 108 and 109 and the target waveform is larger than the predetermined threshold, the controller 231 prohibits the operation of displaying the image 30. Accordingly, the operation of displaying the image 30 can be prevented from being continued in a state where the viewing distance thereof is inappropriate.

On the basis of the difference in a one-frame period for displaying the image 30, the controller 231 prohibits the operation of displaying the image 30. When abnormality detection is performed for each frame as described above, if an abnormality occurs in the movement of the screens 108 and 109, the operation of displaying the image 30 can be quickly prohibited.

Modifications of Embodiment 2

Although Embodiment 2 of the present invention has been described above, the present invention is not limited to Embodiment 2 described above, and various application examples of the present invention can be made in addition to Embodiment 2 described above.

For example, in Embodiment 2 described above, an abnormality of the actuator 300 does not necessarily have to be detected on the basis of the value of the voltage applied to the coil 341, and may be detected on the basis of another parameter that allows the conduction state of the electric signal to the actuator 300 to be monitored. For example, occurrence of an abnormality such as breakage or a layer short in the coil 341 may be detected on the basis of the current flowing through the coil 341. Alternatively, detection of an abnormality of the actuator 300 is not limited to be performed during initial operation, and may be performed during normal operation.

In Embodiment 2 described above, the screens 108 and 109 are not limited to be driven by the coil 341, and may be driven by another drive mechanism.

In Embodiment 2 described above, an abnormality of the position detection circuit 205 (position detector) does not necessarily have to be detected on the basis of the multiplication signals, and may be detected on the basis of another parameter that allows the position detection operation in the position detection circuit 205 to be monitored. For example, an abnormality of the position detection circuit 205 (position detector) may be detected on the basis of the detection signals outputted from the sensors 412a, 412b, and 412c, or may be detected on the basis of a fact that the count value of the counter 222 does not properly change. In addition, detection of an abnormality of the position detection circuit 205 is not limited to be performed during initial operation, and may be performed during normal operation.

In Embodiment 2 described above, the abnormality detection during normal control shown in FIG. 23 is performed on the basis of the error cumulative value in a period of image display for one frame, but is not limited thereto and may be performed on the basis of the error cumulative value in two or more periods of image display. Alternatively, the abnormality detection during normal operation is not limited to be performed on the basis of the error cumulative value, and may be performed on the basis of whether the difference exceeds a predetermined threshold. Still alternatively, when the number of times the difference exceeds the predetermined threshold in a period of image display for one frame exceeds a certain number, it may be determined that an abnormality has occurred during normal control.

The two screens 108 and 109 do not have to be used. For example, only one screen may be reciprocated, and an image may be generated.

Embodiment 3

In Embodiment 3, a laser radar 600 is mounted on the front side of the passenger car 1, and a line beam B10 is projected forward of the passenger car 1.

Figure 26A:
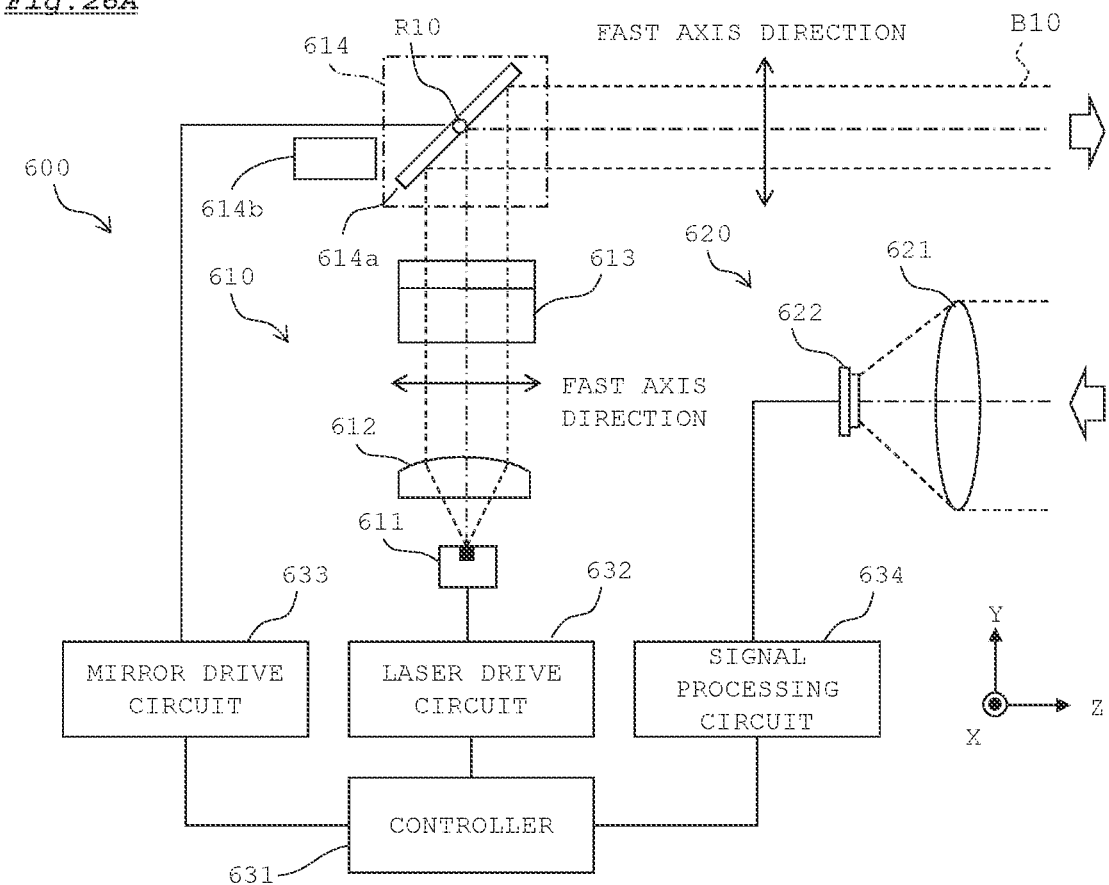
FIG. 26A is a diagram showing configurations of an optical system and a circuitry of a laser radar according to Embodiment 3.
Figure 26B:
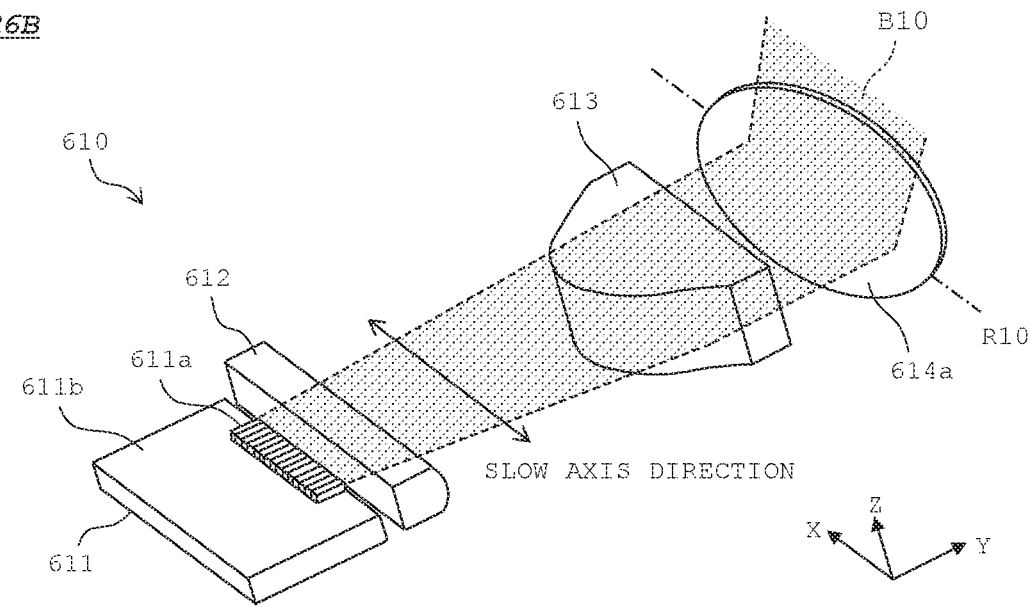
FIG. 26B is a perspective view showing a configuration of a projection optical system according to Embodiment 3.

FIG. 26A is a diagram showing configurations of an optical system and a circuitry of the laser radar 600. FIG. 26B is a perspective view showing a configuration of a projection optical system 610. In FIG. 26A and FIG. 26B, for convenience of description, X, Y, and Z axes that are orthogonal to each other are additionally shown as appropriate. The directions of these X, Y, and Z axes do not coincide with the directions of the X, Y, and Z axes used in Embodiments 1 and 2 described above.

The laser radar 600 includes the projection optical system 610 and a light receiving optical system 620 as components of the optical system. The projection optical system 610 generates the line beam B10 that is long in one direction (X-axis direction). In addition, the projection optical system 610 performs scanning with the generated line beam B10 in a short side direction thereof (Y-axis direction). The light receiving optical system 620 receives reflected light, from an object, of the laser light projected from the projection optical system 610.

The projection optical system 610 includes a light emitting unit 611 (light source), a fast-axis cylindrical lens 612, a slow-axis cylindrical lens 613, and an optical deflector 614 (actuator). In addition, the light receiving optical system 620 includes a light receiving lens 621 and a light receiving element 622.

The light emitting unit 611 is configured by integrating a plurality of laser light sources 611a. Each laser light source 611a emits laser light having a predetermined wavelength. In Embodiment 3, it is assumed that the laser radar 600 is mounted on a vehicle. Thus, the emission wavelength of each laser light source 611a is set in the infrared wavelength band (for example, 905 nm).

Each laser light source 611a has a structure in which an active layer is interposed between an N-type clad layer and a P-type clad layer. When a voltage is applied to the N-type clad layer and the P-type clad layer, laser light is emitted from a light emitting region of the active layer. In the light emitting region, the width in a direction parallel to the active layer is larger than the width in a direction perpendicular to the active layer. An axis in the direction perpendicular to the active layer is referred to as a fast axis, and an axis in the direction parallel to the active layer is referred to as a slow axis. The laser light emitted from the light emitting region has a spread angle in the fast axis direction larger than that in the slow axis direction. Thus, the beam emitted from the light emitting region has an elliptical shape that is long in the fast axis direction.

The plurality of laser light sources 611a are each disposed such that the slow axis thereof is parallel to the X-axis direction. In addition, the plurality of laser light sources 611a are disposed so as to be aligned in a direction (X-axis direction) parallel to the slow axis. The light emitting unit 611 has a structure in which one semiconductor light emitting element formed such that a plurality of light emitting regions are aligned in the slow axis direction is installed on a base 611b. Of the semiconductor light emitting element, structural parts that emit laser light from the respective light emitting regions correspond to the laser light sources 611a, respectively.

The fast-axis cylindrical lens 612 converges the laser light emitted from each laser light source 611a of the light emitting unit 611, in the fast axis direction to adjust the spread of the laser light in the fast axis direction to a substantially parallel state. The slow-axis cylindrical lens 613 converges the laser light emitted from each laser light source 611a of the light emitting unit 611, in the slow axis direction to adjust the spread of the laser light in the slow axis direction.

The laser light emitted from each laser light source 611a is condensed in the slow axis direction by the slow-axis cylindrical lens 613, and is incident on a mirror 614a (optical member) of the optical deflector 614. The optical deflector 614 is, for example, a MEMS mirror using a piezoelectric actuator, an electrostatic actuator, or the like. The mirror 614a has a reflectance thereof increased by a dielectric multilayer film, a metal film, or the like. The mirror 614a is driven so as to rotate about a rotation axis R10 parallel to the X axis. In addition, the optical deflector 614 is provided with a position detector 614b (see FIG. 26A) for detecting the rotational position of the mirror 614a.

A beam is formed by a collection of the laser light from the respective laser light sources 611a. The beam is condensed only in the X-axis direction by the slow-axis cylindrical lens 613, and thus the beam reflected by the mirror 614a spreads only in the X-axis direction. Thus, the line beam B10 that spreads in the X-axis direction is generated.

The optical deflector 614 drives the mirror 614a on the basis of a drive signal from a mirror drive circuit 633 and performs scanning in the Y-axis direction with the beam reflected from the mirror 614a. Accordingly, scanning is performed in the short side direction (Y-axis direction) with the line beam B10.

Reflected light, of the line beam B10, reflected from a target region is condensed on a light receiving surface of the light receiving element 622 by the light receiving lens 621. The light receiving element 622 is, for example, an image sensor in which pixels are arranged vertically and horizontally in a matrix image shape. A pixel position in the X-axis direction of the light receiving surface corresponds to a position in the X-axis direction in the target region. In addition, a pixel position in the Y-axis direction of the light receiving surface corresponds to a position in the Y-axis direction in the target region. The position of an object in the X-axis direction and the Y-axis direction in the target region can be detected on the basis of the positions of pixels at each of which a light reception signal is generated.

The laser radar 600 includes a controller 631, a laser drive circuit 632, the mirror drive circuit 633, and a signal processing circuit 634 as components of the circuitry.

The controller 631 includes an arithmetic processing circuit such as a CPU (central processing unit) and a storage medium such as a ROM (read only memory) and a RAM (random access memory), and controls each part according to a preset program. The laser drive circuit 632 causes each laser light source 611a of the light emitting unit 611 to emit light in a pulsed manner in accordance with the control from the controller 631.

The mirror drive circuit 633 drives the optical deflector 614 in accordance with the control from the controller 631. The optical deflector 614 rotates the mirror 614a about the rotation axis R10 to perform scanning in the short side direction of the line beam B10 with the line beam B10.

The signal processing circuit 634 outputs a light reception signal at each pixel of the light receiving element 622 to the controller 631. As described above, the controller 631 detects the position of an object in the X-axis direction in the target region on the basis of the positions of pixels at each of which a light reception signal is generated. In addition, the controller 631 acquires the distance to the object existing in the target region, on the basis of the time difference between a timing when the light emitting unit 611 is caused to emit light in a pulsed manner and a timing when the light receiving element 622 receives reflected light from the target region, that is, a timing when the light reception signal is received from the light receiving element 622.

As described above, the controller 631 detects the presence/absence of an object in the target region by causing the optical deflector 614 to perform scanning with the line beam B10 while causing the light emitting unit 611 to emit light in a pulsed manner, and further measures the position of the object and the distance to the object. These measurement results are transmitted to a controller on the passenger car 1 side as needed.

Figure 27A:
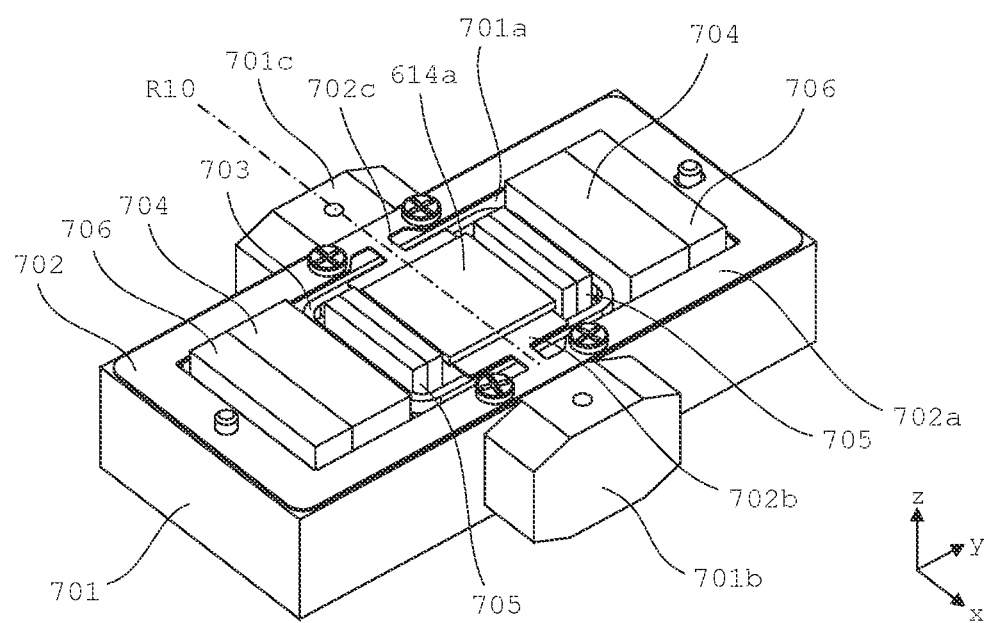
FIG. 27A is a perspective view showing a configuration of an optical deflector according to Embodiment 3 before a dynamic damper is mounted thereon.
Figure 27B:
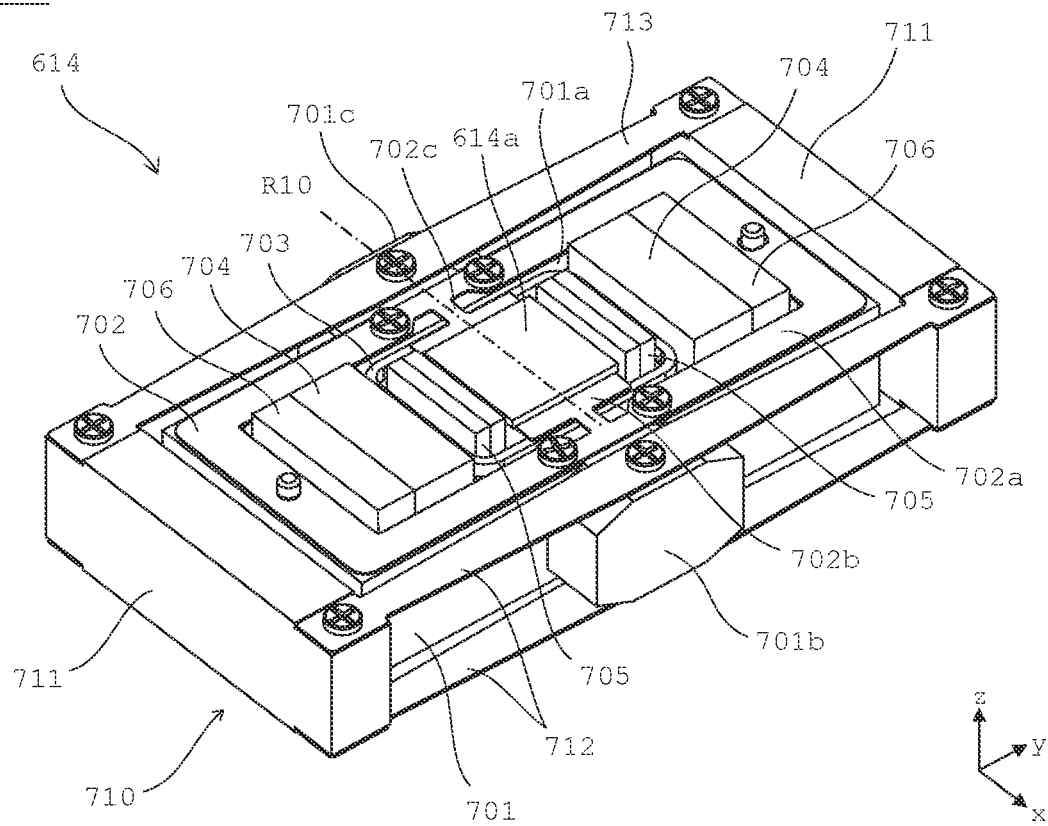
FIG. 27B is a perspective view showing a configuration of the optical deflector according to Embodiment 3 for which assembly has been completed.

FIG. 27A is a perspective view showing a configuration of the optical deflector 614 before a dynamic damper 710 is mounted thereon. FIG. 27B is a perspective view showing a configuration of the optical deflector 614 for which assembly has been completed.

The optical deflector 614 is configured to use electromagnetic force to drive the mirror 614a. Components for electromagnetic drive are installed in a housing 701 (non-drive part). In FIG. 27A and FIG. 27B, x, y, and z axes that are orthogonal to each other are additionally shown. The x-axis direction is a short side direction of the housing 701, the y-axis direction is a long side direction of the housing 701, and the z-axis direction is a direction perpendicular to the upper surface of the housing 701. The x-axis direction coincides with the X-axis direction in FIG. 26A and FIG. 26B.

The housing 701 has a rectangular parallelepiped shape that is long in the y-axis direction as shown in FIG. 27A, and is made of a metal material having high rigidity. The surface on the Z-axis negative side (bottom surface) of the housing 701 is fixed to a support base within the laser radar 600. A recess 701a that is rectangular in a plan view is formed on the upper surface of the housing 701. A projection 701b is formed on the surface on the x-axis positive side of the housing 701 so as to project in the x-axis positive direction, and a projection 701c is formed on the surface on the x-axis negative side of the housing 701 so as to project in the x-axis negative direction. A frame-shaped leaf spring 702 is installed on the upper surface of the housing 701.

The frame-shaped leaf spring 702 has a frame portion 702a, a support portion 702b, and two beam portions 702c. At the intermediate position in the y-axis direction, the two beam portions 702c are formed so as to extend parallel to the x-axis direction from the frame portion 702a, and the frame portion 702a and the support portion 702b are connected by these beam portions 702c. At the intermediate position in the y-axis direction of the support portion 702b, the two beam portions 702c are connected to the support portion 702b. The leaf spring 702 is integrally formed from a flexible metal material. The mirror 614a is fixed to the upper surface of the support portion 702b by an adhesive or the like. The mirror 614a is substantially square in a plan view. The axis connecting the two beam portions 702c is the rotation axis R10 of the mirror 614a.

A coil 703 is installed on the lower surface of the support portion 702b such that the intermediate position of a long side thereof coincides with the rotation axis R10. The coil 703 extends around in a rectangular shape with rounded corners in a plan view. Two sets of magnets 704 and magnets 705 are arranged such that portions on the y-axis positive side and the y-axis negative side of the coil 703 are sandwiched therebetween in the y-axis direction, respectively. The magnets 704 and the magnets 705 are installed on yokes 706, and the yokes 706 are installed on the bottom surface of the recess 701a of the housing 701. The magnets 704 and 705 are each a permanent magnet having a substantially uniform magnetic flux density on the magnetic pole surface thereof.

The direction of the magnetic field generated by the magnets 704 and 705 on the y-axis positive side is the same as the direction of the magnetic field generated by the magnets 704 and 705 on the y-axis negative side. For example, the north pole of the magnet 704 on the y-axis positive side faces the coil 703, and the south pole of the magnet 704 on the y-axis negative side faces the coil 703. In addition, the south pole of the magnet 705 on the y-axis positive side faces the coil 703, and the north pole of the magnet 705 on the y-axis negative side faces the coil 703. By adjusting the magnetic poles (directions of the magnetic fields) as described above, when a drive signal (current) is applied to the coil 703, driving force around the rotation axis R10 is generated in the coil 703. Accordingly, the mirror 614a rotates about the rotation axis R10.

In Embodiment 3, the position detector 614b (see FIG. 26A) for detecting the drive position (rotational position) of the mirror 614a is disposed. The position detector 614b can be composed of, for example, a magnet provided at the support portion 702b and a Hall element provided so as to face the magnet. Similar to the encoder 410 of Embodiment 2, the position detector 614b may be composed of an optical sensor that irradiate a scale provided at the support portion 702b, with light and receives reflected light from the scale. The configuration of the position detector 614b can be changed as appropriate as long as the rotational position of the mirror 614a can be detected.

As shown in FIG. 27B, the dynamic damper 710 is installed on the projections 701b and 701c of the housing 701.

The dynamic damper 710 includes two mass members 711, two leaf springs 712, and two leaf springs 713. Similar to Embodiments 1 and 2 described above, the mass of each mass member 711 and the spring constants and the viscosity coefficients of the leaf springs 712 and 713 are adjusted such that resonance at a target frequency is suppressed.

The two leaf springs 712 and the two leaf springs 713 are each made of a metal material extending in the y-axis direction and having a small thickness in the z-axis direction. The two leaf springs 712 are fixed to the upper surface and the lower surface of the projection 701b of the housing 701 by using screws such that the upper surface and the lower surface of the projection 701b are sandwiched therebetween. The two leaf springs 713 are fixed to the upper surface and the lower surface of the projection 701c of the housing 701 by using screws such that the upper surface and the lower surface of the projection 701c are sandwiched therebetween.

The two mass members 711 are each made of the same material as the mass member 520 shown in the modification of Embodiment 2. The mass member 711 on the y-axis positive side is fixed to the two leaf springs 712 and the two leaf springs 713 at end portions on the y-axis positive side of the two leaf springs 712 and end portions on the y-axis positive side of the two leaf springs 713. The mass member 711 on the y-axis negative side is fixed to the two leaf springs 712 and the two leaf springs 713 at end portions on the y-axis negative side of the two leaf springs 712 and end portions on the y-axis negative side of the two leaf springs 713. At this time, the two leaf springs 712 are fixed to the upper surfaces and the lower surfaces of the mass members 711 by using screws such that the upper surfaces and the lower surfaces of the mass members 711 are sandwiched therebetween on the x-axis positive side. The two leaf springs 713 are fixed to the upper surfaces and the lower surfaces of the mass members 711 by using screws such that the upper surfaces and the lower surfaces of the mass members 711 are sandwiched therebetween on the x-axis negative side. In this manner, the assembly of the optical deflector 614 is completed.

In Embodiment 3, the optical deflector 614 is driven such that the mirror 614a reciprocates about the rotation axis R10 in a fixed cycle. In addition, while the mirror 614a rotates in the range of the forward path, each laser light source 611a is driven so as to emit light in a pulsed manner a plurality of times. The controller 631 shown in FIG. 26A controls the laser drive circuit 632 and the mirror drive circuit 633 such that the range of the forward path of the mirror 614a and the drive period of the laser light sources 611a match each other.

At this time, the controller 631 controls the laser drive circuit 632 and the mirror drive circuit 633 on the basis of a target waveform that defines the reciprocation of the mirror 614a. Specifically, similar to Embodiments 1 and 2 described above, the controller 631 performs servo control on the drive of the mirror 614a by the mirror drive circuit 633 such that the waveform of a detection signal outputted from the position detector 614b (a drive waveform of the mirror 614a) and a target waveform match each other. In addition, the controller 631 drives the laser drive circuit 632 such that, in each range of the forward path of the mirror 614a in the target waveform, light is emitted from each laser light source 611a in a pulsed manner a predetermined number of times.

Effects of Embodiment 3

According to Embodiment 3, the following effects are achieved.

The mass member 711 of the dynamic damper 710 is installed on the housing 701 via the leaf springs 712 and 713. When the optical deflector 614 is driven such that the mirror 614a reciprocates about the rotation axis R10 in a fixed cycle, the optical deflector 614 is vibrated in the up-down direction (z-axis direction) by the reaction force of this drive. At this time, the two mass members 711 oscillate in the up-down direction (Z-axis direction) as the leaf springs 712 and 713 bend in the up-down direction. Accordingly, the vibration energy of the optical deflector 614 installed within the laser radar 600 is absorbed by the dynamic damper 710.

According to Embodiment 3, the resonance frequency of the dynamic damper 710 can be easily adjusted by adjusting the lengths, the thicknesses, and the shapes of the leaf springs 712 and 713. Therefore, the resonance frequency of the dynamic damper 710 can be more smoothly adjusted to be in the target frequency band, and the target vibration-damping action can be achieved more effectively.

Also in Embodiment 3, similar to Embodiment 2, when an abnormality has occurred in the rotation of the mirror 614a, the controller 631 may prohibit application of light by the light emitting unit 611. In addition, the controller 631 may monitor the position detection operation in the position detector 614b during operation of the mirror 614a, and may prohibit application of light by the light emitting unit 611 when an abnormality of the position detector 614b is detected. Moreover, in initial control, the controller 631 may detect whether an abnormality has occurred in the rotation of the mirror 614a. Furthermore, in Embodiment 3, similar to Embodiment 2, during servo control of the mirror 614a, the controller 631 may prohibit application of light by the light emitting unit 611 on the basis of the difference between the drive waveform of the mirror 614a and the target waveform.

Other Modifications

In Embodiments 1 and 2 described above, the example in which the present invention is applied to the head-up display mounted on the passenger car 1 has been described, but the present invention can also be applied to other types of image display apparatuses and optical devices in addition to the vehicle-mounted devices.

In Embodiments 1 and 2 described above, the configurations of the image display apparatus 20 and the irradiation light generation part 21 are not limited to the configurations shown in FIG. 1C and FIG. 2, and can be changed as appropriate. In addition, the configuration of the actuator 300 for driving the screens 108 and 109 is not limited to the configuration shown in the embodiments, and can be changed as appropriate. For example, the screens 108 and 109 may be driven by a piezoelectric type or electrostatic type actuator.

In Embodiments 1 and 2 described above, the screens 108 and 109 have been described as an example of the optical system to be moved, but another optical system such as a lens or a mirror may be an object to be moved. In addition, in Embodiment described above, the mirror 614a has been described as an example of the optical system to be moved, but another optical system such as a lens may be an object to be moved.

Various modifications can be made as appropriate to the embodiments of the present invention, without departing from the scope of the technological idea defined by the claims.

What is claimed is:

1. An image display apparatus comprising:
   a light source;
   a screen on which an image is formed when light from the light source is applied thereto;
   an optical system configured to generate a virtual image by light from the screen;
   an actuator configured to move the screen in an optical axis direction;
   a support base supporting the actuator; and
   a dynamic damper installed on a non-movable part on the support base,
   wherein the actuator includes a suspension configured to support the screen and to move the screen in the optical axis direction.

2. The image display apparatus according to claim 1, wherein the actuator includes:
  a holder holding the screen;
  a coil mounted on the holder; and
  a magnetic circuit installed on the support base and configured to apply a magnetic field to the coil,
the magnetic circuit includes a magnetic cover placed on an upper surface of the magnetic circuit and functioning as a yoke for the magnetic circuit, and
the dynamic damper is installed on an upper surface of the magnetic cover.

3. The image display apparatus according to claim 2, wherein a plurality of dynamic dampers including the dynamic damper are installed on the upper surface of the magnetic cover.

4. The image display apparatus according to claim 3, wherein the dynamic dampers are installed at positions symmetrical with respect to a center of the magnetic cover, respectively.

5. The image display apparatus according to claim 1, wherein the support base is supported by a fixed base via a damper.

6. The image display apparatus according to claim 1, wherein a plurality of dynamic dampers, including the dynamic damper, having different resonance frequencies are installed on the non-movable part.

7. The image display apparatus according to claim 6, wherein
  the plurality of the dynamic dampers each includes a mass member and a damper connecting the mass member to the non-movable part, and
  the resonance frequencies of the plurality of the dynamic dampers are made different by uniformly setting weights of the mass members of the respective dynamic dampers and making hardnesses of the respective dampers different from each other.

8. The image display apparatus according to claim 1, wherein
  the actuator drives the screen by electromagnetic force generated between a coil and a magnet,
  the image display apparatus further comprises:
    a voltage measurement circuit configured to measure a voltage applied to the coil; and
    a controller configured to detect an abnormality of the actuator when a voltage outputted from the voltage measurement circuit during operation of the screen is smaller than a predetermined threshold.

9. The image display apparatus according claim 1, further comprising:
  a position detector configured to detect a movement position of the screen; and
  a controller configured to detect an abnormality of the position detector, wherein
  the position detector includes an encoder configured to detect a position of the screen and output a detection signal, and a multiplication circuit configured to multiply the detection signal outputted from the encoder, and
  the controller detects the abnormality of the position detector when a multiplication signal is not outputted from the multiplication circuit.

10. The image display apparatus according to claim 1, further comprising:
  a position detector configured to detect a movement position of the screen;
  a servo circuit configured to cause the movement of the screen by the actuator to follow a target waveform based on a signal from the position detector; and
  a controller configured to, during servo control of the screen by the servo circuit, prohibit application of the light when a cumulative value of a difference between a drive waveform of the screen and the target waveform is larger than a predetermined threshold.

11. The image display apparatus according to claim 10, wherein the controller prohibits application of the light based on the difference in a one-frame period for driving the screen.

* * * * *